(12) United States Patent
Kitabatake

(10) Patent No.: US 6,393,253 B1
(45) Date of Patent: May 21, 2002

(54) DATA PROCESSING DEVICE

(75) Inventor: Kentaro Kitabatake, Saitama-ken (JP)

(73) Assignee: Mediafive Corporation, Saitama-ken (JP)

( * ) Notice: Subject to any disclaimer, the term of this patent is extended or adjusted under 35 U.S.C. 154(b) by 0 days.

(21) Appl. No.: 09/412,989

(22) Filed: Oct. 6, 1999

Related U.S. Application Data

(63) Continuation-in-part of application No. 08/757,652, filed on Nov. 29, 1996, now abandoned.

(30) Foreign Application Priority Data

Dec. 2, 1995 (JP) .............................................. 7-337971
Jul. 30, 1996 (JP) .............................................. 8-215917

(51) Int. Cl.$^7$ ................................................. G09B 3/00
(52) U.S. Cl. ....................... 434/350; 434/118; 434/322; 434/362; 380/251
(58) Field of Search .................. 434/118, 169, 434/219, 307 R, 308, 314, 322–374; 463/9, 17, 23, 25, 40–42; 273/240, 243; 360/72.1, 72.2, 80, 121; 345/327, 328, 348, 357, 473, 978; 380/251; 386/83, 96; 700/1; 705/50; 706/927; 707/10, 501; 725/5, 23, 24, 93, 116

(56) References Cited

U.S. PATENT DOCUMENTS

| | | | | |
|---|---|---|---|---|
| 3,932,948 A | * | 1/1976 | Goddard et al. ............. | 434/314 |
| 4,422,105 A | * | 12/1983 | Rodesch et al. .............. | 386/83 |
| 4,820,167 A | * | 4/1989 | Nobles et al. ................ | 434/336 |
| 5,034,807 A | * | 7/1991 | Von Kohorn ................. | 725/5 |
| 5,326,270 A | * | 7/1994 | Otsby et al. ................. | 434/362 |
| 5,597,307 A | * | 1/1997 | Redford et al. .............. | 434/118 |
| 5,749,736 A | * | 5/1998 | Griswold et al. ............ | 434/322 |
| 5,820,386 A | * | 10/1998 | Sheppard, II ................ | 434/322 |
| 5,842,871 A | * | 12/1998 | Cutler et al. ................. | 434/335 |
| 5,947,747 A | * | 9/1999 | Walker et al. ............... | 434/354 |
| 6,029,195 A | * | 2/2000 | Herz ............................ | 725/116 |

FOREIGN PATENT DOCUMENTS

| | | |
|---|---|---|
| JP | 09-212073 | 8/1997 |
| JP | 11-345154 | 12/1999 |

\* cited by examiner

Primary Examiner—Joe H. Cheng
(74) Attorney, Agent, or Firm—Arent Fox Kintner Plotkin & Kahn, PLLC

(57) ABSTRACT

The present invention provides an educational data processing device to reutilize the answer data to a certain question as incorrect answer data for other questions and it also provides a data processing device to store data, question and answer with ease. The educational data processing device of the present invention comprises a computer with a CPU, a memory system, and input and output systems; a DSG, stored in said memory system consisting of multiple DS where each DS consists of two types of data, a question and answer; and a program, stored in said memory system that performs the following functions: (a) selects a question and answer data from a DS, and one or more answer data from randomly selected DS in said DSG; (b) presents a question and Multiple-choice answer set to the user through said output system. The question corresponds to the question data from the selected DS and the multiple choice answer are comprised of the answer data from the selected DS and answer data from randomly selected DS; and (c) determines whether the answer inputted by the user through said input system is correct or not and notifies the user of the result through said output system.

16 Claims, 60 Drawing Sheets

Fig.10

```
Mozart
............................................................
............................................................
............................................................
............................................................
............ 'Marriage of Figaro' ........
............................................................
Chopin
............................................................
............................................................
............................................................
............................................................
... 'Polonaise' ..........................................
............................................................
..................
```

<A>Mozart</A>

................................................................

................................................................

................................................................

................................................................

........<B>'Marriage of Figaro'<B>......

................................................................

<A>Chopin</A>

................................................................

................................................................

................................................................

................................................................

...<B>'Polonaise'<B/>....................

<A>Mozart</A>

..........................................

..........................................

..........................................

..........................................

............<B>*'Marriage of Figaro'*<B>......

..........................................

<A>Beeyhoven </A>

..........................................

..........................................

............effected by Mozart..............

..........................................

..................<B>*'Symphony 5 Movement 1'*<B/>..........

Has the question ever appeared on an entrance exam?
◎Yes,  ◎No
In the exam of which school did the question appear ?
◎School A,  ◎School B,  ◎School C
In what year was the exam given?
◎90  ◎91  ◎92  ◎93  ◎94
◎95  ◎96  ◎97  ◎98  ◎other
Field: pull down
Difficulty-level:
Easy  ◎1  ◎2  ◎3  ◎4  ◎5  difficult

Fig.43

1 Positive Numbers

2 Problem Solving

3. Simple Equation

4. Quadratic Equation

5. Square Root

6. Pythagorean Theorem

7. Inequality

8, Simultaneous Equations

9. Linear Function

10. Quadratic Function

11. Angles

12. Congruence

13. Similarity

14. Triangles

15. Quadrangle

16. Circles

Fig.47

| 1 Equations→ | 1 Positive Numbers |
| 2 Graph and Figure→ | 2 Problem Solving |
| | 3. Simple Equation |
| | 4. Quadratic Equation |
| | 5. Square Root |
| | 6. Pythagorean Theorem |
| | 7. Inequality |
| | 8, Simultaneous Equations |

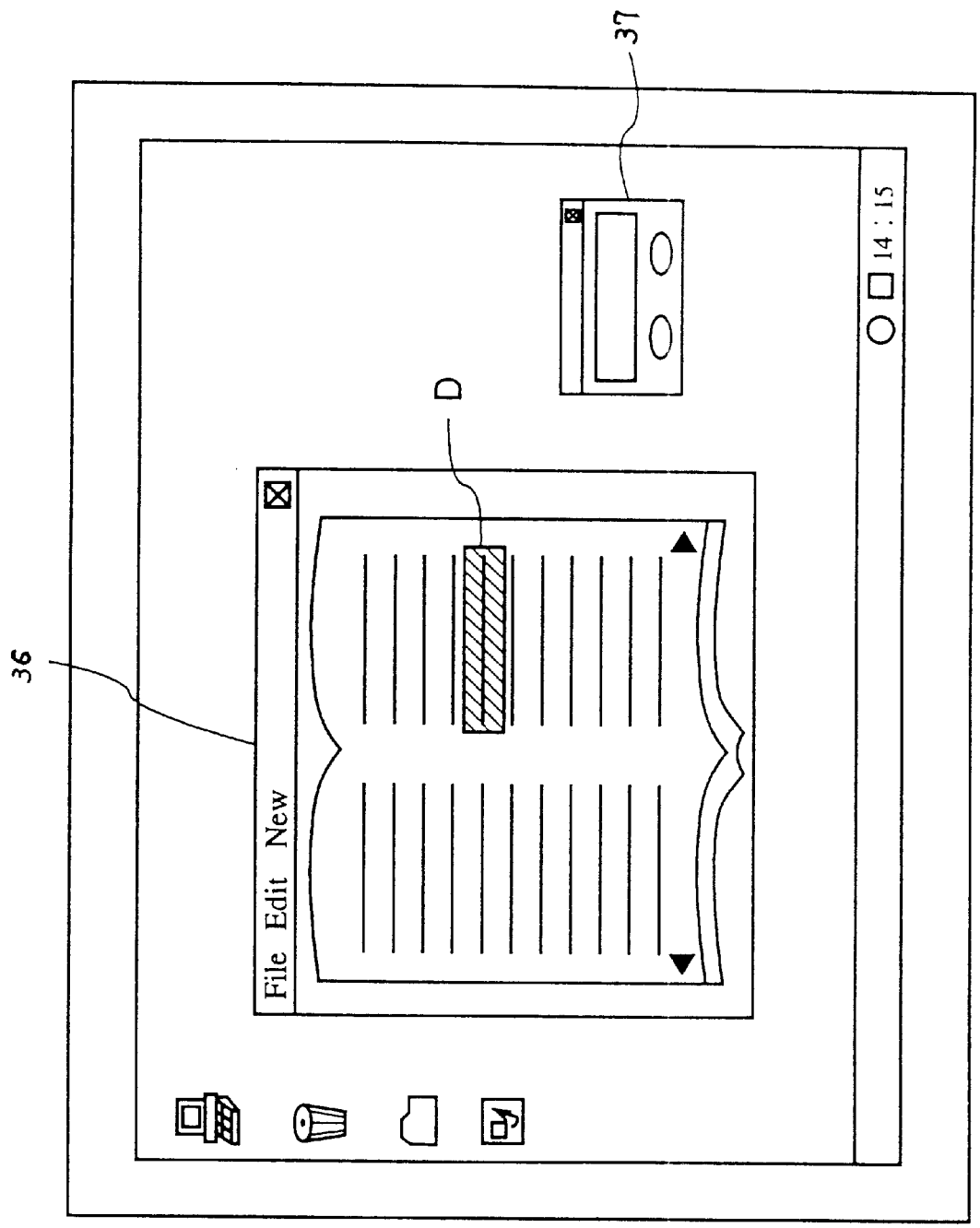

| 1: Question type→<br>2: Answer type→<br>3: Monologue→ | 1: Asking what the other party wants to eat.<br>2: Asking where the other party wants to go. |
|---|---|

Fig.54

Type: pull down
Score ◎1  ◎2  ◎3  ◎4  ◎5
      ◎+  ◎−
Sex:  ◎male  ◎female
Age Group:
  ◎Baby  ◎Child  ◎Young
  ◎Adult  ◎Middle-aged Adult  ◎Elderly

1 International Relations
2 Politics
3 Society
4 Economics
5 Industry
6 Science
7 Technology
8 Sports
9 Culture

Fig.60

1 International Relations→
2 Politics→
3 Society→
4 Economics→
5 Industry→
6 Science→
7 Technology→
8 Sports→
9 Culture→

1 Soccer
2 Tennis
3 Basketball
4 Volleyball
5 Baseball
6 Ski

DATA PROCESSING DEVICE

This Application is a continuation-in-part application filed under 37 C.F.R. § 1.53(b) of parent application Ser. No. 08/757,652, filed Nov. 29, 1996, now abandoned.

BACKGROUND OF THE INVENTION

There is nothing new about a data processing device that process data stored in databases. Indeed, there are a number of such devices that store voluminous amounts of questions and answers in databases, select questions randomly in these databases, and decide whether or not the answer selected by the user is correct. One questioning method requires the user to select the correct answer from several possible answers. This kind of study device is, however, not very efficient as it presents the user with fixed question and multiple-choice answer sets previously stored in the database which in some cases leads the user to lose his motivation to study. Of course, if each question is stored in the database with numerous answers, and the multiple-choice answer sets that the user reads are randomly selected from the answer data, then the multiple-choice answer sets are not fixed, therefore increasing the study efficiency. However, this cannot be seen as a satisfactory solution either, when the cost of labor and the time spent creating the database containing numerous answers for each question are taken into consideration.

Then there is the problem of the high cost, in general, of creating the database irrespective of the type of questioning method or of its usage as a study device.

On the other hand, with the development of large capacity memory media such as the optical disk, the magneto-optical disk, the magnetic disk etc., record media that store great amounts of data (e.g., electronic dictionaries) are now widely available on the market. Furthermore, thanks to the development of the computer network of Internet, it has also become possible to easily access a great deal of information.

OBJECT AND SUMMARY OF INVENTION

Therefore, as a result of extensive research into the means to solve these problems, the inventor has come to the conclusion that if the answer data to a certain question can be re-utilized as incorrect answer data for other questions, then it would no longer be necessary to store large amounts of multiple-choice answer sets in the database. Moreover, as it does not provide the user with fixed multiple-choice answer, the efficiency of the user's study is increased, as is his motivation.

In order to achieve the above-described objects, the educational data processing device of the present invention comprises
 a computer with a CPU, a memory system, and input and output systems;
 a DSG, stored in said memory system consisting of multiple DS where each DS consists of two types of data, a question and answer; and
 a program, stored in said memory system that performs the following functions:
  (a) selects a question and answer data from a DS, and one or more answer data from randomly selected DS in said DSG;
  (b) presents a question and multiple-choice answer set to the user through said output system. The question corresponds to the question data from the selected DS and the multiple choice answer are comprised of the answer data from the selected DS and answer data from randomly selected DS; and
  (c) determines whether the answer inputted by the user through said input system is correct or not and notifies the user of the result through said output system.

By constructing the educational data processing device this way, wrong answer data, e.g. answer data in other DS, do not become fixed; as the wrong answer data are imported from other DS, wrong answer data for each question do not need to be stored in the database.

Furthermore, as for the invention, the educational data processing device, each DS of said DSG consists of question data, one or more corresponding answer data and attribute information which shows the properties of data including the relation of question to the answer data.
Said program is equipped with:
 (a1) a function that selects question and answer data from a DS from said DSG and/or answer data from randomly selected DS, based on corresponding attribute information.

By constructing the educational data processing device this way, it is possible to select question and answer data of a certain DS and answer data from other DS according to the properties and attribute information of each data.

In addition, the invention, the educational data processing device, comprises said program equipped with the following functions:
 (d) a function that registers the number (N, where N≧2) of choices of the multiple choice answer as set and inputted by the user through said input system; and
 (a2) a function that selects question and answer data of a DS from said DSG and/or answer data from other DS (N−1) based on attribute information.

By constructing the educational data processing device this way, the user is able to adjust and set the number of choices in multiple choice answer.

Also, the invention, an educational data processing device, comprises category information indicating educational category of data and/or "Difficulty-level Information" indicating the degree of difficulty of data as attribute information of each said data. Said program is equipped with:
 (a3) a function that selects question and answer data of a DS and/or answer data from other DS based on category information and/or Difficulty-level Information.

By constructing the educational data processing device this way, it is possible to select question and multiple-choice answer set according to category information or Difficulty-level Information. When preparing questions for the user on the educational category requested by the user, for example, it is possible to parameters questions from easy to difficult. It is also possible to select incorrect answer data from the DS in the same category as correct answer data and to provide the user with harder but better multiple-choice answer sets, thereby increasing study efficiency.

The invention, the educational data processing device stores Record Information that indicates the rate of correct responses as attribute information of each said data. Said program is equipped with:
 (a4) a function that selects, question and answer data of a DS from said DSG and/or answer data from other DS based on Record Information; and
 (e) a function that updates, Record Information of the question data of a DS data, based on the number of correct responses to that answer data that the user has inputted through said input system.

By constructing the educational data processing device this way, Record Information is updated every time the user solves a practice and it is possible to select a question and multiple-choice answer set in based on this Record Information. For example, it is possible to prepare only the questions of low proficiency (questions with a low rate of correct response) or prepare questions arranged in the order of proficiency (from proficient questions to not-so-proficient questions), thereby increasing study efficiency.

The educational data processing device provides the user with question and answers according to a specified data structure (data part and attribute information part) of a DS, but it would be more convenient if the user can create additional DS. In addition, when creating additional DS, if the user can obtain information from other source, it can save trouble greatly when creating and adding DS.

The invention, an educational data processing device, comprises said program equipped with the following functions:

(f) a function that presents to the user through said output system information stored in said memory system or information from outside record media inputted through said input system; and (g) a function that narrows information to the parameters set by the User And stores it into said memory system as said DS after adding attribute information set by the user to each data.

By constructing the educational data processing device this way, it is possible to import information from other sources as a data of a DS, thereby making it easier for the user to create additional DS.

The invention, the educational data processing device, comprises said program equipped with the following functions:

(f) a function that presents to the user through said output system information stored in said memory system or information from outside record media inputted through said input system; and (h) a function that enables the user to designate the parameters of conveyed information as said data after matching conveyed information to each respective attribute using one of various designating methods. The program then adds attribute information to the designating method of each data and stores the selected data and their attribute information as said DS into said memory system.

By constructing the educational data processing device this way, it is possible to store data and their attribute information together as said DS thereby making it even easier for the user to create additional DS.

The invention, the educational data processing device, comprises said program equipped with:

(f) a function that presents to the user through said output system information stored in said memory system or information from outside record media inputted through said input system; and (h1) a function that registers various ranges of information marked by the user in different colors according to their attributes, as said data; and stores marked data paired with their respective marking colors (different marking color differentiates various attribute information) as DS into said memory system.

By constructing the educational data processing device this way, it is possible to store data and their attribute information together as said DS, thereby making it even easier for the user to create additional DS.

The invention, the educational data processing device, comprises said program equipped with:

(f) a function that presents to the user through said output system information stored in said memory system or information from outside record media inputted through said input system.

(i) a function that allows the user to set, in advance, the relationship between the form of the indicated information and the attribute information; that automatically picks out information in the parameters containing a specific form based on that corresponding relationship, and stores it as said data; adds attribute information relevant to that specific form and takes the data and the attribute information as said DS; and stores it in said memory system.

By constructing the educational data processing device this way, the program, based on the corresponding relationship, automatically picks out information in the parameters containing a specific form, making it easier for the user to create additional DS.

The invention, the educational data processing device, comprises said program equipped with:

(j) a function presenting to user through said output system the results of searches made on user selected keyword(s) for information in said memory system or information from outside record media inputted through said input system; and (k) a function that allows the user to set, in advance, the corresponding relationship of keyword to attribute information and of indicated search result to attribute information; automatically sets keyword(s) and search result(s) as said data based on that corresponding relationship; adds attribute information relevant to the data and saves the data and attribute information as said DS and stores it into said memory system.

By constructing the educational data processing device this way, the program automatically recognizes keyword and retrieval result as said data and adds the relevant attribute information to the data based on the corresponding relationship thereby making it easier for the user to create additional DS.

Said computer of the invention, the educational data processing device, is equipped with a communication control system that manages information communication through the computer network as said input system; said program is equipped with:

(f1) a function that presents to the user through said output system an information report displaying information, from computer network transmitted through said communication control system; and (g) a function that recognizes information falling within the parameters set by the User As said DS and then stores it paired with attribute information set by the user into said memory system as said DS.

By constructing the educational data processing device this way, it is possible to use a part of the information stored in other computers through network and save it as data of DS thereby making it easier for the user to create additional DS.

The text above describes the educational data processing device as it provides the user with a question and multiple-choice answer set. In addition to this type of application, however, the device also generally facilitates the construction of databases with the idea of using the information found in other sources as data and adding relevant attribute information. This was done by design.

The invention is a data processing device for collecting data comprising:

a computer with a CPU, a memory system, and input and output systems;

a program stored in said memory system and is equipped with:
  (f) a function that presents to the user through said output system information stored in said memory system or information from outside record media inputted through said input system; and
  (g) a function that narrows information to parameters set by the User And stores it into said memory system as said DS after adding attribute information set by the user to each data record.

The possible applications of the data processing device for collecting data in each Field are as described below.

The invention is a data processing device for test preparation comprising:
  a computer with a CPU, a memory system, and input and output systems;
  a DSG stored in said memory system consisting of multiple DS wherein each DS consists of a data record of a practice question and attribute information illustrating the attribute of the practice question.
  a program stored in said memory system and equipped with:
    (f2) a function that presents to user through said output system practice questions stored in said memory system or practice questions from outside record media inputted through said input system.
    (g1) a function that registers the practice questions within the parameters set by the User As a data record and paired with the attribute information set by the user for each data record, and stores them into said memory system as said DS.
    (l) a function that analyzes the trend of tests based on the attribute information of said DS.

By constructing the data processing device for test preparation this way, it is possible to use practice questions from other sources of information and to add them to the user's DS. In addition, it is possible to analyze the trend of tests based on the attribute information of the DS.

The invention of the data processing device for test preparation comprises said program equipped with:
  (m) a function that provides the user with better practice questions.

By constructing the data processing device for test preparation this way, it is possible to provide the user with better practice questions (e.g., questions asked in the entrance examination of a specific school, questions in a frequently asked Field in the entrance examination of a specific school etc.). The attribute information of each DS of said DSG contains information relating to the practice question (whether it has ever appeared on entrance exams and if so, for which school and in what Field the question has appeared, etc.).

The invention is a data processing device that also generates dialogue comprising:
  a computer with a CPU, a memory system, and input and output systems;
  a DSG, stored in said memory system consisting of multiple DS wherein each DS consists of a data record and attribute information of a dialogue sentence.
  a program stored in said memory system equipped with:
    (f3) a function that presents to the user through said output system dialogues stored in said memory system or dialogues from outside record media inputted through said input system.
    (g2) a function that registers the dialogue(s) within the parameters set by the User As a data record and in pair with the attribute information set by the user for each data record, stores them into said memory system as said DS.
    (n) a function that generates dialogues based on the attribute information of said DS.

By constructing the data processing device so as to generating dialogue this way, it is possible to use data from other sources of information as dialogue data and generate dialogue based on the attribute information of DS.

The attribute information of each DS contains information of the dialogue such as type of the sentence and/or the sex, age group and/or characteristic of character(s) in the dialogue. By constructing the data processing device for generating dialogue in this way, it is possible to generate more realistic dialogue, e.g., situation of the dialogue and the sex, age group and/or characteristic of character(s) stating the dialogue sentence.

The invention, which is also a data processing device for filing news information, comprises:
  a computer with a CPU, a memory system, and input and output systems;
  a DSG, stored in said memory system consisting of multiple DS wherein each DS consists of a data record and attribute information of the news.
  a program stored in said memory system, equipped with:
    (f4) a function that presents to the user through said output system news stored in said memory system or news from outside record media inputted through said input system;
    (g3) a function that registers the news within the parameters set by the User As a data record paired with the attribute information set by user for each data record, stores them into said memory system as said DS; and
    (o) a function to retrieve news based on attribute information of said DS.

By constructing the data processing device for filing news this way, it is possible to use data from other sources of information as news data and retrieve news effectively based on the attribute information of DS.

The attribute information of each DS of said DSG contains information of such as the Field of the news and/or the date of the news. By constructing the data processing device for news filing in this way, it is possible to file news more effectively, e.g., filing based on the Field of the news or filing based on the date of the news.

BRIEF DESCRIPTION OF THE DRAWINGS

These and other advantages and purposes of the invention will become more apparent from the following detailed description of the preferred embodiments when read in conjunction with the attached Figures in which:

FIG. 10 is a text Field of Information Viewing Window described in FIG. 9;

FIG. 27 is a text Field of Information Viewing Window described in FIG. 9;

FIG. 30 shows a Field indicating the results of search on the keyword (Field B);

FIG. 42 shows a window for adding attributes to question data;

FIG. 43 shows a pull-down menu for adding attribute information which identifies a category of a question;

FIG. 47 shows another variant of the pull-down menu described in FIG. 43. It shows a Display Unit 2 in which two windows are shown: a window displaying a set of questions and an input window in which the user can add the questions to DS as data;

FIG. 48 is a Display Unit 2 in which a window indicating a paragraph including dialogues and an input window adding the dialogue to DS as data are displayed;

FIG. 51 shows a pull-down menu for adding attribute information which identifies a suitable situation for a certain dialogue sentence;

FIG. 54 shows another variant of the window described in FIG. 50;

FIG. 58 shows a pull-down menu in which the user can add attribute information indicating a category of news;

FIG. 60 shows another variant of the pull-down menu in FIG. 58.

DETAILED DESCRIPTION OF THE PREFERRED EMBODIMENTS

I. Introduction

An educational data processing device according to a preferred embodiment of the present invention will be described with reference to appropriate figures. The structure of the educational data processing device will be classified roughly into DSG and system operation.

II. System Components

A. Hardware structure

Figure 1:
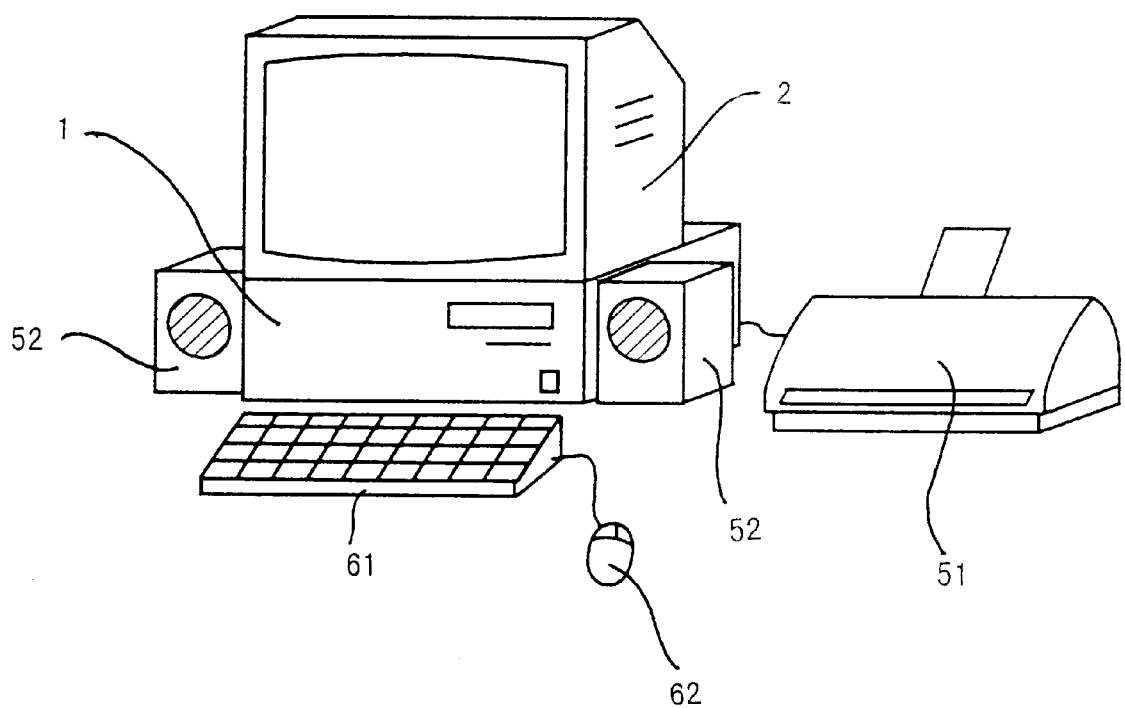
FIG. 1 shows an exterior view of the computer system for utilization of the educational device according to the present invention.

FIG. 1 shows the structure of computer system to which the present invention can be applied. The computer system is comprised of a PC 1, a Display Unit 2 as an output unit, a Printer Unit 51, an Audio Speaker 52, and a Keyboard 61 as an input unit and a Mouse 62.

Figure 2:
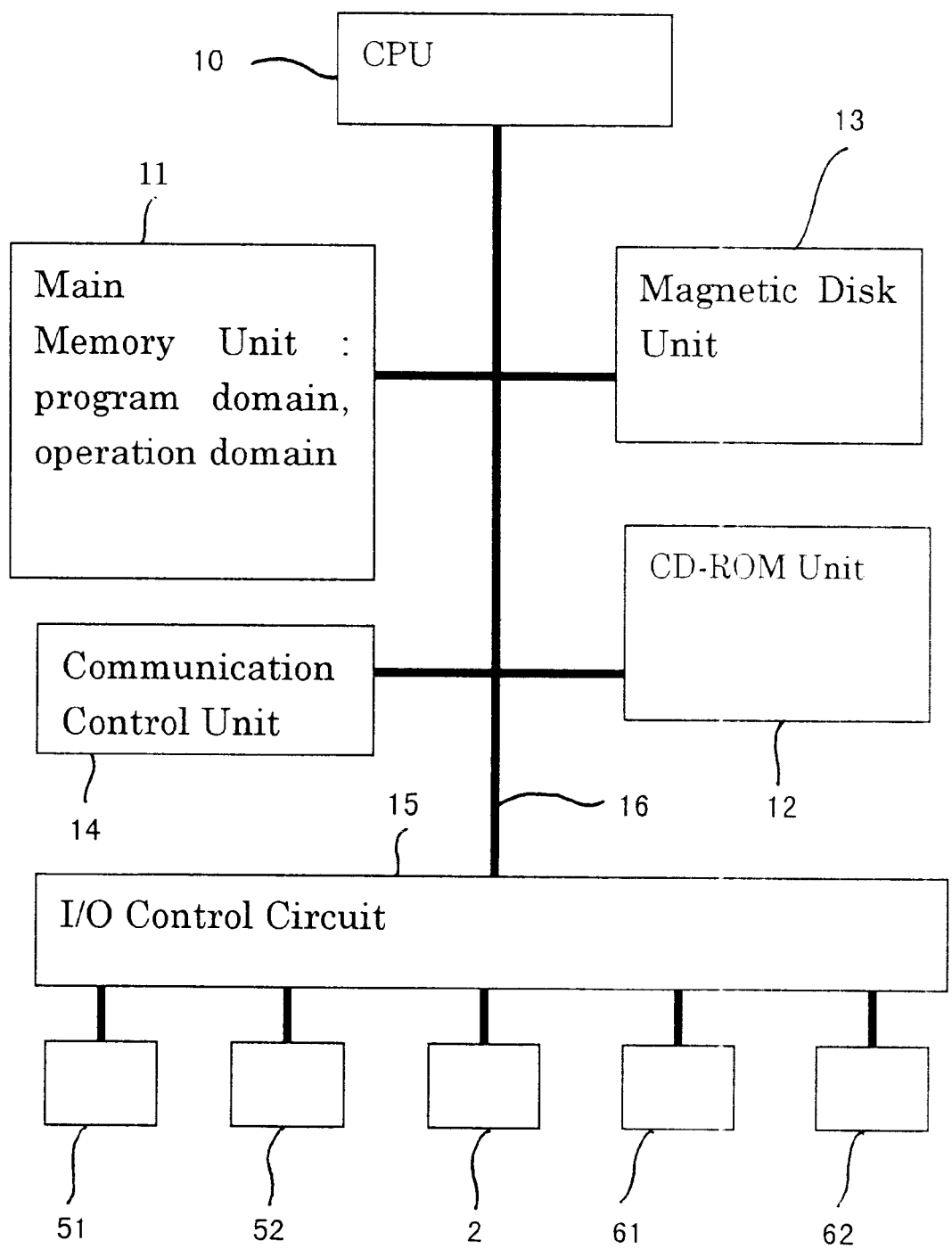
FIG. 2 shows a block diagram of the functions of the computer system described in FIG. 1.

FIG. 2 shows the function of the computer systems described in FIG. 1 by means of a block diagram. The PC 1 consists of a Main Memory Unit 11 with program domain and operation domain, CPU 10 dealing with various operation control, Magnetic Disk Unit 13 storing program and data, etc., CD-ROM and CD-ROM drive 12, Communication Control Unit 14 which allows transmission and reception of data via communication circuit and I/O Control Circuit 15 which controls various input/output units, (e.g. Display Unit 2, Printer Unit 51, Audio Speaker 52, Keyboard 61 and Mouse 62). Each unit is inter-connected with System Bus 16.

Furthermore, for the present practice example, the educational device can be used with a PC, however, workstations, video game machine etc.

B. Software structure

On the Magnetic Disk Unit 13, an OS (Operating System) is installed in order to provide an user-friendly computer environment. Windows (a registered trademark of Microsoft) and Mac OS (a registered trademark of Apple) are such examples.

The educational software of the present invention is installed on Information Viewing Means 91 as an application software of the OS. For the present practice example, software is distributed as a package item stored on a CD-ROM. However, it can also be distributed already stored on other memory media and/or distributed through various computer networks.

Figure 3:
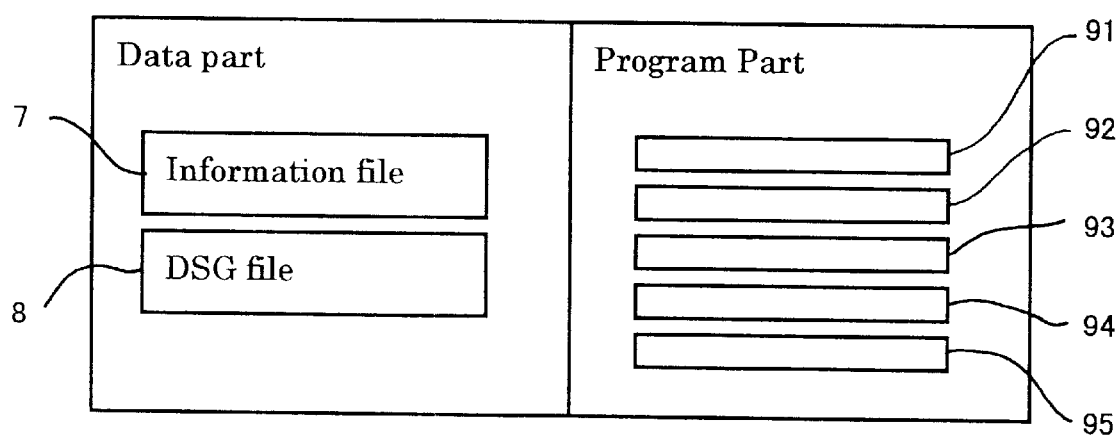
FIG. 3 shows the educational software components of the educational device of the present invention.

FIG. 3 describes the content of the educational software, roughly divided into two parts: data and program. The data part is sub-divided into the Information File 7 and the DSG (Data Set Group) File 8. The Information File 7 is a set of information on text, sound, images, animation etc. and it is comparable to data part of an electronic dictionary. DSG File 8 will be discussed below. Program part further consists of an Information Viewing Means 91, a DS (Data Set) Registering means 92, a DS Viewing Means 93, a DS Editing Means 94 and a Questioning Means 95. The Information Viewing Means 91 indicates various information of Information File 7 to user through Display Unit 22 and Audio Speaker 52 etc. Functions of the means 92~95, will be discussed below.

In the present practice example, Information File 7 and Information Viewing Means 91 each are constructed as a part of the educational software, but they can also be operated independently from the educational software. In other words, as an Information Viewing Means 91 or as an Information File 7, it can use other application programs such as an Editor, a Word Processor, a Paint application, a Draw application, an Excel; a Database or an Authoring application program etc. Moreover, the Information File 7 and Information Viewing Means 91 can be stored into the computer separately.

Figure 4:
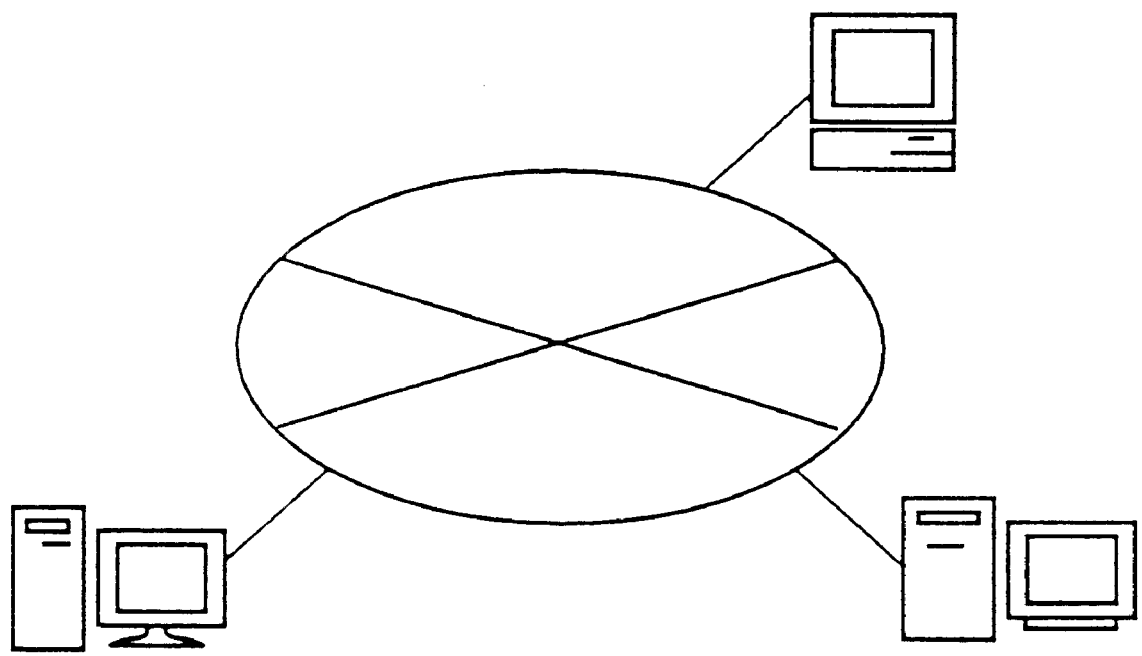
FIG. 4 shows how the information file, a part of educational software described in FIG. 3, is stored in other computers through network.

FIG. 4 is an illustration of the Information File 7 and Information Viewing Means 91, stored on multiple computers connected through computer network. When the computer network is the internet, for example, the Information File 7 is an HTML file stored on a www server and the Information Viewing Means 91 is an Internet browser. In addition to the Internet, the computer network can also be an Intranet, LAN, or WAN, either cable or radio linked.

III. Data Set Group (DSG)

Figure 5:
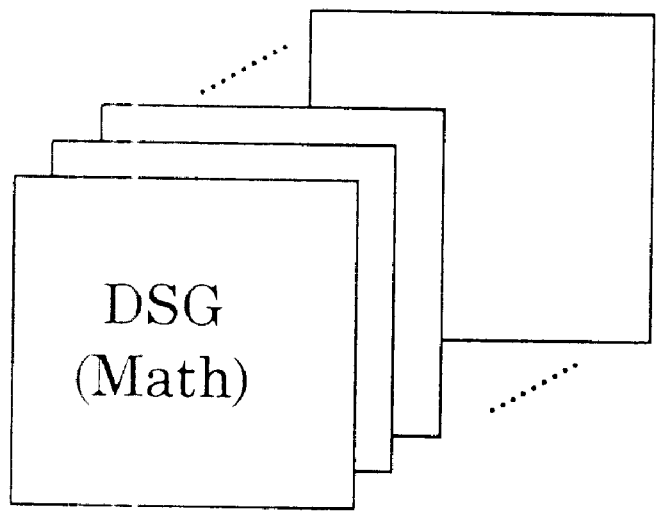
FIGS. 5(a) and 5(b) show the DSG of the educational software described in FIG. 3.
Figure 5:
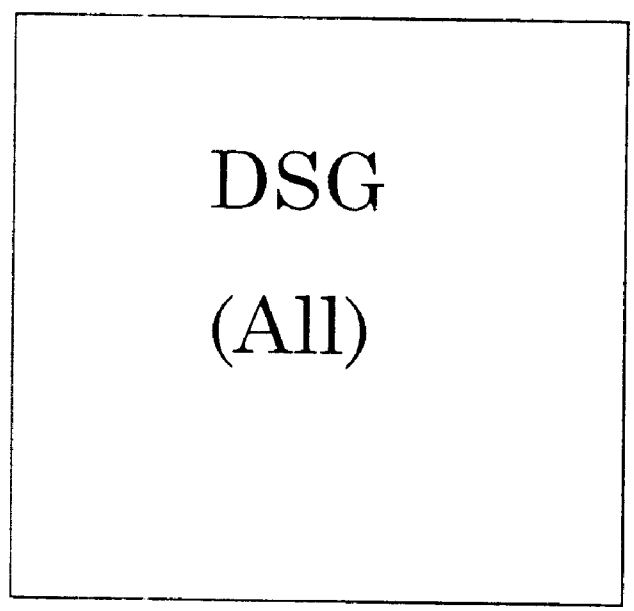

FIG. 5 shows the structure of the DSG File 8. The DSG File 8 consists of multiple DSG as shown in FIG. 5(*a*) or a single DSG as shown in FIG. 5(*b*). When a DSG file consists of multiple DSG, each DSG can be categorized according to subjects, e.g., mathematics, science and social studies and/or according grades, e.g., grade 1 of junior high school. For the present practice example, DSG are categorized according to subjects.

TABLE 1

| Data | Relation | Category | Difficulty | (A'P)Record | (B'P)Record |
|------|----------|----------|------------|-------------|-------------|
| D1   | a 1      | c 1      | d 1        | r a1        | r b1        |
| D2   | b 1      | c 1      | d 1        | r a1        | r b1        |
| D3   | c 1      | c 1      | d 1        | r a1        | r b1        |
| D4   | d 1      | c 1      | d 1        | r a1        | r b1        |
| D5   | e 1      | c 1      | d 1        | r a1        | r b1        |
| .    | .        | .        | .          | .           | .           |
| .    | .        | .        | .          | .           | .           |
| D5n-4 | a n     | c n      | d n        | r an        | r bn        |
| D5n-3 | b n     | c n      | d n        | r an        | r bn        |
| D5n-2 | c n     | c n      | d n        | r an        | r bn        |
| D5n-1 | d n     | e n      | d n        | r an        | r bn        |
| D5n   | e n     | c n      | d n        | r an        | r bn        |

Table 1 describes DSG data structure of a subject, 'cultural history' in the DSG File 8. Each data contains a Relation Information, a Category Information, a Difficulty-level Information and Record Information of each user as its attribute information.

In Table 1, a DS contains five data and their attribute information. In data 1, a name of a famous composer 'Beethoven' is stored as a text information; in data 2, a title of one of his most well-known composition, 'The Symphony 5, Movement 1' is stored as a text information; in data 3, a short introduction of Beethoven is stored as a text information; in data 4, a portrait of Beethoven is stored as a still image information; and in data 5, a part of the 'The Symphony 5, Movement 1' is stored as a sound information. A DS consists of more than two interrelated data (five in the present example). The form of data can be either in text form, still image form, sound form or animation form.

Relation Information describes the relationship between each data of a DS and between each DS. For example, the Relationship Information [1], is attached to data 1~5 in order to indicate that they belong to the same DS. Moreover, depending on the content of each data, attribute information [a], [b], [c], [d], [e] are added to data 1~5 respectively; for this particular example, the attribute information [a] is a name of the person, [b] a title of his/her work, [c] a short introduction of the person, [d] a still image related to the person and [e] a sound recording related to the person. Below, the attribute information [a], [b], [c], [d] and [e] will be referred as [Item A], [Item B], [Item C], [Item D] and [Item E].

Category Information indicates the category of each data which means each data of a DS contains an identical Category Information. The Category Information can be of a single or multiple levels. For example, if the Category Information is a one-digit number, the Category Information

[1], music category is added to each data, data 1~5. And if the Category Information is a three-digit number, the first digit can be set as [1] categorizing the data as music category, the second digit can be set as [1] categorizing the data as western music category and the last digit can be set as [2] categorizing the data as classical music and as a whole, the data can be categorized as [112].

Difficulty-level Information indicates the degree of difficulty of data and difficulty-level evaluates a question from [d1] (easy) to [d5] (difficult). It is possible to add the same Difficulty-level Information to each data of a DS as in Table 1 or to add different Difficulty-level Information to each data. For example, the same Difficulty-level Information, [d1] (easy) is added to data 1~5 of the 'Beethoven' DS in Table 1. However, if answering a name of the composer, 'Beethoven', is evaluated as 'easy' but answering his music 'Symphony 5, Movement 1' is evaluated as 'relatively difficult', it is possible to add Difficulty-level Information [d1] to data 1 and Difficulty-level Information [d4] to data 2. The Difficulty-level Information of data 3~5 can be evaluated in the same way.

Record Information indicates the number of correct responses to an answer data that each user has inputted and gets updated every time user responses a practice question. It is possible to add same Record Information to each data of a DS as in Table 1 where Record Information [ra1] is added to data 1~5 or even to add different Record Information to each data. For example, the number of correct responses to an answer data can be calculated with an equation, $R = N_{response}/N_{times}$, where R is the Record Information, $N_{response}$ is the number of correct responses to the answer and $N_{times}$ is number of times asked to the user. If a question with an answer data, data 1~5, of the DS is asked ten times and is answered correctly 7 times, the Record Information [7/10] will be added to data 1~5. It is also possible to have different Record Information for each data. For example, if the user gives a correct response to the question on the name of the composer, Beethoven, 3 times out of all 3 times asked, the rate of correct response, [3/3], becomes the Record Information of data 1. And if the user gives a correct response to the question asking the title of his music, 'Symphony 5, Movement 1' only once out of 2 times asked, the rate of correct response [1/2] becomes the Record Information of data 2. Record Information of data 3~5 can be calculated in the same way.

Each user holds his/her own Record Information as shown in Table 1; each data has separate sets of Record Information for User A (ra 1 . . . ra n) and of User B (rb 1 . . . rb n). Moreover, when a new user, User C, uses the educational device for the first time, a Record Information for User C can be created.

TABLE 2

| Item A | B | C | D | E | Category | Difficulty | (A's) Record | (B's) |
|---|---|---|---|---|---|---|---|---|
| D1 | D2 | D3 | D4 | D5 | c 1 | d 1 | ra1 | Rb1 |
| D6 | D7 | D8 | D9 | D10 | c 2 | d 2 | ra2 | Rb2 |
| . | . | . | . | . | . | . | . | . |
| . | . | . | . | . | . | . | . | . |
| . | . | . | . | . | . | . | . | . |
| D5n-4 | D5n-3 | D5n-2 | D5n-1 | D5n | c n | d n | ran | Rbn |

Table 2 is a variant of the DSG data structure in Table 1. In Table 2, Relation information is not shown but can be understood by the location of each data; data located in a same row (e.g. data 1~5) belong to a same DS. The content of data can be understood by the order of data located in the same row. For example, data located on the very left (data 1, 6, 5n-4) in Table 2 are of Item A and data on the second left (data 2, 7, 5n-3) are of Item B. In this way, the contents of other data can also be understood by the location of each data. In Table 2, Category Information, Difficulty-level Information and Record Information are added to each DS rather than to each data.

A data structure, either the data structure of Table 1 or 2, is adopted based on user's preference. If high study efficiency is preferred, data structure of Table 1 which is based on Difficulty-level Information and Record Information of each data, can be adopted and if a simpler system is preferred, data structure of Table 2 with shortened attribute information, can be adopted. Data structure shown in Table 2 will be discussed below. Needless to mention, the user is able to create and set other types of data structure.

IV. System Operations

Figure 6:
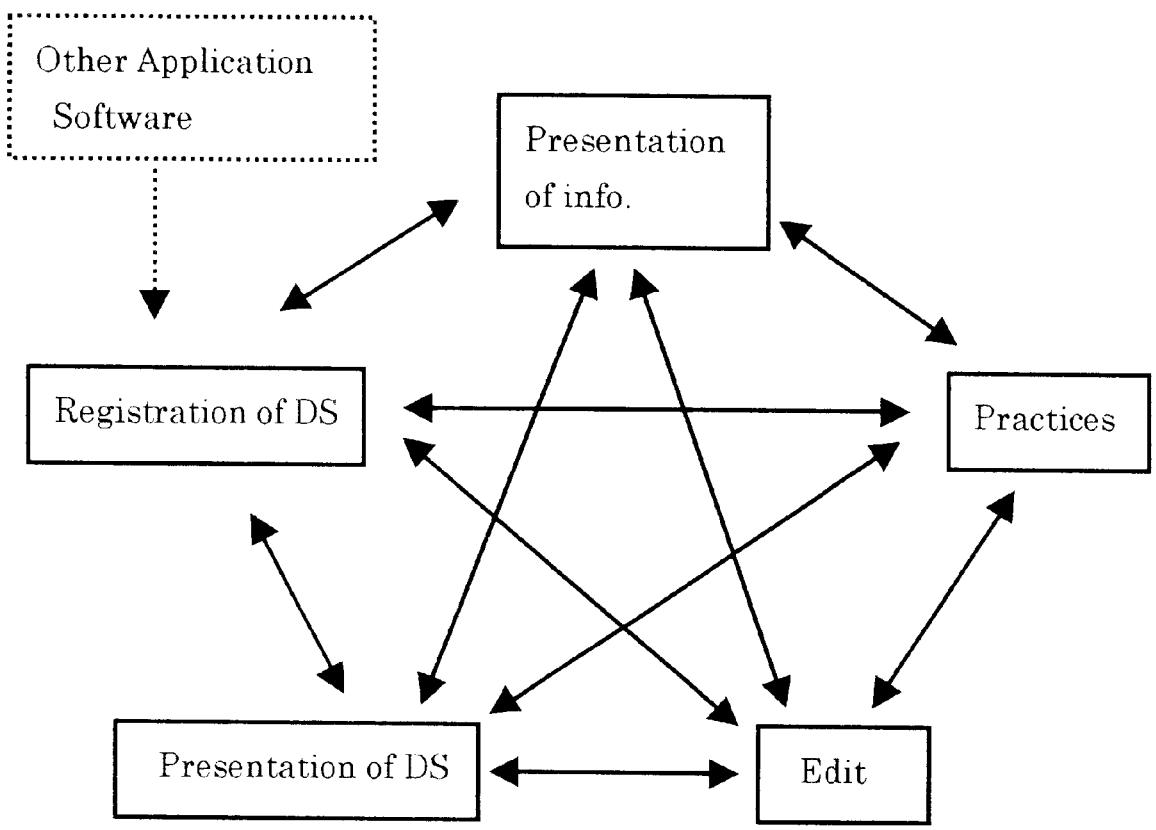
FIG. 6 shows the relationship between each function of the educational device of the present invention.

FIG. 6 shows how the functions of the educational device are interrelated. The educational device comprises a function,: ① that presents to the user educational information through various types of output unit; ② that registers the information selected by the user as a DS; ③ that presents to the user DS previously registered and DS additionally registered by the user; ④ that enables the user to edit the presented DS; ⑤ that provides practice(s) to the user based on the DS. Each function is interrelated as shown in FIG. 6. Also, the user is able to register information obtained from other application software as a DS ①', ②).

Figure 7:
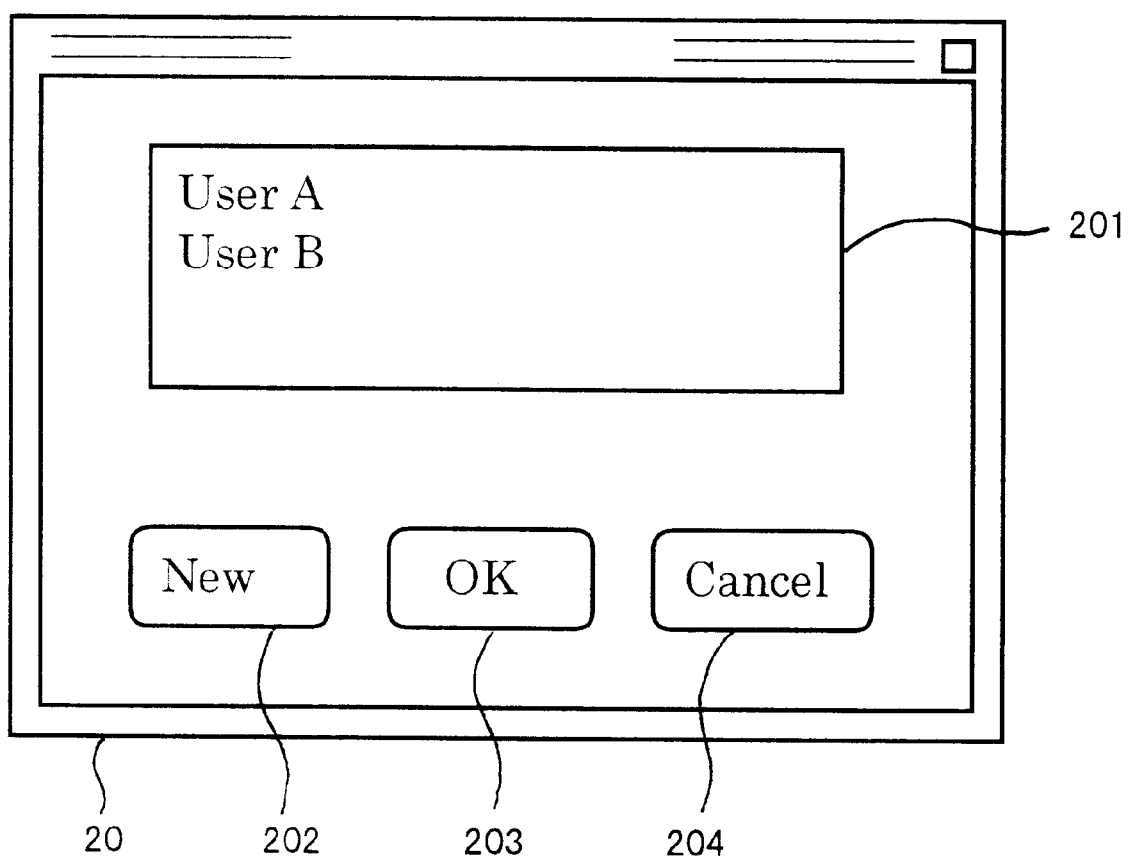
FIG. 7 shows the window in which the user can select the user data file for current session or to create a new user data file of the educational device of the present invention.
Figure 8:
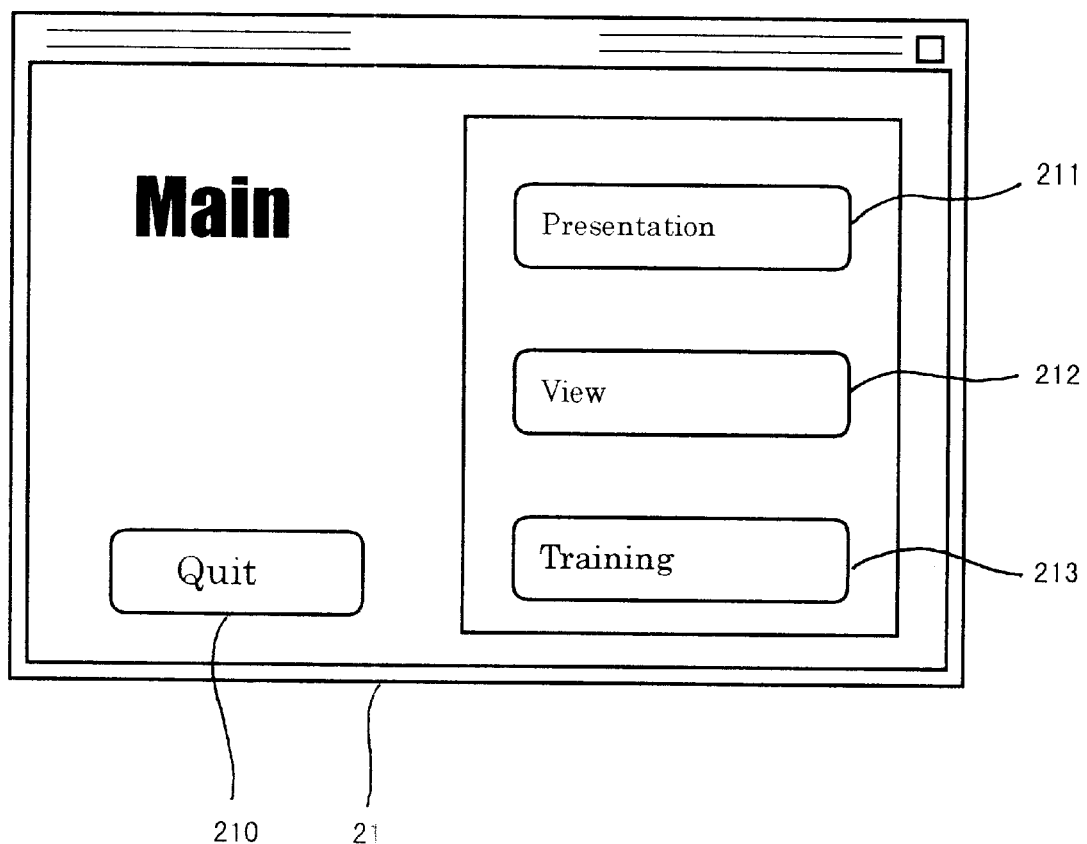
FIG. 8 shows the Main Menu Screen 21 of the educational device of the present invention.

FIGS. 7 and 8 describes a start-up program of the educational software. When starting up the educational software stored in hard disk of PC, User Registration Window 20 shown in FIG. 7 appears on the Display Unit 2. The User Registration Window 20 has a 'Field' 201 which selects a name of the registered user, a 'New' button 202 which registers a new user, an 'OK button, 203' which the user clicks when input is completed and a 'Cancel' button 204 which cancels the start-up program of the educational software.

When a registered name of the user (User A or User B) is selected from the 'Field' 201 and when the user clicks the 'OK' button 203 to register the name, the User Registration Window 20 disappears and Start-up Window 21 shown in FIG. 8 appears on the screen of Display Unit 2. On the other hand, when the 'New' button 202 is clicked, a new user name (e.g. user C) is inputted and by clicking the 'OK' button 203, Record Information of user C is added to DSG; the User Registration Window 20 disappears and Start-up Window 21 shown in FIG. 8 appears on the screen of Display Unit 2. Here, User A is selected and the 'OK button' is clicked.

FIG. 8 is a Start-up Window 21 of the educational software. The Start-up Window 21 has a 'Quit' button 210, an 'Presentation' button 211, a 'View' button 212 and a 'Training' button 213.

Written below are the descriptions of each function of the educational device (function ①~⑤).

a) Function ①: Presenting the information to the user.

Information Viewing Means 91 is responsible for the function ①. When the user clicks the 'Presentation' button 211 of the Start-up Window 21 shown in FIG. 8, the Information View Window 22 shown in FIG. 9 appears on the screen of Display Unit 2. The Information View Window 22 consists of a 'Text Field' 221 which views text information, a 'Picture Field' 222 which views picture information, a 'Main' button 223 which takes user back to the Start-up Window 21 shown in FIG. 8, a 'Register' button 224 which registers new DS, a 'Search' button 225 which takes the user to Search Window 28 described below, a 'Quit' button 226 which ends the program of the educational software, a 'Back' button 227 which takes user to the previous screen of text/picture information and a 'Forward' button 228 which takes user to the next screen of text/picture information.

The Information Viewing Means 91 selects sets of information from the Information File 7 as the user clicks either 'Back' button 227 or 'Forward' button 228. The selected text information is/are viewed in the 'Text Field' 221 and selected picture information is viewed in the 'Picture Field' 222.

Figure 10:
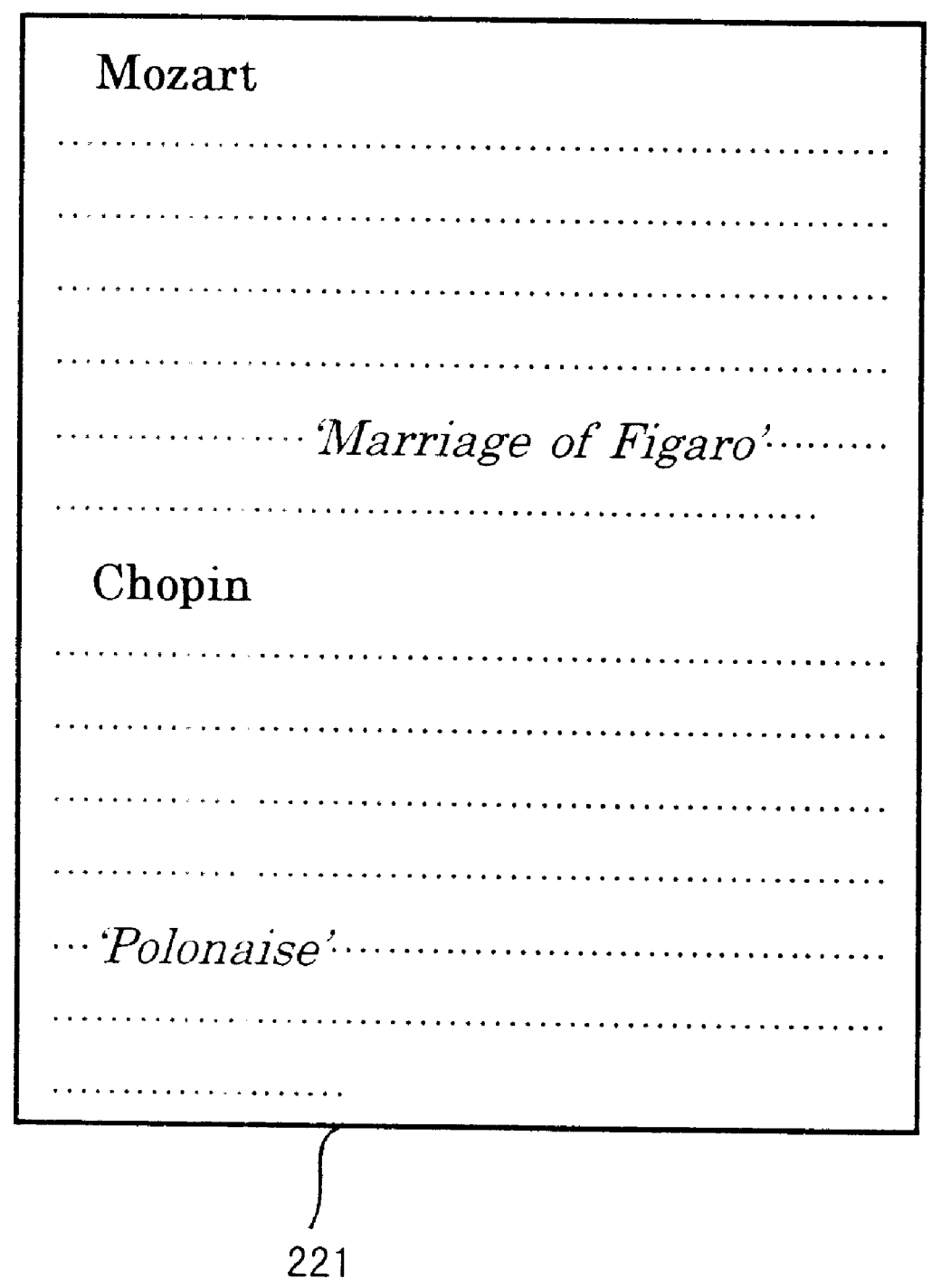

FIG. 10 is an example of text information displayed in the 'Text Field' 221. In the 'Text Field' 221, introduction paragraphs of Mozart and Chopin including the title of their works, 'Marriage of Figaro' and 'Polonaise' are displayed. The introductions are written in black with name of the composers written in bold letters and title of their works in Italic.

b) Function ②: registering DS

Figure 11:
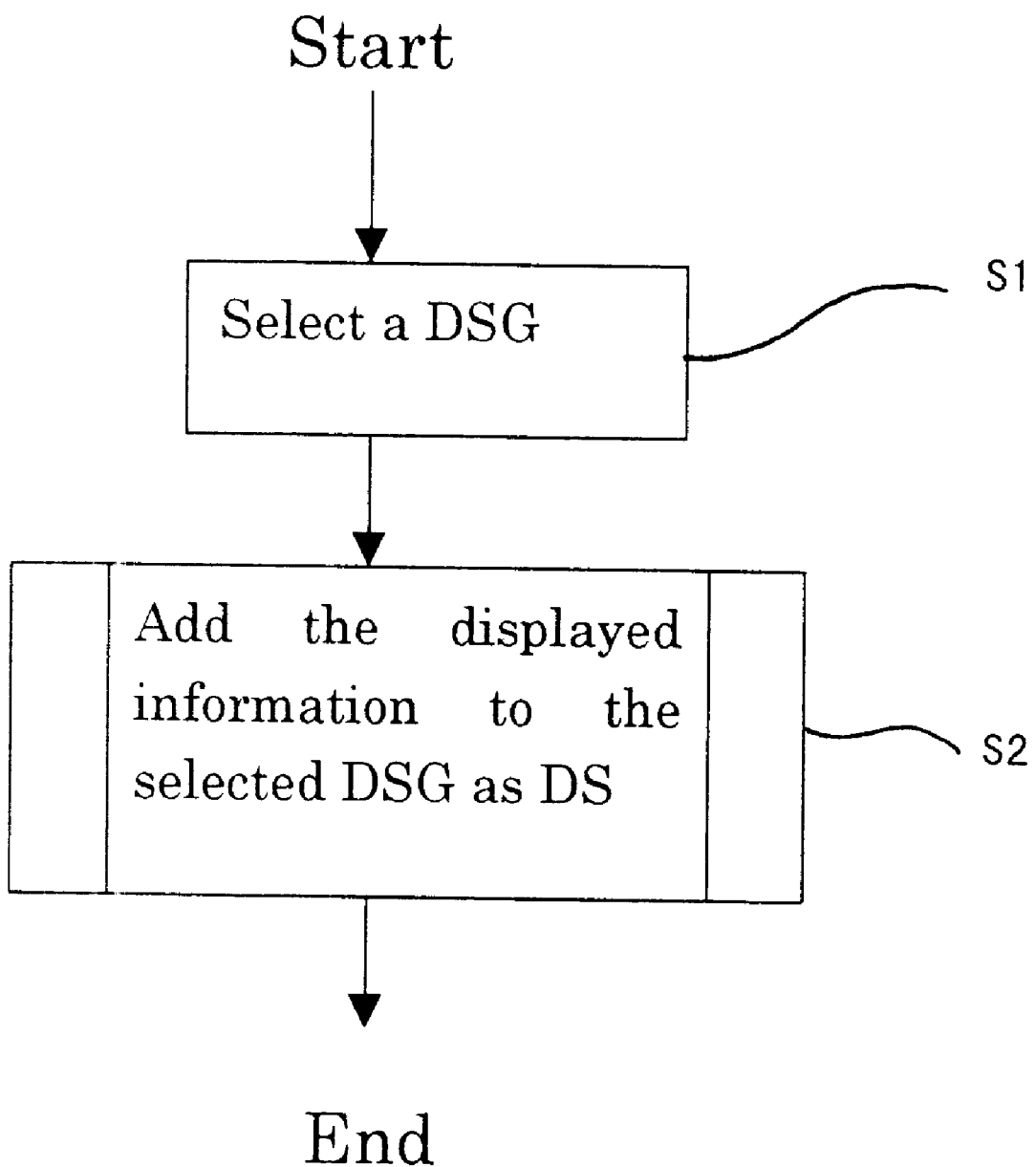
FIG. 11 shows a flow chart describing procedure of registering a new DS to DSG.
Figure 12:
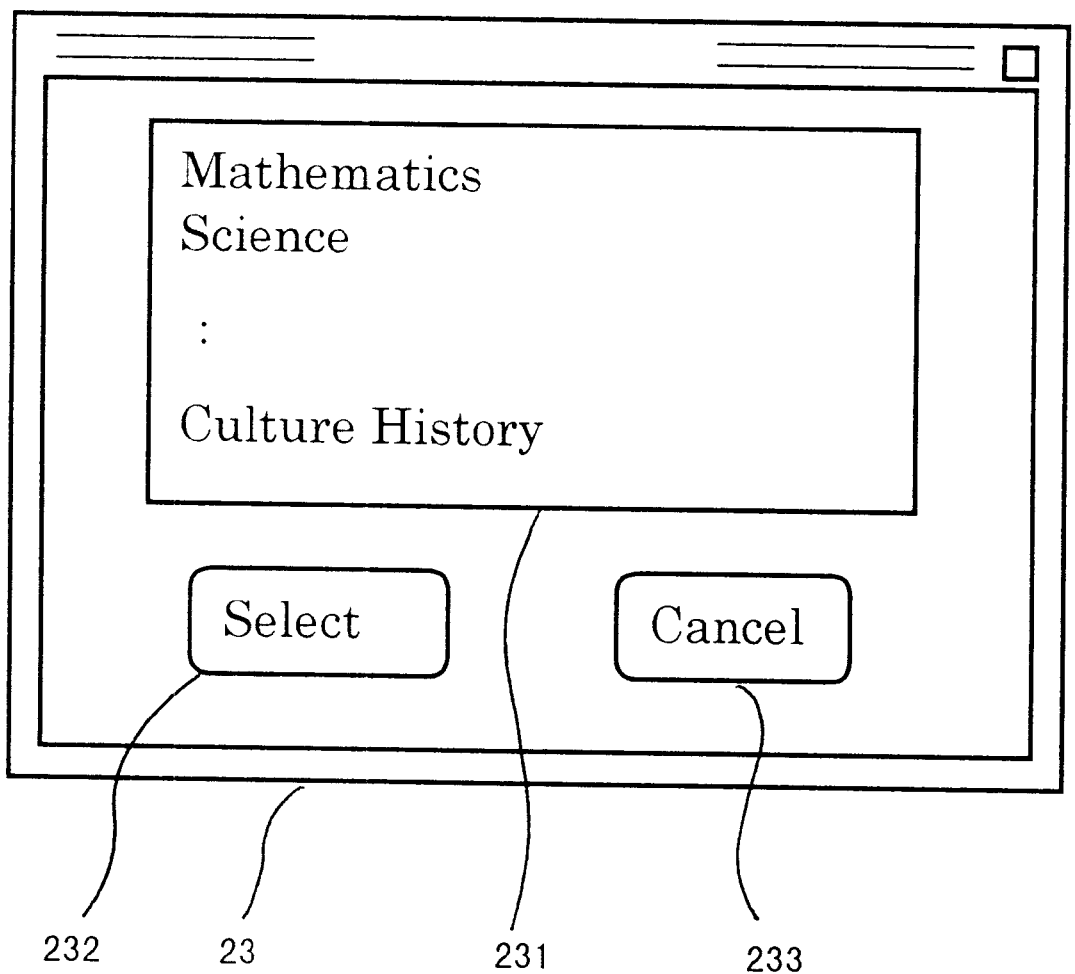
FIG. 12 shows a window for selecting a DSG when adding a new DS.

DS registration means 92 is mainly responsible for the function ②. FIG. 11 is a flow chart which describes basic procedure of DS registration. DS registration procedure begins when the user clicks the 'Register' button 224. First of all, a DSG, to which DS is to be registered, is selected (S1). Category Selection Window 23 shown in FIG. 12 appears on the screen of Display Unit 2 next to Information View Window 22. Category Selection Window 23 have a 'Select Field' 231 which lists DSG of all the subjects stored in DSG File 8 (illustrated in FIG. 5(a)), a 'Select' button 232 which allows user to select DSG and a 'Cancel' button 233 which allows user to cancel DSG selection.

The user, using a Mouse 62, clicks a subject, 'Culture History' in the present example, from various subjects listed in 'Select Field' 231 and clicks 'Select' button 232; all the DS from then on will be registered as a part of 'Culture History' DSG. There are more than one method of DS registration to DSG as described below.

Figure 13:
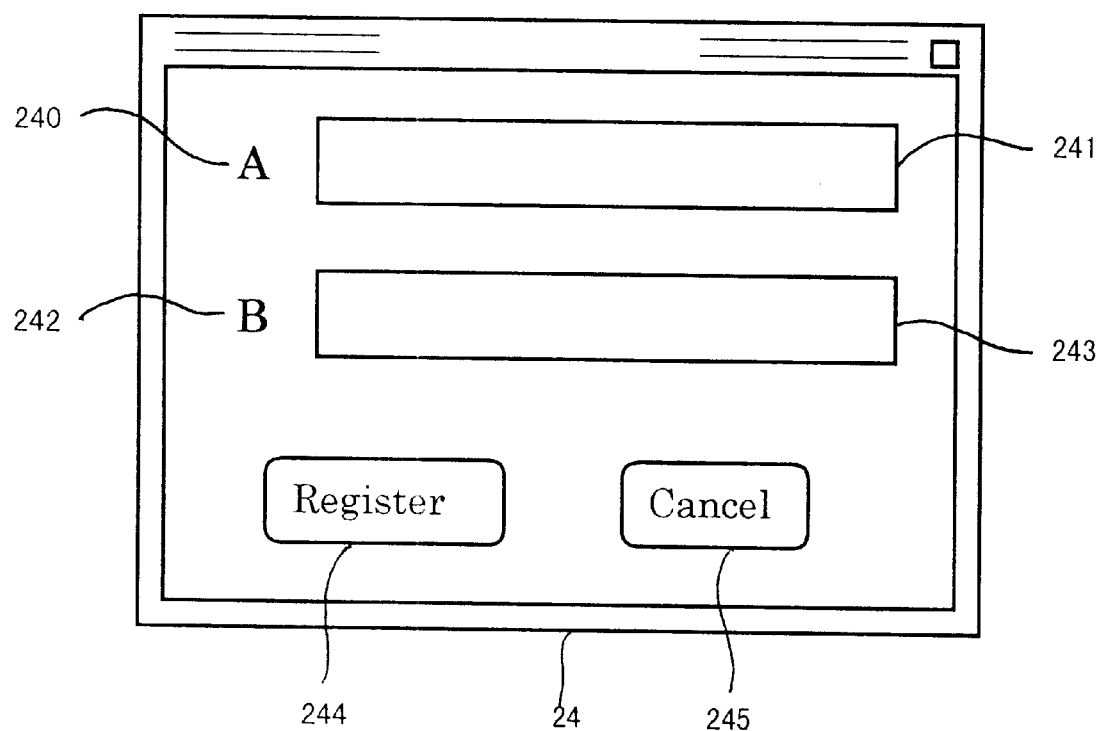
FIG. 13 shows a window for registering data to a DS.

Method 1: When user clicks a 'Select' button with a Mouse 62, Category Selection Window 23 disappears and DS Registration Window 24 appears on the screen of Display Unit 2. FIG. 13 is an illustration of DS Registration Window 24. The DS Registration Window 24 has an 'A' button 240, an 'Item A Field' 241 in which information falling under Item A of DS is inputted, a 'B' button 242, a 'Item B Field' 243 in which information falling under Item B of DS is inputted, a 'Register' button 244 which registers information inputted in Field 241 and 243 as DS and a 'Cancel' button which cancels the DS registration.

Figure 14:
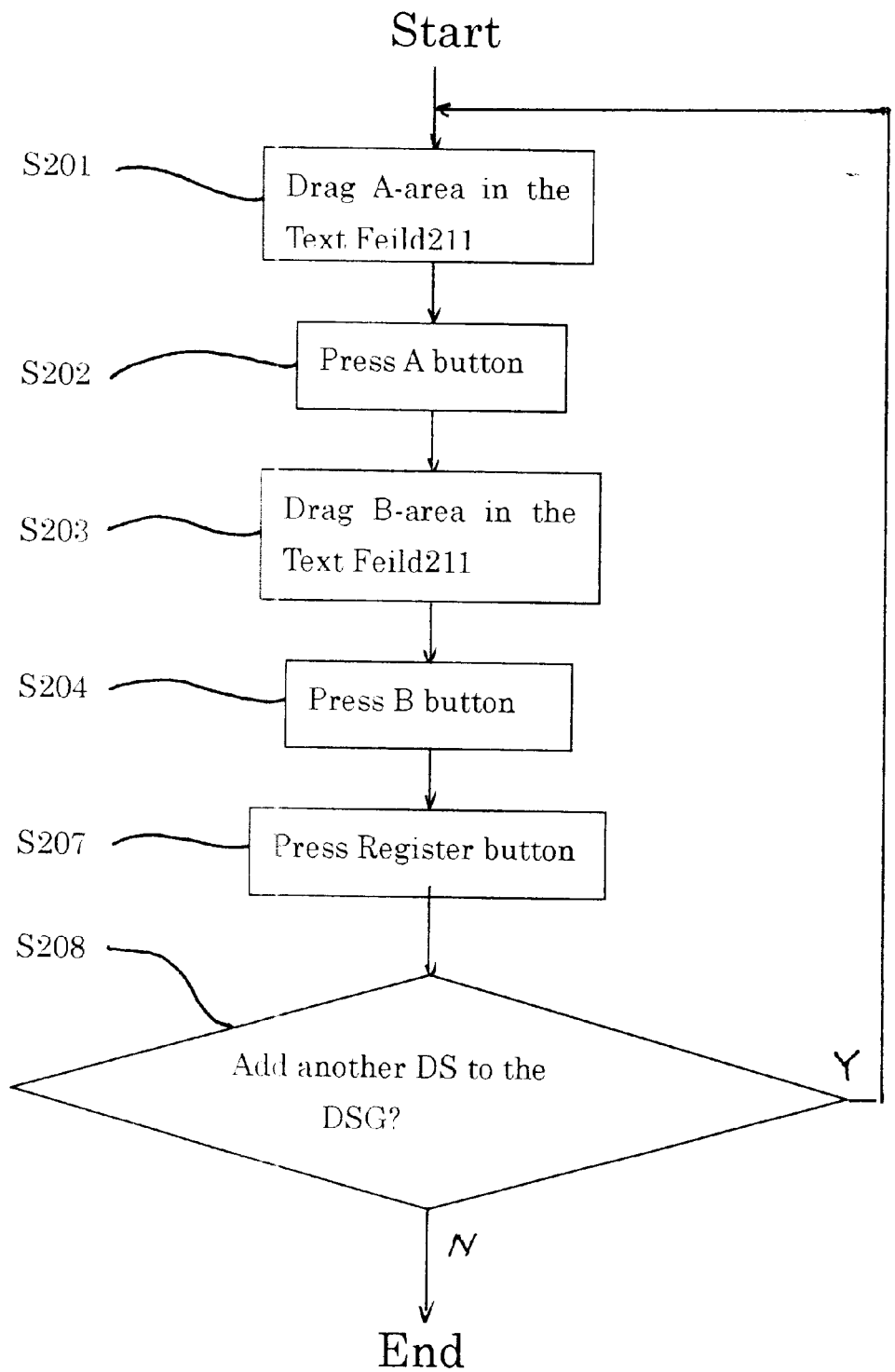
FIG. 14 shows a flow chart describing sub-procedure of the procedure described in FIG. 11.

FIG. 14 is a flow chart illustrating detailed procedure of information in 'Text Field' 221 of the Information View Window 22 being dragged to DS Registration Window 24 and registered as a DS (refer to FIG. 11, S2) to DSG (refer to FIG. 11, S1). Below explains the flow chart.

Figure 15:
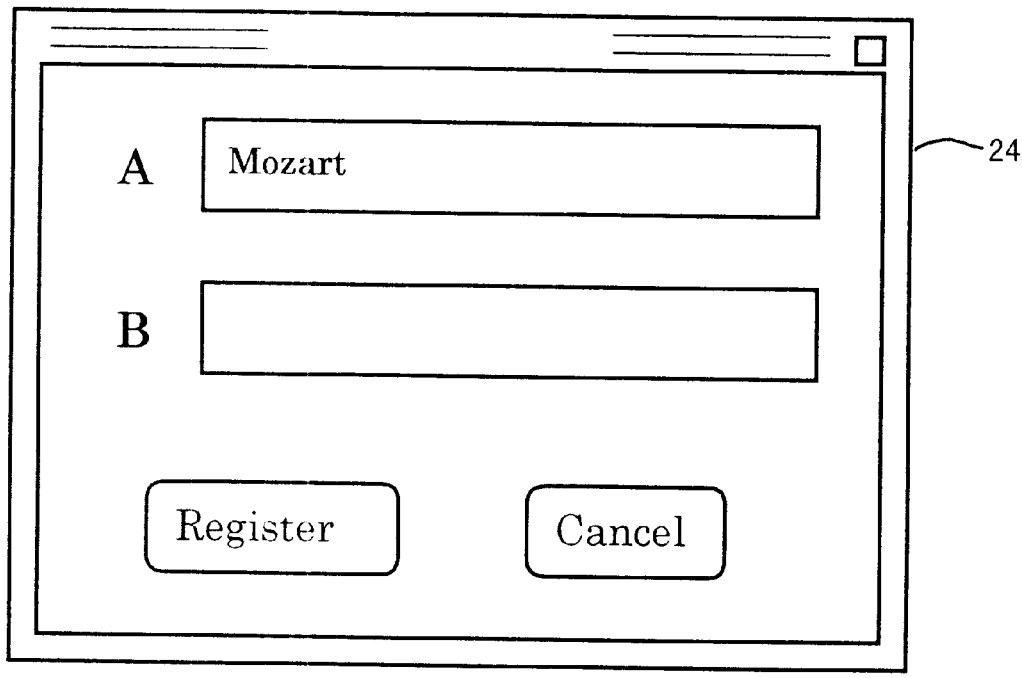
FIGS. 15(a) and 15(b) show information and data of DS being imported to the window described in FIG. 13.
Figure 15:
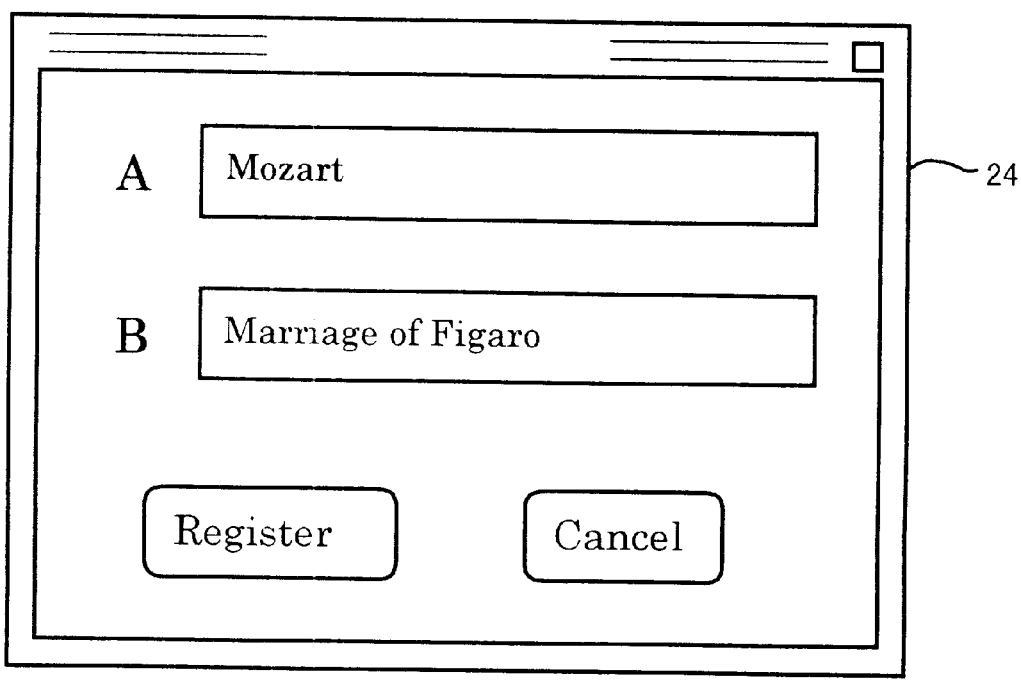

From the displayed information of the 'Text Field' 221 of the Information View Window 22, user drags information he/she finds appropriate for Item A with a Mouse 62 (S201). When 'A' button 240 of DS Registration Window 24 is clicked (S202), the dragged information of 'Text Field' 221 gets stored in 'Item A Field' 241. For example, if 'Mozart' of FIG. 10 is dragged and 'A' button 240 is clicked, 'Mozart' gets imported to 'Item A Field' 241 as shown in FIG. 15(a). Next, from the displayed information of the 'Text Field' 221 of the Information View Window 22, user drags information he/she finds appropriate for Item B with a Mouse 62 (S203).

When 'B' button 242 of DS Registration Window 24 is clicked (S204), the dragged information of 'Text Field' 221 gets stored in 'Item B Field' 243. For example, if 'Marriage of Figaro' of FIG. 10 is dragged and 'B' button 242 is clicked, 'Marriage of Figaro' gets imported to 'Item B Field' 243 as shown in FIG. 15(b).

When information are imported to 'Item A Field' and 'Item B Field' in this way, 'Register' button 244 becomes active. When user clicks the 'Register' button 244, DS of Item A, 'Mozart' and Item B, 'Marriage of Figaro' is registered in 'Culture History' DSG (S207). When 'Register' button 244 is clicked and DS gets registered, 'Item A Field' and 'Item B Field' become blank (FIG. 13).

By repeating this procedure (S201~207), multiple DS can be added to the DSG (S208). For example, it is possible to add DS of 'Chopin' as Item A and 'Polonaise' as Item B to the 'Culture History' DSG.

TABLE 3

| Item A | B | Category | Difficulty | (A's)Record | (B's) |
|--------|---|----------|------------|-------------|-------|
| D1 | D2 | c 1 | d 1 | r a1 | r b1 |
| D6 | D7 | c 2 | d 2 | r a2 | r b2 |
| . | . | . | . | . | . |
| . | . | . | . | . | . |
| . | . | . | . | . | . |
| Mozart | Marriage of Figaro | 0 | 0 | 0/0 | 0/0 |
| Chopin | Polonaise | 0 | 0 | 0/0 | 0/0 |

In Table 3, two DS are added to the 'Culture History' DSG (refer to Table 2). Item C~E are omitted in Table 3 since they were not added to DS. A line of DS in Table 3 consists of 'Mozart' as Item A, 'Marriage of Figaro' as Item B, no data for Item C~E, [0] for category information which means data is not categorized yet, [0] for Difficulty-level Information which means data is not evaluated yet and [0/0] for Record which means it has no record of use yet. Similarly, 'Chopin' as Item A, 'Polonaise' as Item B, no data for Item C~E, [0] for category information, [0] for Difficulty-level Information and [0/0] for Record Information form another DS.

In this example, attribute information such as category information and Difficulty-level Information are not added to the DS, when initially added to DSG, and need an editing; the DS editing procedure will be described below.

It is also possible to add DS with its already registered attribute information to DSG. Below is a method of adding DS with already registered attribute information to DSG.

Figure 16:
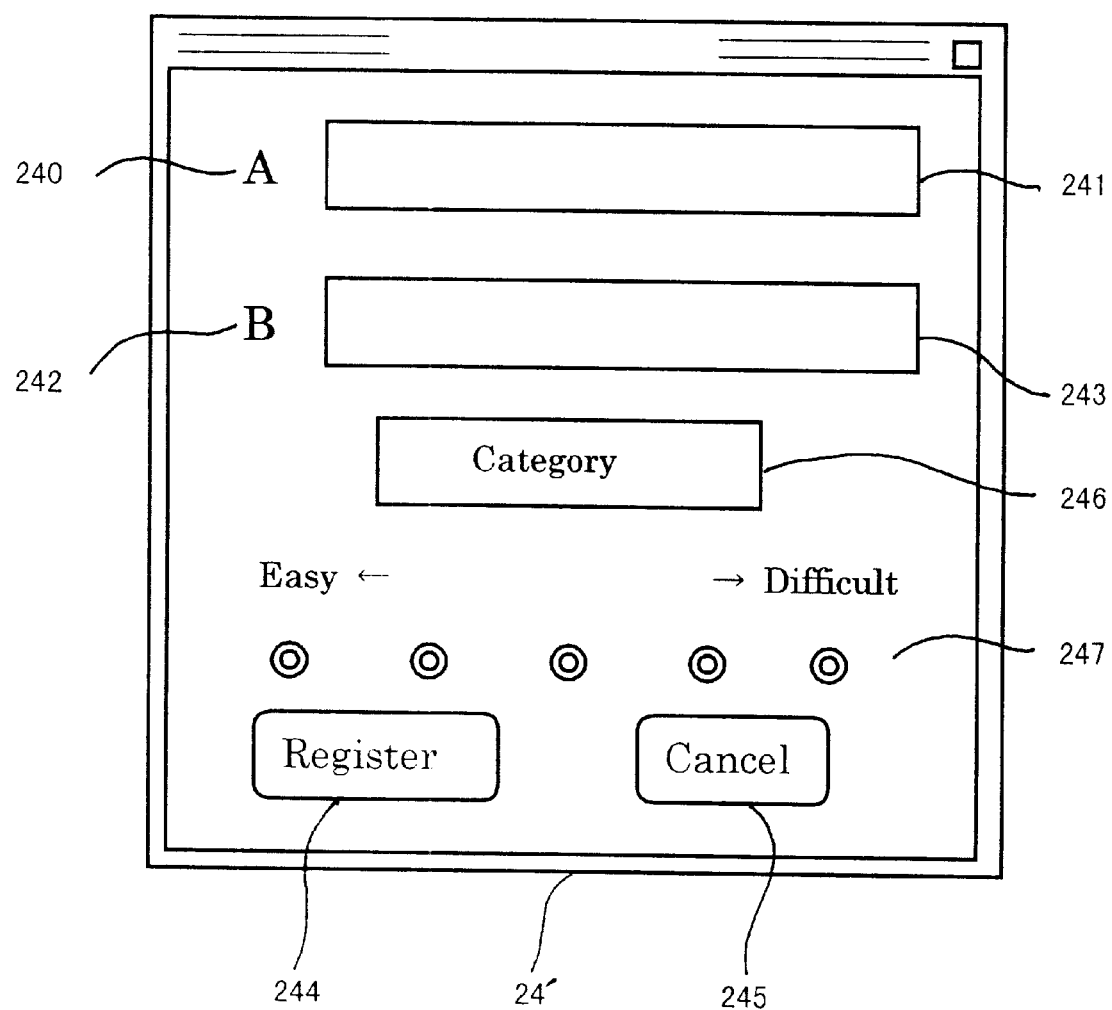
FIG. 16 shows a variant of the window described in FIG. 13.

The DS Registration Window 24' illustrated in FIG. 16 is a upgraded version of the DS Registration Window 24 in FIG. 13. In addition to all the features of the DS Registration Window 24, the DS Registration Window 24' has a 'Category' button which is a pull down menu for adding category information to the data of 'Item A Field' 241 and 'Item B Field' 243, and five radio buttons 247 (a~e from left to right) for adding Difficulty-level Information to data.

Figure 17:
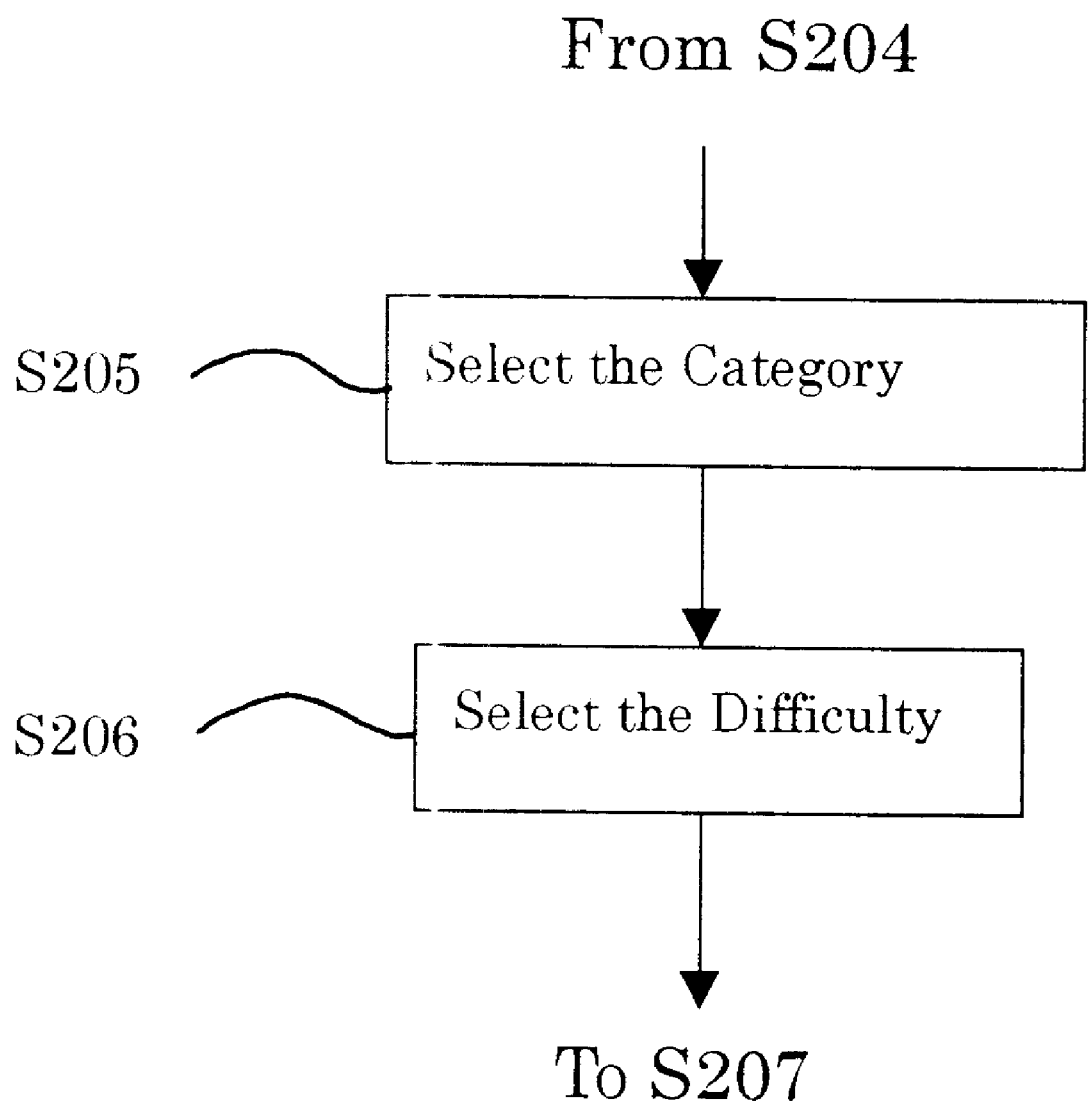
FIG. 17 shows a flow chart describing sub-procedure of the procedure described in FIG. 11.

FIG. 17 is additional procedure to the procedure described in FIG. 14. In the stage S204 of FIG. 14, information are imported from 'Text Field' 221 to 'Item A Field' 241 and 'Item B Field' 243 of DS Registration Window 24'. For example, 'Mozart' is imported to 'Item A Field' 241 and 'Marriage of Figaro' to 'Item B Field' 243.

Figure 18:
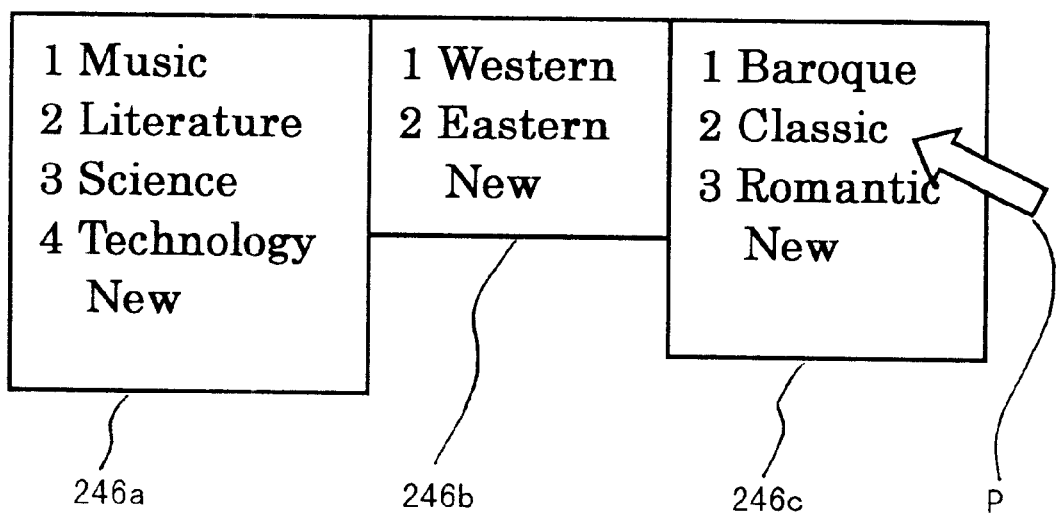
FIG. 18 shows a pull-down menu whereby the user can add attribute information to data of a DS.

FIG. 18 is an illustration of a pull down menu which appears when 'Category' button 246 is clicked with a Mouse 62. A main category menu of the 'Culture History' DSG (246a) appears and since the imported information ('Mozart', 'Marriage of Figaro') are categorized as music, user selects [1 Music] from the menu. Next, a sub-category menu 246b appears and since the imported information are of Western music, user selects [1 Western (music)] from the menu. Next, a minor category menu 246c appears and since the imported information are of classical music, user selects [2 Classic] from the menu (S205).

In the category menu 246a~c, there is an item called 'New' which allows user to create a new category of DSG. For example, if imported information is [Debussy], since the present minor-category menu 246c does not provide an appropriate category, the user selects 'New', create a new category, [4 Impressionist] in the menu and select the new added category.

Next, the user selects the difficulty-level of imported information (S206). For example, when imported information is a relatively well-known one, such as 'Mozart' and 'Marriage of Figaro', user can click radio button 247a with a Mouse 62 and select 'easy' as their Difficulty-level Information.

The following procedure is identical to that of explained in FIG. 14. By repeating this procedure (S201~207), multiple DS can be added to the DSG (S208). For example, it is possible to import 'Chopin' to Item A and 'Polonaise' to Item B from the 'Text Field' 221, select [1 Music] from the main category menu 246a, select [1 Western (music)] from the sub-category menu 246b, select [3 Romantic] from the minor category menu 246c and click radio button 246b for Difficulty-level Information.

TABLE 4

| Item A | B | Category | Difficulty | (A's)Record | (B's) |
|---|---|---|---|---|---|
| D1 | D2 | c 1 | d 1 | r a1 | r b1 |
| D6 | D7 | c 2 | d 2 | r a2 | r b2 |
| . | . | . | . | . | . |
| . | . | . | . | . | . |
| . | . | . | . | . | . |
| Mozart | Marriage of Figaro | 112 | 1 | 0/0 | 0/0 |
| Chopin | Polonaise | 113 | 2 | 0/0 | 0/0 |

In Table 4, two DS are added to the 'Culture History' DSG (refer to Table 2). Item C~E are omitted in Table 3 since they were not added to DS. A line of DS in Table 4 consists of 'Mozart' as Item A, 'Marriage of Figaro' as Item B, no data for Item C~E, [112] for category information indicating that the data is a Western classical music, [1] for Difficulty-level Information which means data is evaluated as easy and [0/0] for Record Information which means it has no record of use yet. Similarly, the second line consists of 'Chopin' as Item A, 'Polonaise' as Item B, no data for Item C~E, [113] for category information which means data is a Western Romantic music, [2] for Difficulty-level Information which means data is evaluated as relatively easy and [0/0] for Record Information form another DS.

Figure 19:
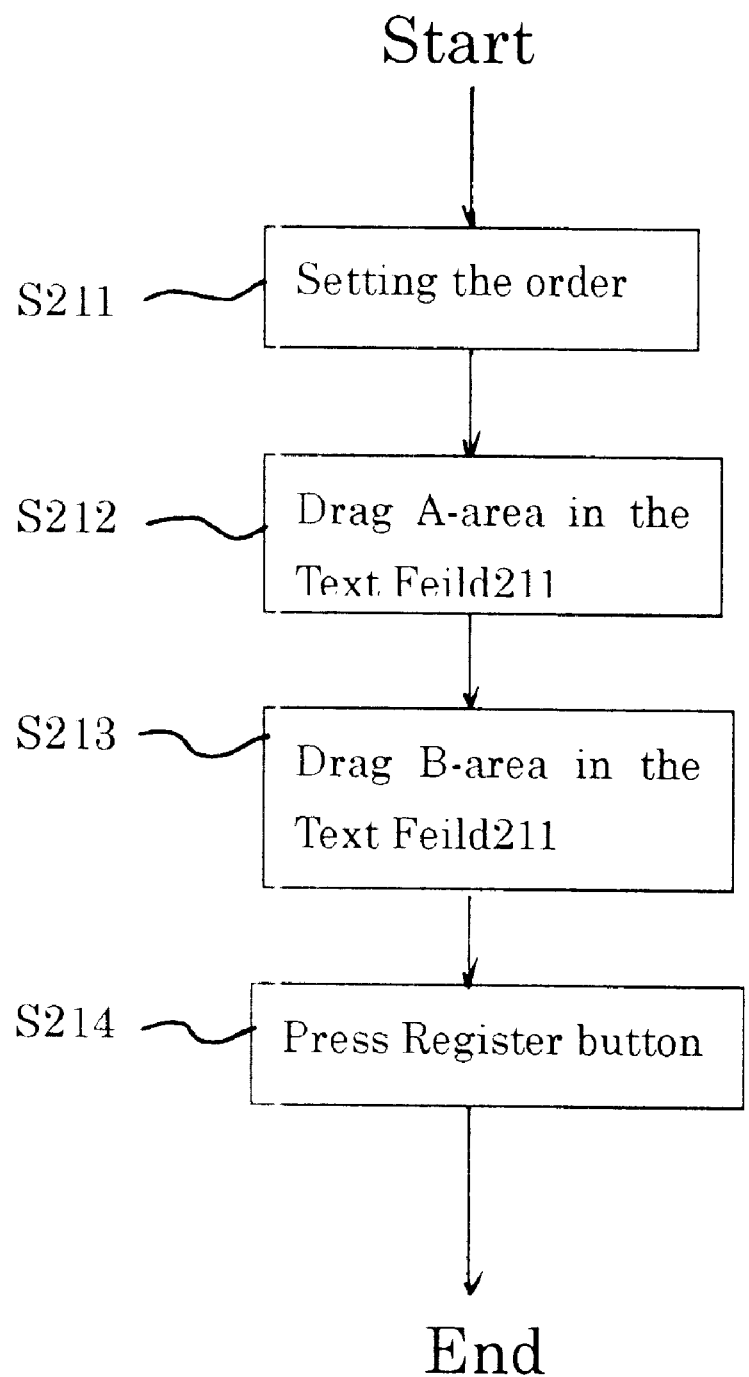
FIG. 19 shows a part of flow chart describing sub-procedure of the procedure described in FIG. 11.

Method 2: FIG. 19 is a flow chart illustrating a detailed procedure of information in 'Text Field' 221 of the Information View Window 22 being dragged to DS Registration Window 24 and registered as a DS (refer to FIG. 11, S2) to DSG (refer to FIG. 11, S1). Below explains the flow chart.

Figure 20:
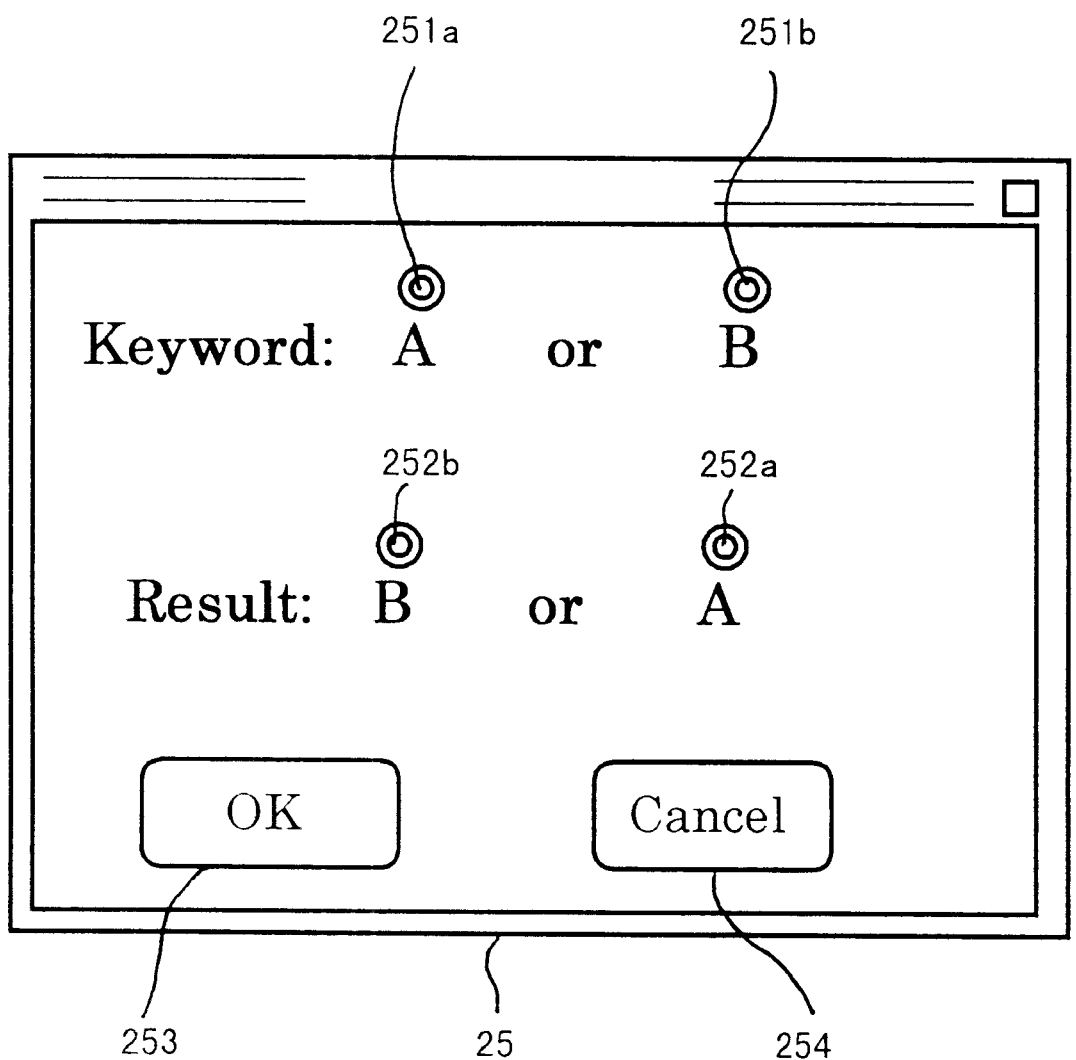
FIG. 20 shows a window in which the user can set up an order of the selected data and relevant information added to the data.

When user clicks the 'Select' button 232 of Category Selection Window 23 with a Mouse 62, Category Selection Window 23 disappears and a new window, Item Selection Window 25 appears on the screen of Display Unit 2. The Item Selection Window 25 shown in FIG. 20 displays radio button 251a and 251b setting the first designated information to either Item A or Item B, radio button 252b and 252a setting the second designated information to either Item B or Item A, an 'OK' button 253 which consents the setting and a 'Cancel' button 254 which cancels the procedure.

By clicking radio button 251a, 251b, 252b and/or 252a with a Mouse 62, the user sets an order of selecting information in Text Field 221 and an item (Item A or B) to which selected information gets imported according to the order set by the user (S211). For example, if the user wants to set the first selected set of information as Item A and second selected set of information as Item B, he/she can click radio button 251a and 252b and then click 'OK' button 253 with a Mouse 62. When 'OK' button 253 is clicked Item Selection Window 25 disappears and DS Registration Window 24 shown in FIG. 13 appears on the screen of Display Unit 2.

From the displayed information of the 'Text Field' 221, Information View Window 22, user drags information he/she finds appropriate for Item A with a Mouse 62 (S212) and imports the dragged information of the 'Text Field' 221 to the 'Item A Field' 241. For example, if 'Mozart' of FIG. 10 is dragged, 'Mozart' gets imported to 'Item A Field' 241 as shown in FIG. 15(a). Next, from the displayed information of the 'Text Field' 221, Information View Window 22, user drags information he/she finds appropriate for Item B with a Mouse 62 (S203).

Next, from the displayed information of the 'Text Field' 221, Information View Window 22, user drags information he/she finds appropriate for Item B with a Mouse 62 (S213) and imports the dragged information of 'Text Field' 221 to 'Item B Field' 243. For example, if 'Marriage of Figaro' of FIG. 10 is dragged and 'B' button 242 is clicked, 'Marriage of Figaro' gets imported to 'Item B Field' 243 as shown in FIG. 15(b).

When information are imported to 'Item A Field' 241 and 'Item B Field' 243 in this way, the 'Register' button 244 becomes active. When the user clicks the 'Register' button 244, DS of Item A, 'Mozart' and Item B, 'Marriage of Figaro' gets registered in the 'Culture History' DSG (S214).

Figure 21:
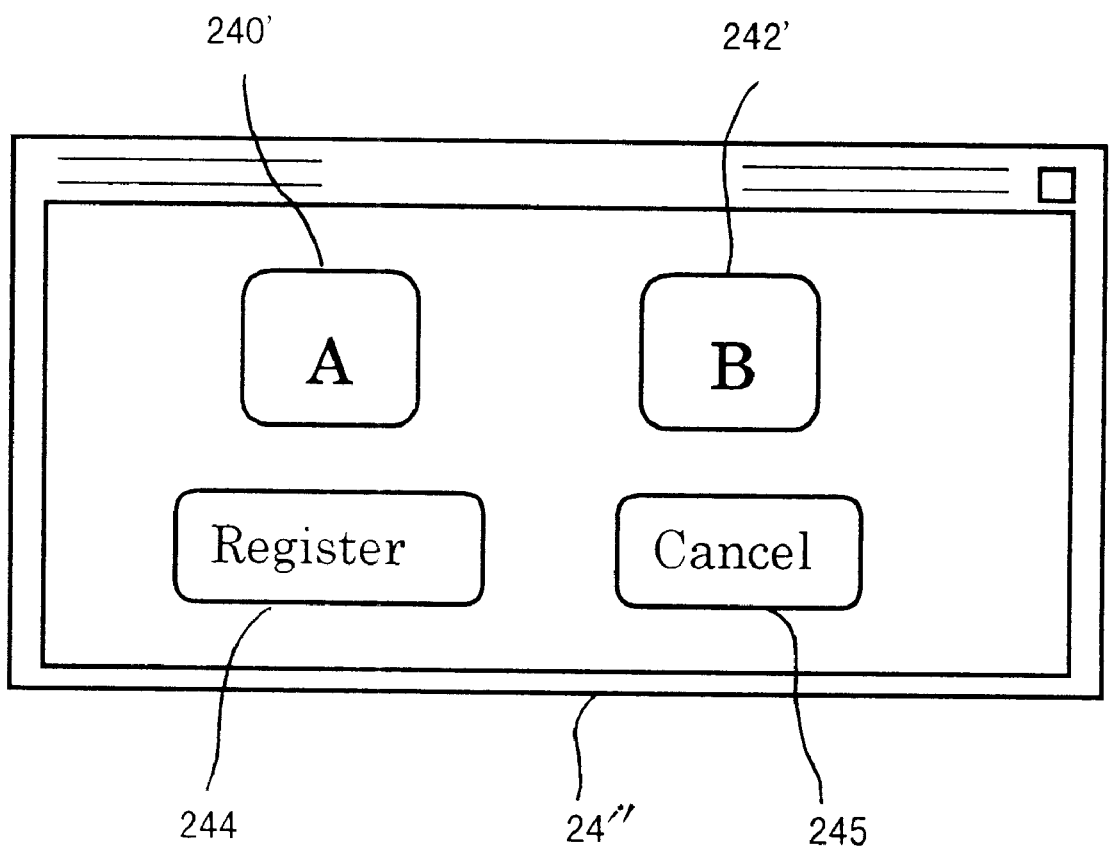
FIG. 21 is another variant of the window described in FIG. 13.

It is also possible to use a variation of DS Registration Window 24, DS Registration Window 24" illustrated in FIG. 21. Unlike the DS Registration Window 24 of FIG. 13, the DS Registration Window 24" has no 'Item A Field' 241 and 'Item B Field' 243 but consists of 'A' and 'B' button which can be changed into different colors, e.g. red for Item A, blue for Item B.

For example, when 'Mozart' is dragged from the 'Text Field' 221 to the DS Registration Window 24", the dragged information and 'A' button turn into the color for Item A, red, indicating that 'Mozart' is set as Item A. Next, when 'Marriage of Figaro' is dragged, the dragged information and 'B' button turn into the color for Item B, blue, indicating that 'Marriage of Figaro' is set as Item B. Same applies to 'Chopin' and 'Polonaise'.

Figure 22:
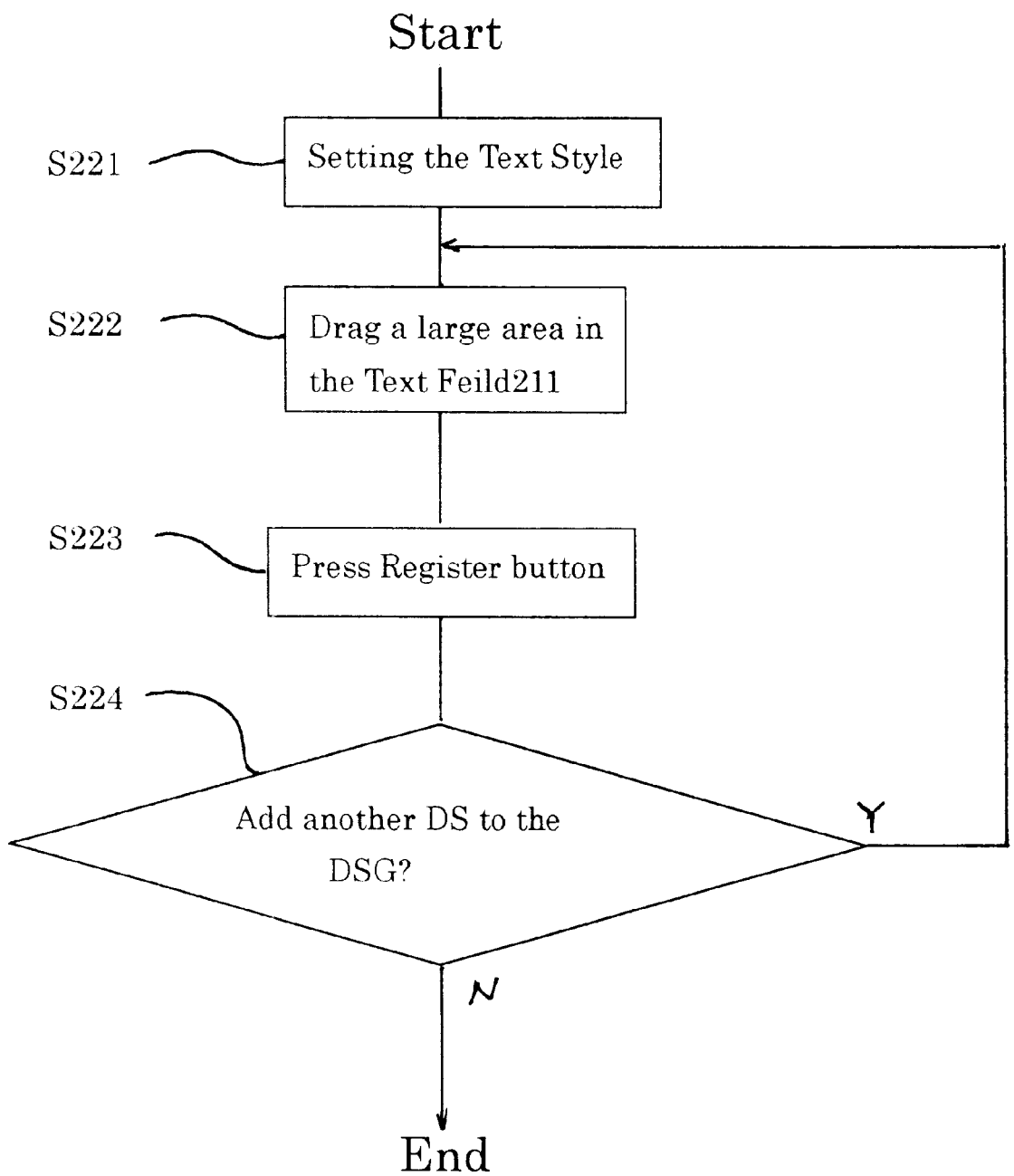
FIG. 22 shows a flow chart describing sub-procedure of the procedure described in FIG. 11.

Method 3: FIG. 22 is a flow chart illustrating a detailed procedure of information in 'Text Field' 221, Information View Window 22 being dragged to DS Registration Window 24 and registered as a DS (refer to FIG. 11, S2) to DSG (refer to FIG. 11, S1). Below explains the flow chart.

Figure 23:
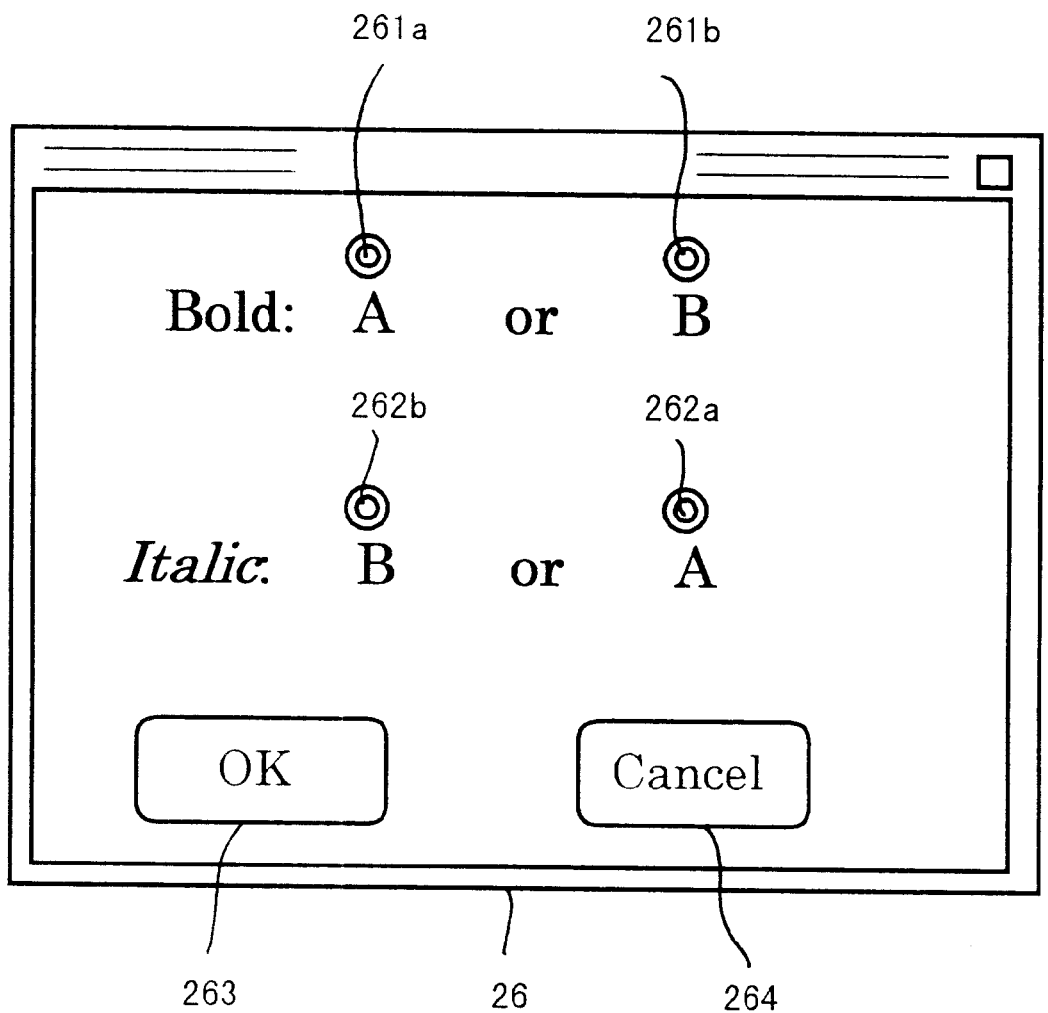
FIG. 23 shows a window in which the user can set relationship of selected data and relevant information added to the data.

When user clicks 'Select' button 232 of Category Selection Window 23 with a Mouse 62, Category Selection Window 23 disappears and a new window, Text Style Window 26 appears on the screen of Display Unit 2. The Text Style Window 26 shown in FIG. 23 displays radio button 261a and 261b setting the bold letters as either Item A or Item B, radio button 252b and 252a setting the Italic letters as either Item B or Item A, 'OK' button 253 which consents the setting and 'Cancel' button 254 which cancels the setting procedure.

By clicking the radio button 261a in Text Style Window 26 with a Mouse 62, the user can set up the text style (bold letters or Italic) of information of the 'Text Field' 221 and the item (Item A or Item B) to which information of each text style gets imported (S221). For example, if the user wants to import the information written in bold letters to Item A and the information written in Italics to Item B, he/she can click radio button 261a and 262b and click the 'OK' button 263 with a Mouse 62. When the 'OK' button 263 is clicked, Text Style Window 26 disappears and DS Registration Window 24 shown in FIG. 13 reappears on the screen of Display Unit 2.

From the displayed information of the 'Text Field' 221, Information View Window 22, user drags a range of information where information in bold letters for Item A and information in Italics for Item B are included with a Mouse 62 (S222); from the dragged range of information of 'Text Field' 221, information in bold letters gets imported to 'Item A Field' 241 and information in Italic to 'Item B Field' 242. For example, if introduction of Mozart including 'Mozart' and 'Marriage of Figaro' (refer to FIG. 10) is dragged, 'Mozart' automatically gets imported to 'Item A Field' 241 and 'Marriage of Figaro' to 'Item B Field' 243 as shown in FIG. 15(b).

When information are imported to 'Item A Field' 241 and 'Item B Field' 243 like this, the 'Register' button 244 becomes active. When user clicks the 'Register' button 244, DS of Item A, 'Mozart' and Item B, 'Marriage of Figaro' gets registered in the 'Culture History' DSG (S223).

If user drags another range of information from 'Text Field' 221, Information View Window 22 to DS Registration Window 24, 'Item A Field' 241 and 'Item B Field' 243 of DS Registration Window 24 becomes blank and DS Registration Window 24 returns to that of FIG. 13. By repeating this procedure (S222~S223), multiple DS can be added to the DSG (S223). For example, if introduction of Chopin including 'Chopin' and 'Polonaise' (refer to FIG. 10) is dragged (S222) and 'Register' button is clicked (S223), user can store another DS with 'Chopin' as Item A and 'Polonaise' as Item B into DSG. In the above example, each DS is added to DSG one by one. But it is also possible to add multiple DS to DSG at once.

The method can be implemented if user sets up the text style (bold letters or Italic) of information of 'Text Field' 221, the item (Item A or Item B) to information of different text style gets imported and instruction of how to deal with multiple information within a range (S221). For example, user can set information in bold letters as Item A and Italic as Item B and set the system to create DS according to the order of their appearance in 'Text Field' 221 (S221)

From the displayed information of the 'Text Field' 221, Information View Window 22, user drags a range of information where several information (in bold letters for Item A and in Italics for Item B) are included with a Mouse 62 (S222); from the dragged range of information of 'Text Field' 221, those in bold letters get imported to 'Item A Field' 241 and those in Italic to 'Item B Field' 242.

For example, if the whole content of 'Text Field' 221 (refer to FIG. 10) is dragged (S222), the first information in bold letters, 'Mozart' is recognized as the first Item A, 'Marriage of Figaro' as the first Item B, 'Chopin' as the second Item A and 'Polonaise' as the second Item B; all the recognized information automatically gets imported to 'Item A Field' 241 and 'Item B Field' 243. The user can also set the system to automatically put a comma between the two imported information, e.g. [Mozart, Chopin] in 'Item A Field' 241 and [Marriage of Figaro, Polonaise] in 'Item B Field' 243.

When same numbers of information are imported to each 'Item A Field' 241 and 'Item B Field' 243 in this way, the 'Register' button 244 becomes active. When the user clicks the 'Register' button 244, two sets of DS, a DS of Item A, 'Mozart' and Item B, 'Marriage of Figaro' and a DS of Item A, 'Chopin' and Item B, 'Polonaise', are registered in 'Culture History' DSG (S223).

In any case, whether the user adds each DS one by one or all DS at once, the 'Culture History' DSG (refer to Table 2) with two sets of DS will look like that of Table 3.

Figure 24:
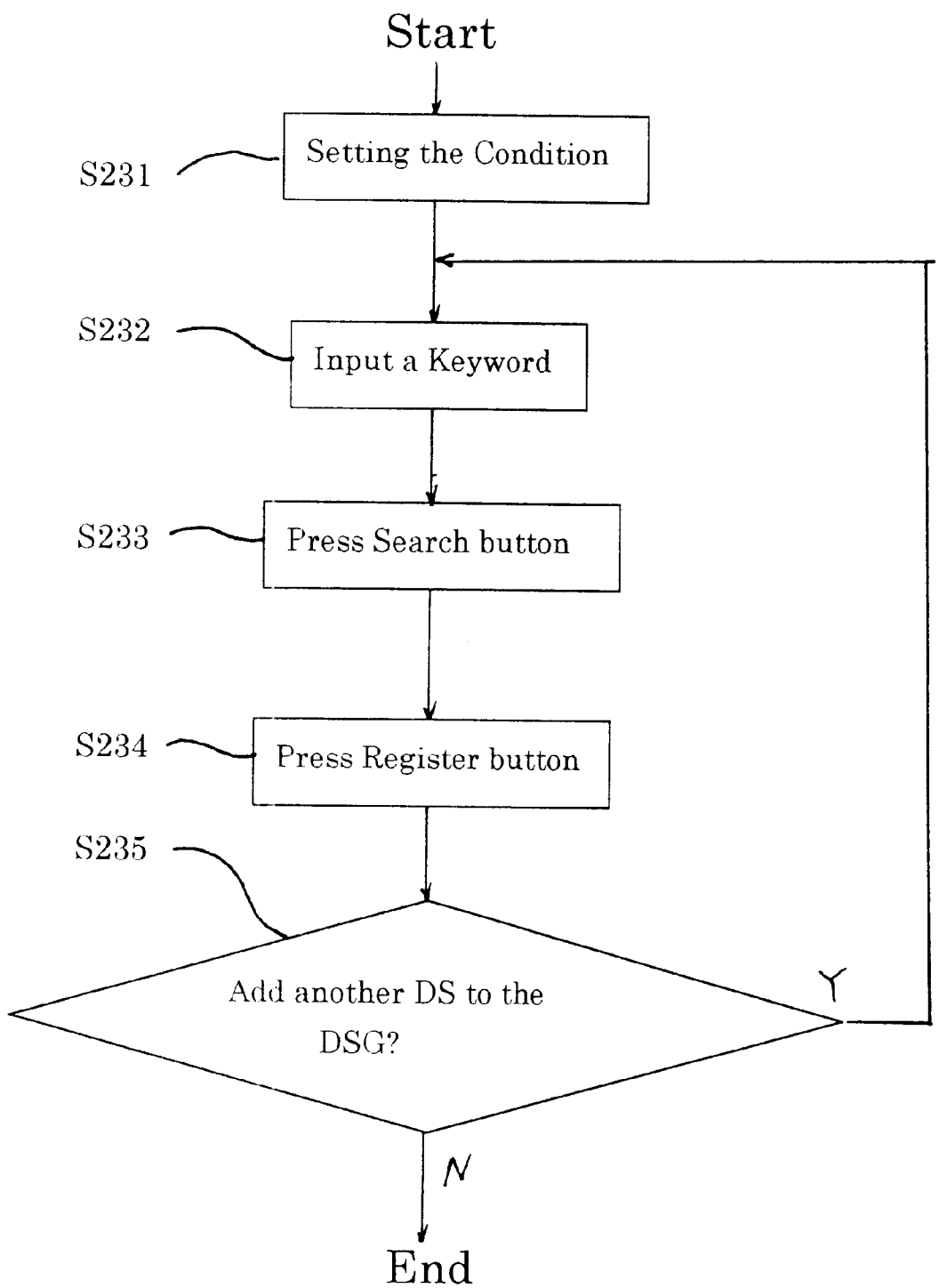
FIG. 24 is a flow chart describing sub-procedures of the procedure described in FIG. 11.

Method 4: FIG. 24 is a flow chart illustrating a procedure of information in 'Text Field' 221, Information View Window 22, being dragged to DS Registration Window 24 and registered as a DS (refer to FIG. 11, S2) to DSG (refer to FIG. 11, S1). Below explains the flow chart.

Figure 25:
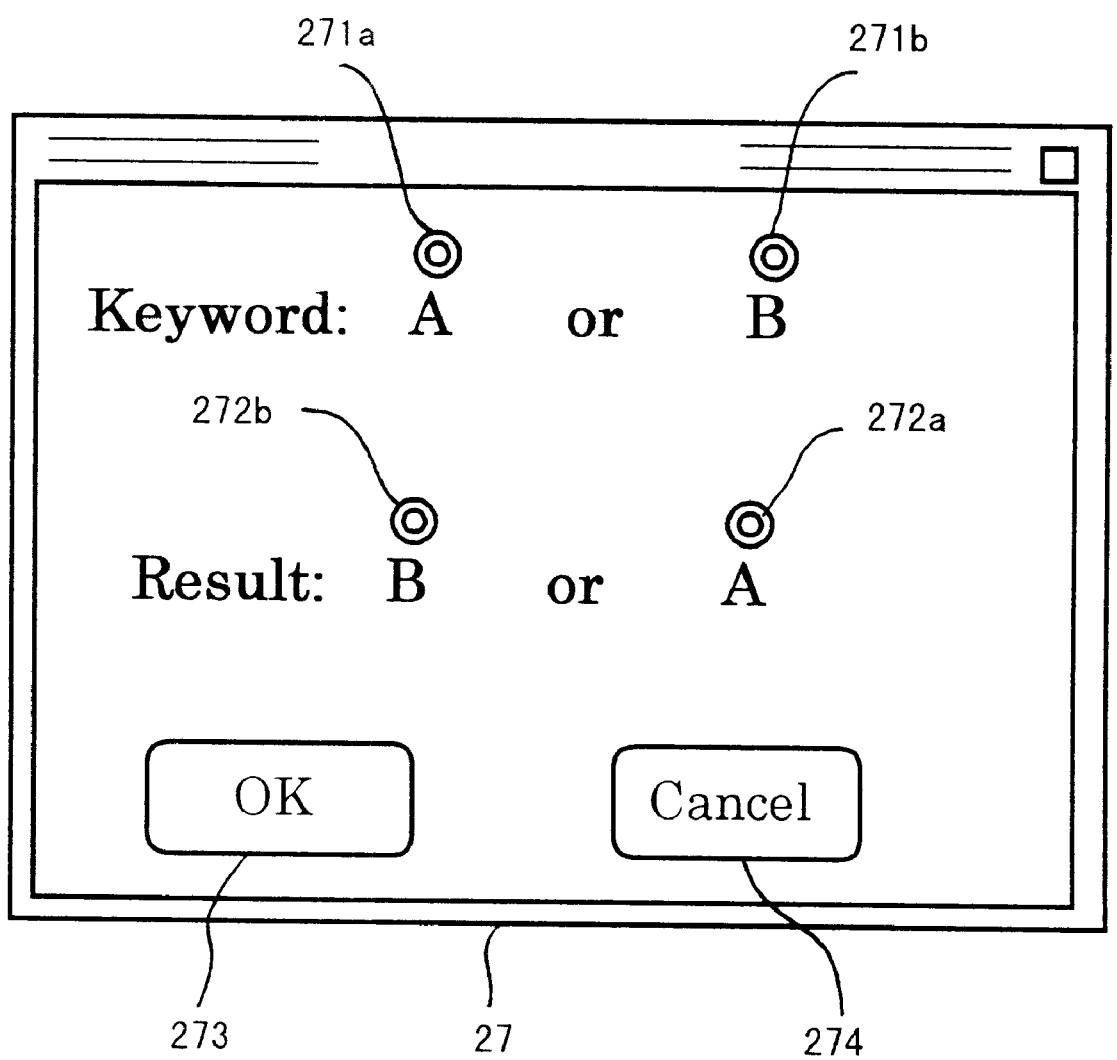
FIG. 25 shows a window in which the user can set relationship of retrieved data and relevant information added to the data.

When the user clicks the 'Select' button 232 of Category Selection Window 23 with a Mouse 62, Category Selection Window 23 disappears and a new window, Keyword Setting Window 27 appears on the screen of Display Unit 2. The Keyword Setting Window 27 shown in FIG. 25 displays radio button 271a and 271b setting a search keyword as either Item A or Item B, radio button 272b and 272a setting the search result as either Item B or Item A, an 'OK' button 273 which consents the setting and a 'Cancel' button 274 which cancels the procedure.

By clicking the radio button 271a in Keyword Setting Window 27 with a Mouse 62, the user can set up the item (Item A or Item B) to which the search keyword and the search result gets imported (S231). For example, if the user wants to set the search keyword as Item A and the search result Item B, he/she can click radio button 271a and 272b and click the 'OK' button 273 with a Mouse 62. When the 'OK' button 273 is clicked, Keyword Setting Window 27 disappears and when the user clicks 'Search' button 225 of Information View Window 22 (refer to FIG. 9), Search Window 28 shown in FIG. 26 appears on the screen of Display Unit 2.

The Search Window 28 has 'Keyword Field' 281 in which the user inputs a keyword in order to retrieve information in a 'Text Field' 221, a 'Result Field' 282 in which search result using the keyword is displayed, a 'Search' button 283 which the user clicks in order to start search, a 'Register' button 284 which saves information inputted/outputted in Field 281 and 282 as DS and a 'Cancel' button which cancels the DS registration.

The user inputs a keyword into 'Keyword Field' 281 in order to retrieve information from 'Text Field' 221 (S232). For example, if the user inputs 'Mozart' into the 'Keyword Field' 281 using a Keyboard 61 and clicks 'Search' button 283 using a Mouse 62 (S233), the search for information in 'Text Field' 221 begins and the introductory paragraph on Mozart is displayed in 'Result Field' 282. The user then deletes other information only saving appropriate information for Item B. For example, from the paragraph, the user decides to have only 'Marriage of Figaro' saved in 'Result Field' 282 and delete the rest. When the user clicks 'Register' button with a Mouse 62 (S234), a DS of Item A, 'Mozart' and Item B, 'Marriage of Figaro' gets registered in 'Culture History' DSG; 'Keyword Field' 281 and 'Result Field' 282 in search window 28 becomes blank.

By repeating this procedure (S232~S234), multiple DS can be added to the DSG (S235). For example, if the user inputs 'Chopin' in 'Keyword Field' 281 (S232) and click 'Search' button (S233), an introductory paragraph on Chopin will be displayed in 'Result Field' 282. From the paragraph, the user decides to have only 'Polonaise' saved in 'Result Field' 282 and delete the rest. When the user clicks 'Register' button 284 with a Mouse 62 (S234), a DS of Item A, 'Chopin' and Item B, 'Polonaise' gets registered in the 'Culture History' DSG.

In the present example, unnecessary information were deleted from the search result but information of search result can be saved as a part of DS without editing. For example, when a vocabulary in user's native language is inputted as a keyword and a vocabulary in a foreign language corresponding to the keyword is displayed as the search result, there is no need for editing. The 'Culture History' DSG (refer to Table 2) with two sets of DS will look like that of Table 3.

Method 5, a variation of Method 4, saves a great deal of trouble registering DS by processing the Information File 7 in advance.

FIG. 27 is a Text Field 221 of Information Viewing Window (refer to FIGS. 9 and 10) where information are viewed with more details. In the Text Field 221, introduction paragraphs of Mozart and Chopin including their works 'Marriage of Figaro' and 'Polonaise' are written in each paragraph. <A> and </A> tagged on Mozart and Chopin indicate that the name of composer is of item A of DS. <B> and </B> tagged on 'Marriage of Figaro' and 'Polonaise' indicate that the title of their music is of item B of DS. The tags are stored in advance in the Information File 7 according to the characteristic of information.

Figure 28:
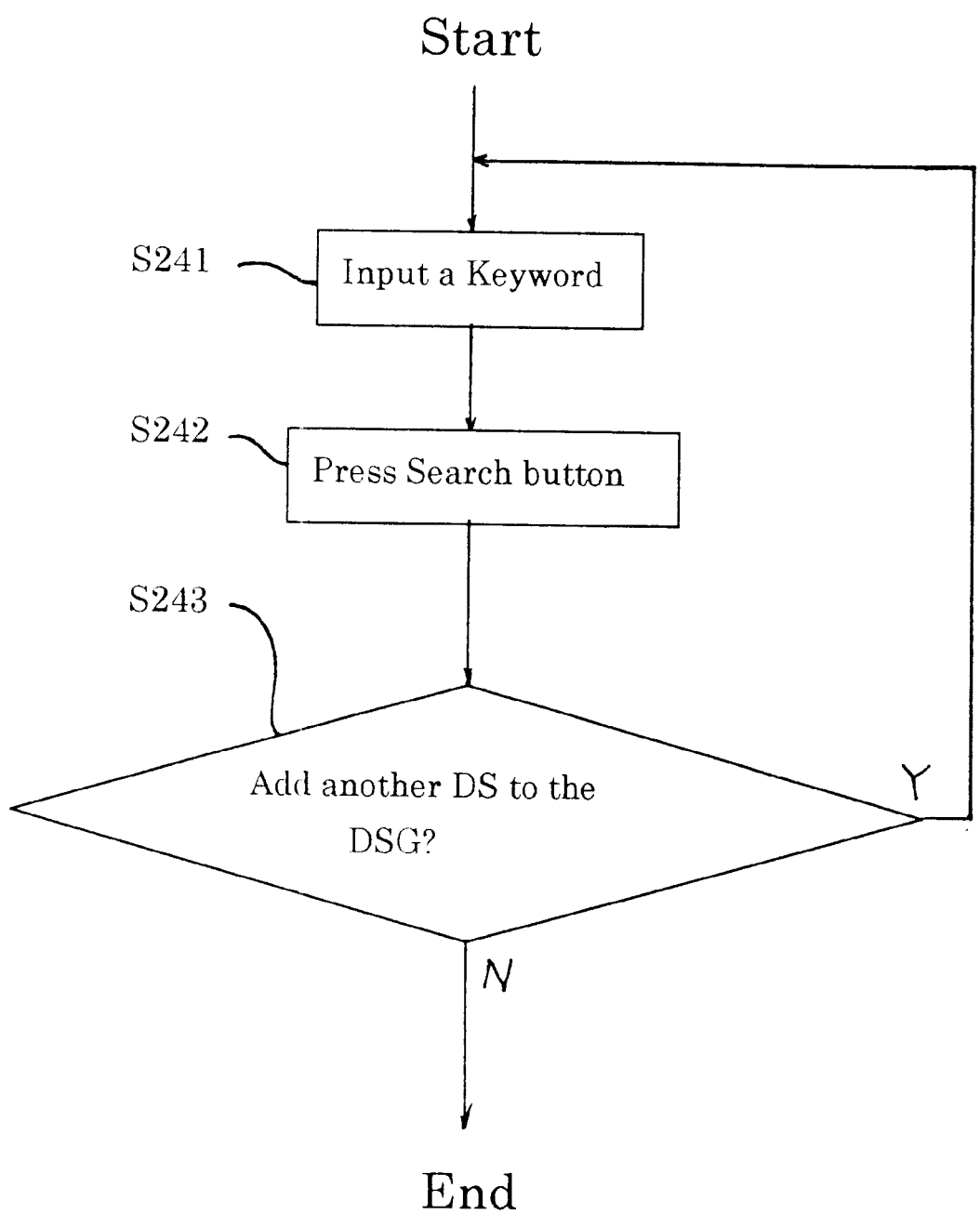
FIG. 28 is a flow chart describing sub-procedures of the procedure described in FIG. 11.

FIG. 28 is a flow chart showing the fifth procedure (refer to S2 of FIG. 11) of DS registration to DSG (refer to S1 of FIG. 11). Below, the flow chart is explained.

Figure 29:
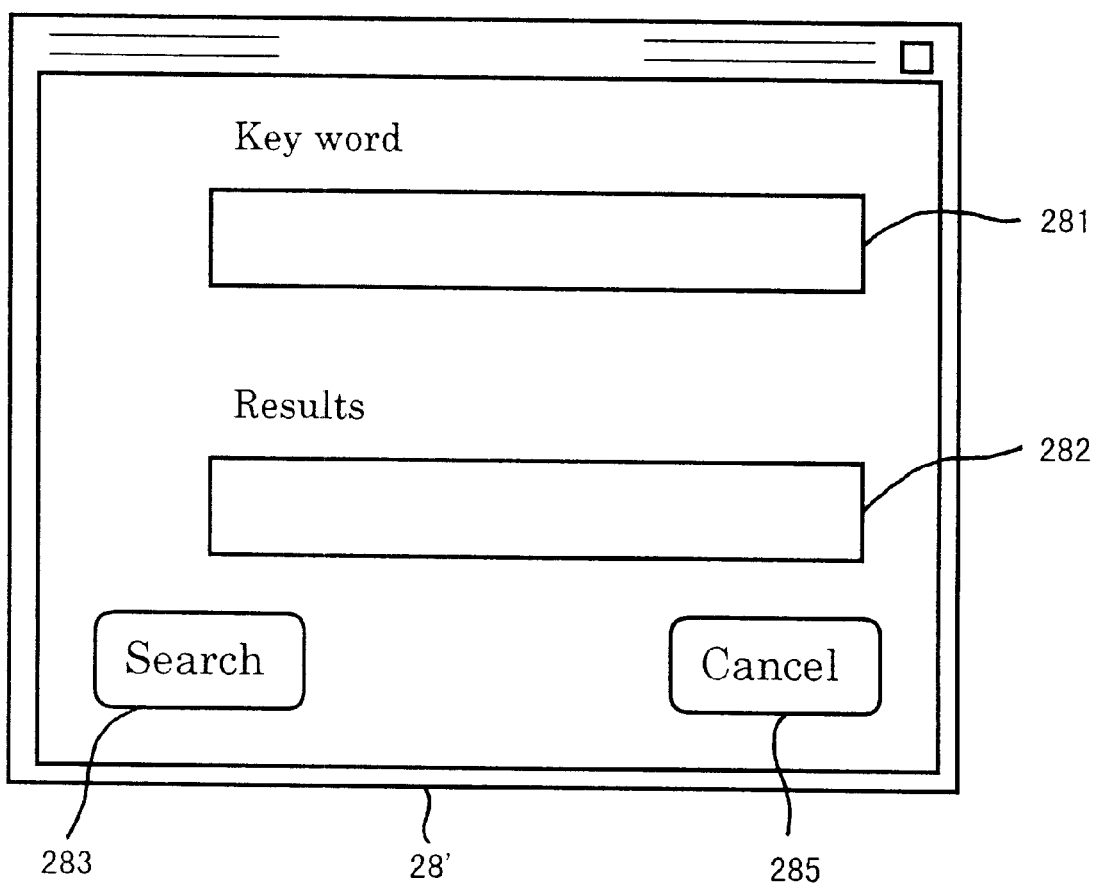
FIG. 29 shows a window with a Field indicating a keyword used for search (Field A) and a Field indicating the results of search on the keyword (Field B)

The user clicks Select button 232 (refer to FIG. 12) and Search button 225 of Window 22 (refer to FIG. 9), the Search Window 28' shown in FIG. 29 appears on the screen of Display Unit 2.

The Search Window 28' consists of a Keyword Field 281 in which the user inputs a keyword in order to search information in the Text Field 221, a Result Window 282 which shows the search result on the keyword, a Search button 283 which the user clicks in order to carry out the search and a Cancel button 285 which the user clicks in order to cancel the DS registration.

The user inputs a keyword(s) in the Keyword Field 281 in order to search information in the Text Field 221 (S241). For example, if the user inputs 'Mozart' in the Keyword Field 281 using the keyboard 61 and clicks the Search button 283 using the Mouse 62 (S242), the search begins on information of the Text Field 221 and the introduction paragraph on Mozart appears in the Result Field 282.

At the same time, a DS with Item A, Mozart (information in between the tag, <A> and </A>)and Item B, Marriage of Figaro (information between the tag <B> and </B>) gets stored into the DSG of 'Culture History' automatically. If the user clicks the Cancel button 285 when information are outputted in the Result Field 282, DS does not get stored into the DSG.

When the user clicks the Search button 225 of the View Window 22 (refer to FIG. 9) using the Mouse 62 (S243), the Keyword Field 281 and the Result Field 282 of Search Window 28' becomes blank.

By repeating the procedure S241~S243, the user is able to register multiple DS to the DSG. For example, if the user inputs Chopin in the Keyword Field 281 (S241) and clicks Search button 283 (S242), the introduction paragraph on Chopin appears in the Result Field 282. At the same time, a DS with Item A, Chopin and Item B, Polonaise gets stored into the DSG of 'Culture History'.

Figure 9:
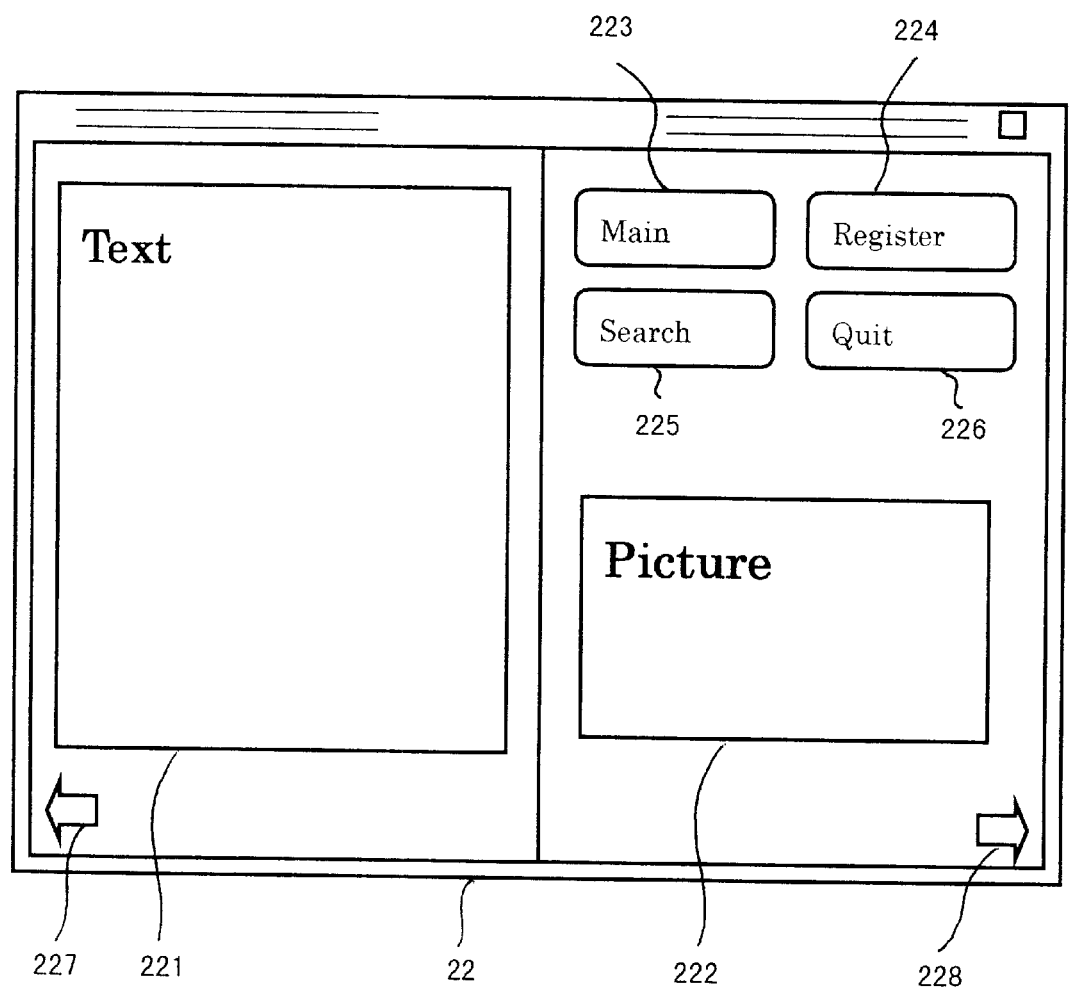
FIG. 9 shows an Information Viewing Window of the educational device of the present invention.

Here, tags are shown in the Text Field 221 of View Window 22 (refer to FIG. 9). However, it is possible to hide the tags using the Information View Means 91.

Table 3 shows the DSG of Culture History (refer to Table 2) after two DS has been added.

Method 6:

Using method 6 which is a variation of the method 5, it is possible to add multiple DS related to the keyword to DSG at once. Below explains method 6 and how it differs from method 5.

In method 5 a paragraph on a keyword which the user has inputted is shown in the Result Field 282 as search result. On the other hand, in method 6, multiple paragraphs on a keyword which the user has inputted are shown in the Result Field 282 as search result. For example, if the user types 'Mozart' in the Keyword Field 281 using the Keyboard 61 and clicks the Search button 283 using the Mouse 62 (S242), the search begins on information of the Text Field 221 and multiple paragraphs on Mozart appears in the Result Field 282.

FIG. 30 shows the search result on the keyword 'Mozart' using the search method 6. In method 6, not only the introduction paragraph on Mozart found in method 5, but also a paragraph on Beethoven in which 'Mozart' is included is shown in the Result Field 282 as the search result. In the paragraphs, 'Mozart' is underlined with double lines indicating that it is the keyword inputted by the user.

From the search result, two DS, a DS with Item A, Mozart (information in between the tag <A> and </A>)and Item B, Marriage of Figaro (information between the tag <B> and </B>)and a DS with Item A, Beethoven (information in between the tag, <A> and </A>)and Item B, Symphony 5 Movement 1 (information between the tag <B> and </B>) get stored into the DSG of 'Culture History' automatically. In the present example, only two paragraphs were found on the keyword 'Mozart' but more paragraphs can be found and more DS can be added to DSG at once. Also, if the user clicks the Cancel button 285 when information are outputted in the Result Field 282, DS do not get stored into the DSG.

When the user clicks the Search button 225 in the View Window 22 once more (S243), the Keyword Field 281 and Result Field 282 in the Search Window 28 become blank.

Six types of method of adding DS to DSG have been described. The above examples only included two data corresponding to Item A and B to DS and DSG out of 5 data corresponding to Item A~E. However, it is also possible to include other data to DS and DSG, be it in text form, sound form, still picture form or animation form.

Figure 26:
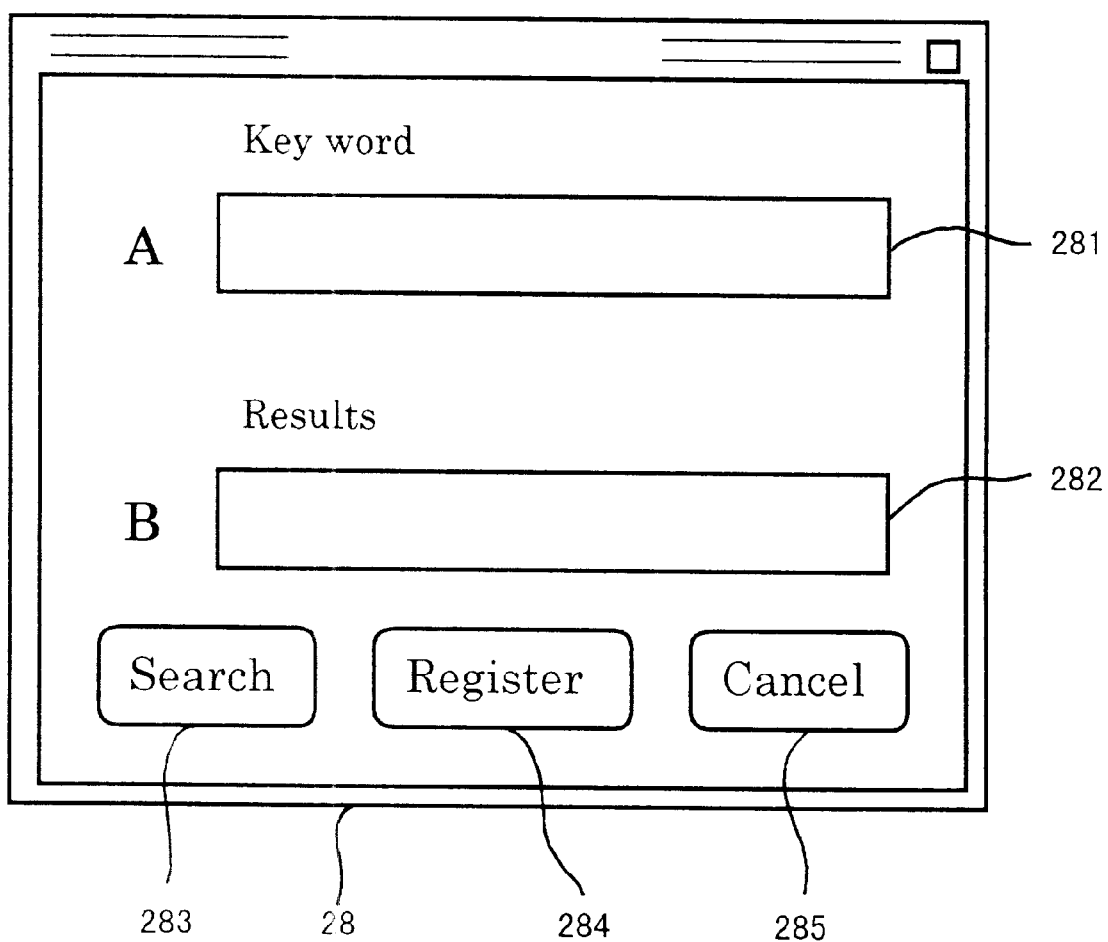
FIG. 26 shows a window with a Field indicating a keyword used for search (Field A) and a Field indicating the results of search on the keyword (Field B)

Also, the examples here add information indicated in Information View Window 22 (refer to FIG. 9) to DSG as DS through DS Registration Window 24, 24', 24" (refer to FIG. 13, FIG. 16 and FIG. 21) and Search Window 28 (refer to FIG. 26). However, it is also add information from windows created by other kinds of application software to DSG as DS.

Figure 31:
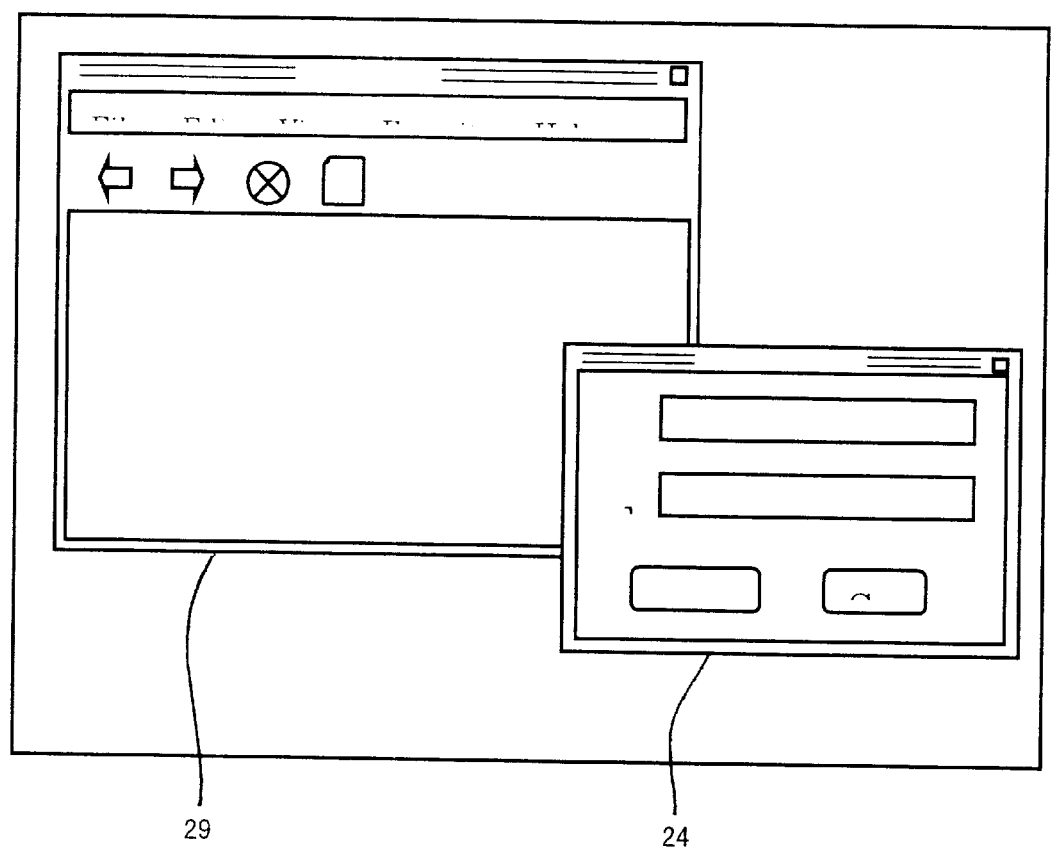
FIG. 31 shows Information Viewing Window which is an Internet browser and an input window on the screen.

FIG. 31 illustrates the screen of Display Unit 2 where Internet Browser Window 29 as other application software and DS Registration Window 24 of the present educational software are shown. By applying the same instruction used with Information View Window 22 (refer to FIG. 9) to Internet Browser Window 29, the information displayed in the Internet Browser Window 29 can be added to DSG as DS by means of the Input Window 24.

c) Function ③: indicating DS

The DS Indicating Means 93 is responsible for the function. When 'View' button 212 of Start-up Window 21 shown in FIG. 8 is clicked, Category Selection Window 23 shown in FIG. 12 appears on the screen of Display Unit 2. The Category Selection Window 23 is for selecting a DSG from the list of subjects stored in DSG File 8 (refer to FIG. 5(a)). For example, if the user clicks 'Culture History' from the list of the 'Select Field' 231 and clicks 'Select' button 232 with a Mouse 62, DS of 'Culture History' DSG will be indicated on the screen.

Figure 32:
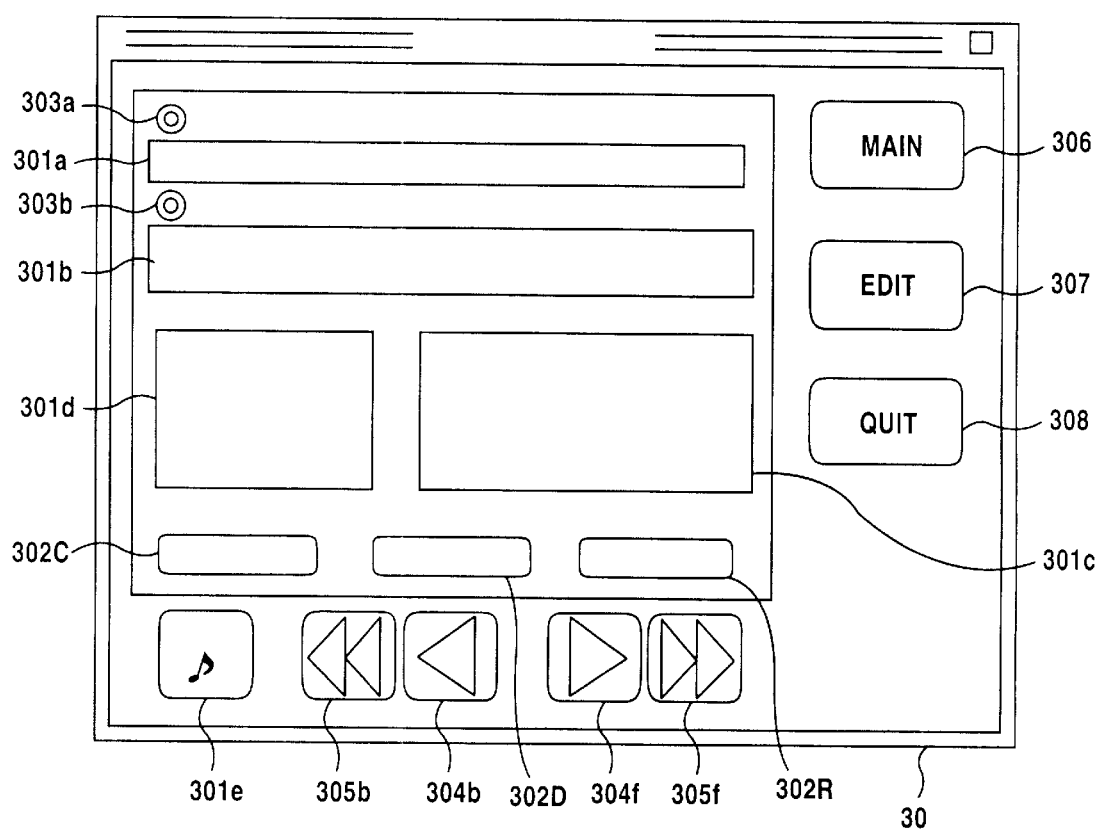
FIG. 32 shows a window in which DS information is displayed.

When the DSG is selected by clicking the 'Register' button 232, Category Selection Window 23 disappears and DS View Window 30 shown in FIG. 32 appears on the screen. The DS View Window 30 includes 'a View Field' 301a~d in which data corresponding to Item A~E of DS are displayed and a 'View' button 301e, 'Attribute Field' 302 C, 302D, 302R in which attribute information (Category information, Difficulty-level Information and Record Information of user) are displayed, 'View' radio button 303a, 303b which set the Field to view or not to view the data, a 'Forward' button 304f and a 'Fast forward' button 305f which shows the user the data of next 10 DS, a 'Back' button 304b and a 'Rewind' button 305b which shows the user the data of previous 10 DS, a 'Main' button 306 which takes the user back to the Start-up Window 21 (refer to FIG. 8), an 'Edit' button 307 which edits the contents of viewed DS and a 'Quit' button which ends viewing of DS. When the user selects the 'Culture History' DSG, the first set of DS is viewed in the DS View Window 30 (refer to Table 2)

In other words, name of a composer 'Beethoven' is viewed in 'View Field' 301a as Item A of the first DS, a title of his music 'Symphony 5, Movement 1' in 'View Field' 301b as Item B of the first DS, an introductory paragraph on Beethoven in 'View Field' 301c as Item C of the first DS and a portrait of Beethoven in 'View Field' 301d as Item D of the first DS; and clicking the 'View Field' 301e, the Audio Speaker 52 plays the 'Symphony 5, Movement 1', Item E of the first DS.

The category code of the first DS, [112], is viewed in 'Attribute Field' 302C, identifying the DS as of classical western music; the difficulty code of the first DS, [2], is viewed in 'Attribute Field' 302D, evaluating the DS as relatively easy; and the Record Information code [7/10] is viewed in 'Attribute Field' 302R, indicating that user has made 7 correct answers out of 10 times asked. Only the attribute information of the User A are viewed (refer to FIG. 7); attribute information of other users, e.g. User B, do not get revealed.

Also, if the user clicks and activates the 'View' radio button 303a, 'View Field' 301a stops viewing the Item A data of DS and similarly, if user clicks and activates the 'View' radio button 303b, 'View Field' 301b stops viewing the Item B data of DS. By clicking 'Forward' button 304f, 305f and 'Back' button 304b, 305b, user can find the DS he/she wants from the selected DSG. For example, when the first set of DS is viewed on the screen, by clicking the 'Forward' button 304f once, user can view the items and attribute information of the second DS.

The DS View Window 30 not only views the DS stored in the educational software (refer to FIG. 3) as described in the above example, but also, the DS registered by the user with the software's function of DS registering. For example, when viewing the DS of Mozart of Table 3, name of a composer 'Mozart' is viewed in 'View Field' 301a as Item A and a title of his music 'Marriage of Figaro' is viewed in 'View Field' 301b as Item B, but 'View Field' 301c and 301d are blank and when 'View' button 301e is clicked, there is no sound play from Audio Speaker 52. Code [0] is viewed in the 'Attribute Field' 302C, 302D indicating that no information is registered; code [0] is viewed in the 'Attribute Field' 302R indicating that no user record is available.

In the case of viewing the DS of Mozart of Table 4, 'Attribute Field' 302C views [112] identifying the category as classical western music and 'Attribute Field' 302D views [1] evaluating the difficulty-level as easy.

d) function ④: DS editing

DS Edit Means 94 is mainly responsible for the function ④. When the user clicks the 'Edit' button 307 in DS View Window 30 shown in FIG. 32, he/she can add, correct or delete the data of "View Field" 301a~301d and "View" button 301e and attribute information of "Attribute Field" 302C, 302D, 302E. In other words, the user can edit the viewed DS.

For example, for the DS of Mozart in Table 3, [0] is viewed in 'Attribute Field' 302C indicating that no information is registered as mentioned above. However, when the user clicks the 'Edit' button 307 and then clicks the 'Attribute Field' 302C, he/she can register new data/information in the Field. Here, user inputs [112] as category information identifying the DS as of classical western music. When the user edits a DS like this, the edited part is reflected immediately in DSG.

TABLE 5

| Item A | B | Category | Difficulty | (A's)Record | (B's) |
|---|---|---|---|---|---|
| D1 | D2 | c 1 | d 1 | r a1 | r b1 |
| D6 | D7 | c 2 | d 2 | r a2 | r b2 |
| . | . | . | . | . | . |
| . | . | . | . | . | . |
| . | . | . | . | . | . |
| Mozart | Marriage of Figaro | 112 | 1 | 0/0 | 0/0 |
| Chopin | Polonaise | 0 | 0 | 0/0 | 0/0 |

In Table 5, a part of DSG of Table 3 is edited by the user. Here, the category information of DS of Mozart has been changed to [112]. In this example, only the correcting attribute information of DS is described as an editing example. However, the user can also add or delete not only attribute information but also data of Item A~E.

e) function ⑤: giving a practices to User Based on the DS

Figure 33:
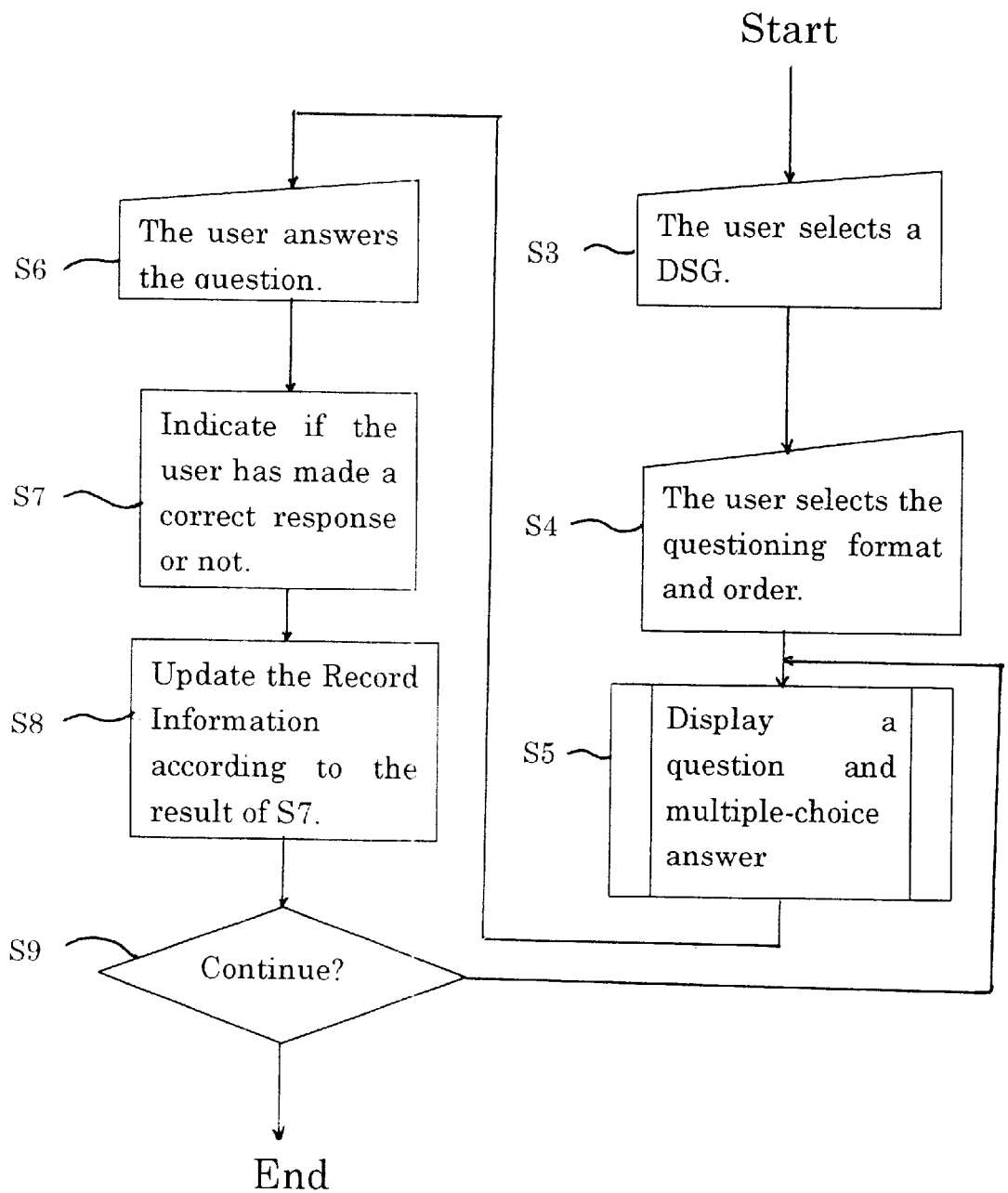
FIG. 33 shows a flow chart describing a question solving procedure of the educational device of the present invention.

Questioning Means 95 is responsible for the function ⑤. FIG. 33 explains the basic procedure of the Questioning function using a flow chart. When the user clicks the 'Training' button 213 of Start-up Window 21 (refer to FIG. 8), Category Selection Window 23 (refer to FIG. 12) appears on the screen of the Display Unit 2.

In the Category Selection Window 23, from various DSG stored in DSG File 8 (refer to FIG. 5(a)), the user selects a DSG depending on the subject he/she wants to be questioned. For example, if the user clicks 'Culture History' from various subjects listed in 'Select Field' 231 and clicks 'Select' button 232, questions on data of the 'Culture History' DSG will be asked to the user (S3).

Figure 34:
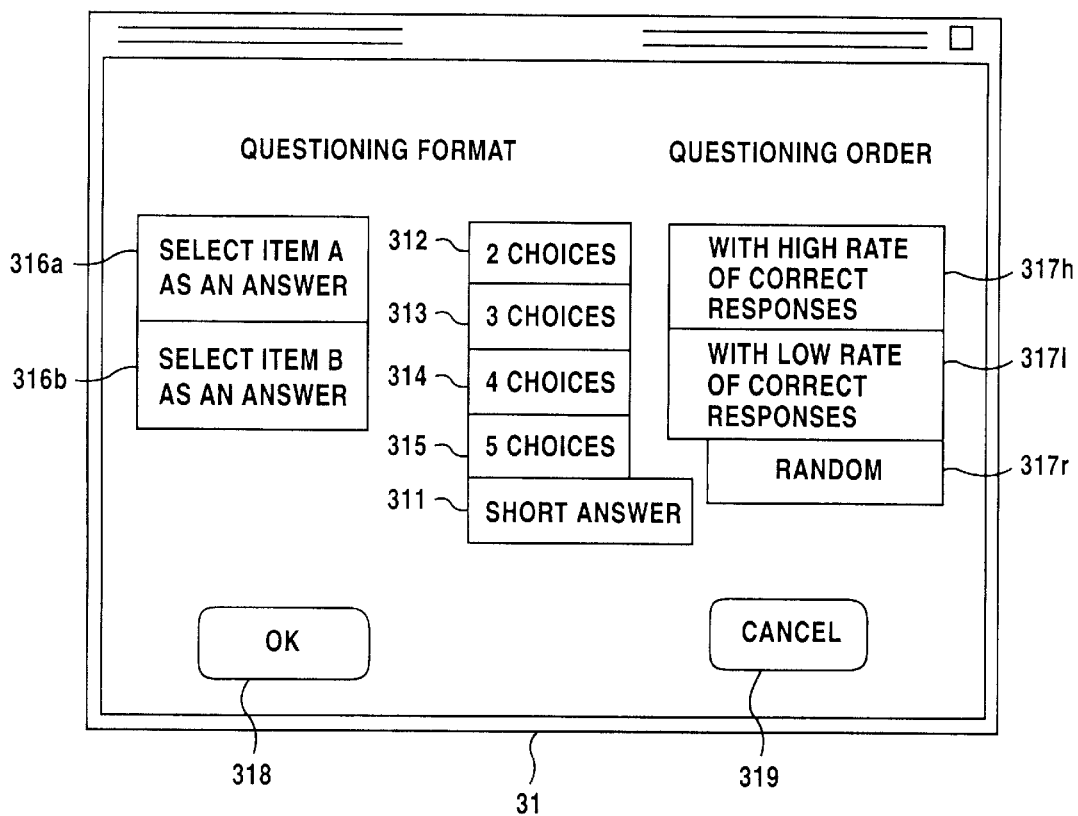
FIG. 34 shows a window in which the user sets the format of practice questions of the educational device of the present invention.

By clicking the 'Select' button 232, the user can complete the DSG selection; Questioning Format Window 31 shown in FIG. 34 appears on the screen of Display Unit 2.

In the Questioning Format Window 31, the user sets the format and order of questions. The Questioning Format Window 31 includes: "Item Format" buttons 316a and 316b, "Number of Choices" buttons 311~315, 'Question Order' buttons 317h, 317l and 317r, an 'OK' button 318 which completes the format registration and a 'Cancel' button 319 which cancels the registration.

By clicking the button listed above, the user can set the format and order of questions (S4). That is to say, if the user wants Item A of a data to be an answer and Item B of a data to be a question, he/she clicks the 'Item Format' button 316a and if the user wants Item B of a data to be an answer and Item A of a data to be a question, he/she clicks the 'Item Format' button 316b. The user can also select the number of choices (2~5) of an answer by clicking a 'Number of Choices' button from 312~315. If the user wants to answer the question in a short answer form rather than a multiple choice answer, he/she can click the 'Number of Choices' button 311.

If the user wants the questions to be given in the order from the question with the highest rate of correct answers, he/she clicks the 'Question Order' button 317h, if the user wants the questions to be given from the question with the lowest rate of correct answers, he/she clicks the 'Question Order' button 317l and if the user wants the question to be given in random order, he/she clicks 'Question Order' button 317r. When the selection is completed, the user clicks the 'OK' button 318.

Figure 37:
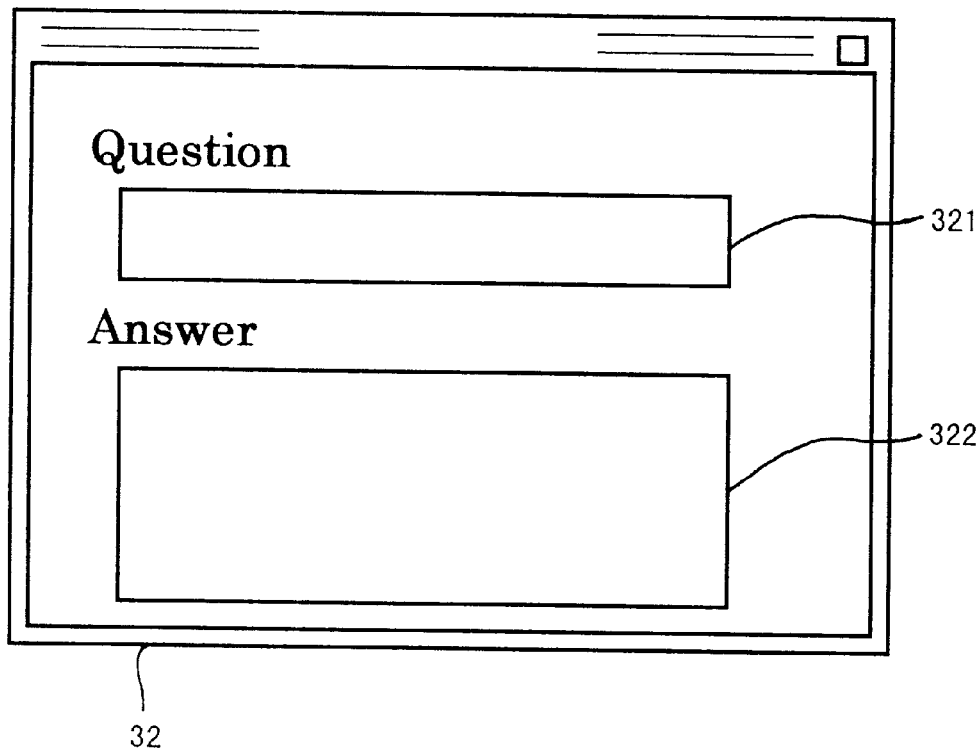
FIGS. 37(a) and 37(b) show windows indicating a question and multiple-choice answer set.
Figure 37:
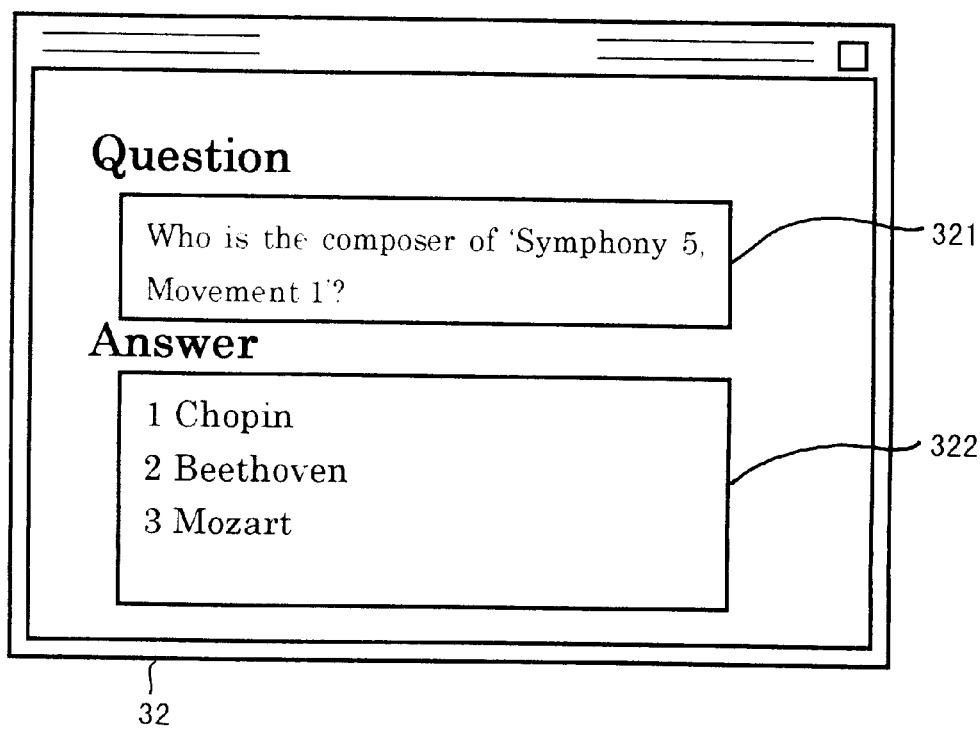

When the 'OK' button 318 of the Questioning Format Window 31 is clicked, the window disappears and "Question & Answer" Window 32 of FIG. 37(a) and 33(b) appears on the screen of the Display Unit 2.

The "Question & Answer" Window 32 includes a 'Question Field' 321 which displays a question and a 'Answer Field' 322 which displays a multiple choice answer. In the 'Question Field' 321, a question is asked based on the question order set by the user in S4 and in the 'Answer Field' 322, a multiple choice answer is given based on the questioning format set by the user in S4 (S5).

Figure 35:
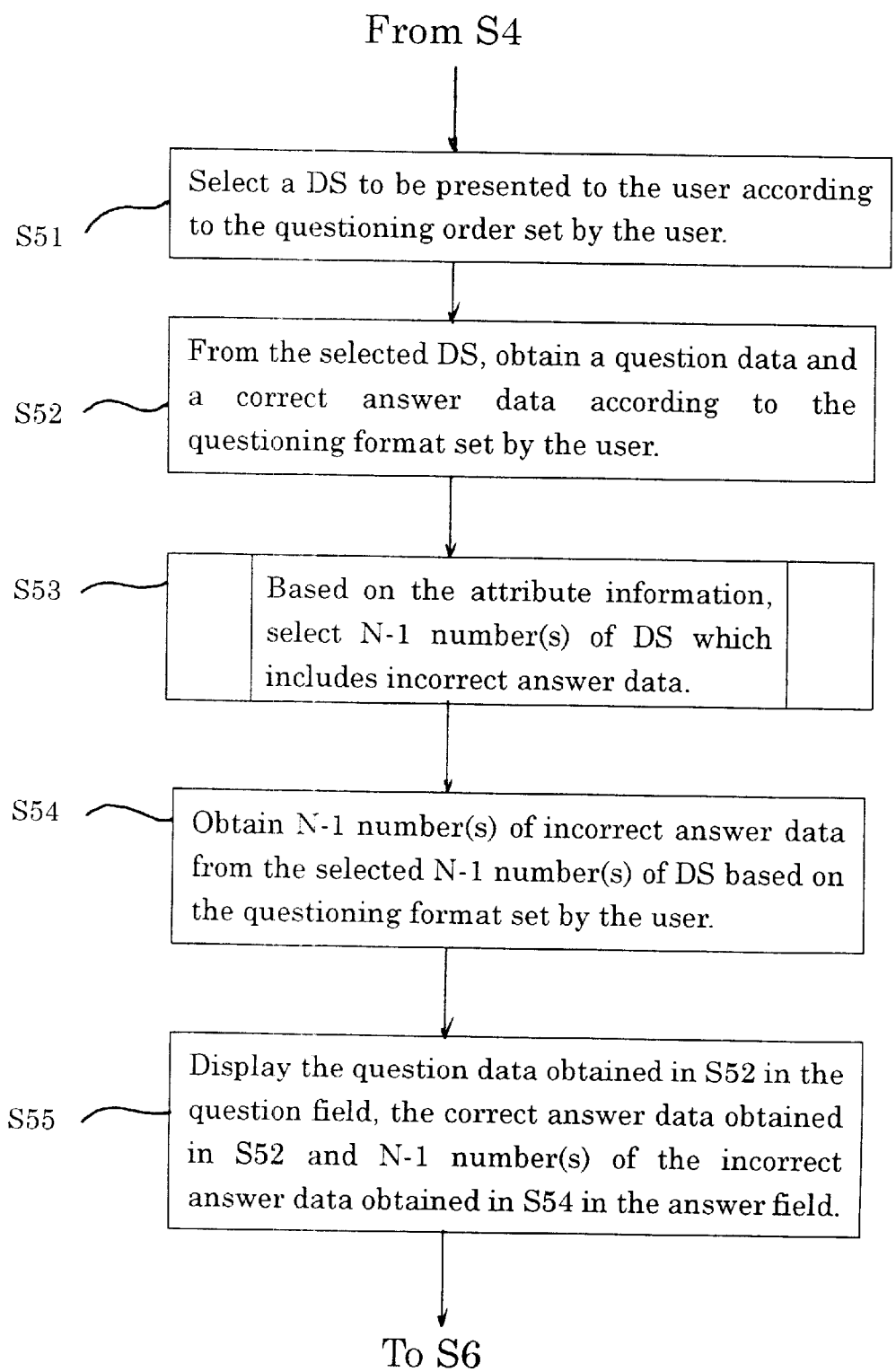
FIG. 35 is a flow chart describing sub-procedure of the procedure described in FIG. 33.

FIG. 35 is a flow chart which describes sub-procedure of S5. First, based on the question order that user has set in S4, the Questioning Means 95 selects a DS from the DSG selected in S3 on which a question will be given (S51). Since the user has clicked 'Question Order' button 317h in S4, the questions are picked from the DS of the 'Culture History' DSG with high rate of Record Information (in this case, User A's Record). For example, if it is the DS of Beethoven which has the highest Record A, ral (=7/10), DS of Beethoven is picked as the first question Next, based on the item format that the user has set up in S3, a question data and correct answer data are picked from the selected DS in S51 (S52). Since the user has clicked 'Item Format' button 316a, from the selected DS of Beethoven (S51), Item A 'Beethoven' becomes the correct answer data and Item B 'Symphony 5, Movement 1' becomes the question data.

Next, based on the attribute information of each DS of the DSG selected in S3, N−1 (N is the number of choices given in an answer set by the user) number(s) of DS are selected (S53). If the user has clicked 'Number of Choices' button 313 in S4, for instance, two DS (=3−1) with an answer data will be selected.

Figure 36:
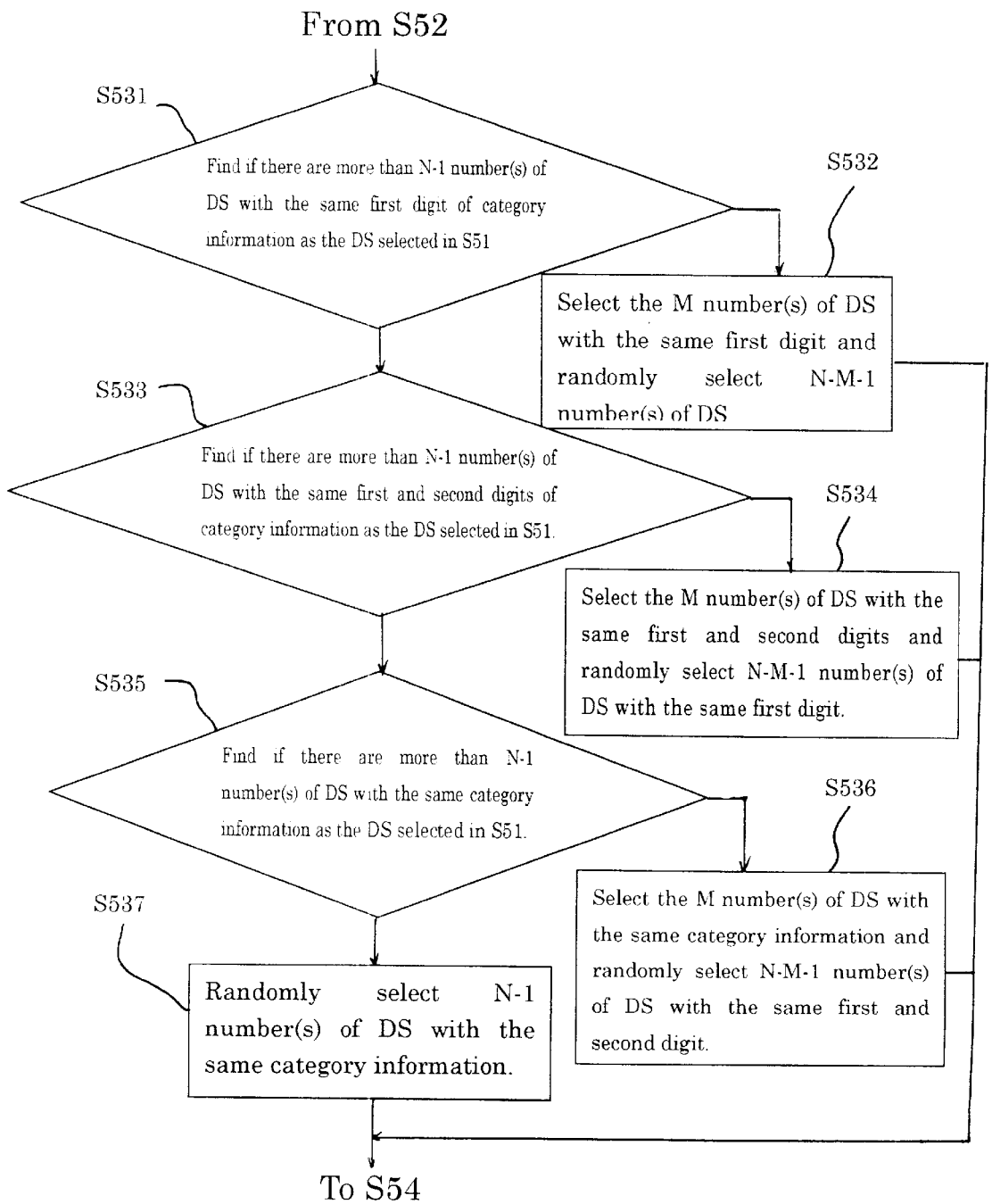
FIG. 36 is a flow chart describing sub-procedure of the procedure described in FIG. 35.

FIG. 36 is a flow chart describing the sub-procedure of S53. The object of the procedure illustrated in the flow chart is providing the user with incorrect answer data that are highly comparable with the correct answer data (Beethoven) in order to increase study efficiency. For example, if the wrong answer choices include names of scientists or authors, despite the question being on a composer, it may be too easy for the user to pick the right answer. This procedure prevents such from happening. Below, the sub-procedure of S53 will be described in detail.

First, whether the Selected DSG in S3 have N−1 numbers of DS with the same first digit of Category information as the DS picked in S51, has to be ascertained (S531). If less than N−1 numbers of DS exists, M (where M>0, M>N−11) number of DS holding the same first digit of category information and N−M−1 numbers of data randomly selected from the DSG selected in S3 are selected (S532).

If the DSG consists of more than N−1 numbers of DS, whether there exists N−1 numbers of DS with the same first two digits of category information as DS picked in S51, has to be ascertained (S533). If less than N−1 numbers of DS exists, M number of DS with the same first two digit of category information and N−M−1 numbers of DS with the same first digit are picked randomly from the DSG, are selected (S534).

If the DSG consists of more than N−1 numbers of DS, whether there exists N−1 numbers of DS with the same category information as DS picked in S51, has to be ascertained (S533). If the DSG consists of less than N−1 numbers of DS, M number of DS with the same category information and N−M−1 numbers of DS with the same first two digits of category information, are selected (S536).

If the DSG consists of more than N−1 numbers of DS, N−1 numbers of DS with the same first, second and third digits are picked randomly from the DSG (S537).

Here, only the 'Mozart' DS holds the exactly same category information as the 'Beethoven' DS [112] and 'Chopin' DS (category information=[113]) is selected as the DS with the same first two digit of category information, [11x], where x>0 (S536). Written above describes the S53 sub-procedure.

In S54, based on the item format in S4, N−1 numbers of answer data are selected from the N−1 numbers of data selected in S53 (S54). If the user has clicked the 'Item Format' button 316a in S4, for instance, the item A of the data selected in S53, 'Mozart' and 'Chopin' are selected as wrong answer data.

Next, the question data picked in S52 gets displayed in the 'Question Field' 321 of 'Question & Answer' Window 32. Similarly, the correct answer picked in S52 and N−1 number of wrong answer data selected in S54 are viewed in the 'Answer Field' 322 of 'Question & Answer' Window 32. The order of the correct answer data and N−1 number of wrong answer data are in random.

Here, 'Question & Answer' Window 32 displays 'Symphony 5, Movement 1' as the question data, 'Beethoven' as the correct answer data and 'Mozart' and 'Chopin' as the wrong answer data. FIG. 37(b) is what the 'Question & Answer' Window 32 will look like with the above data registered. In the 'Question Field' 321, a question, "Who is the composer of 'Symphony 5, Movement 1'?", is asked. In the 'Answer Field' 322, 3 choices of answer, one correct answer and two wrong answers ([1 Chopin], [2 Beethoven], [3 Mozart]) are given. Described above are of the S5 procedure.

In S6, by clicking an answer from the given multiple choices in the 'Answer Field' 322 of 'Question & Answer' Window 32 with a Mouse 62 or by inputting the number of an answer with the Keyboard 61, the user can select an answer he/she thinks is correct.

Next, whether user's response in S6 is correct or not, is ascertained (S7). For example, if the user has selected [2 Beethoven] as an answer (S6), the 'Answer Field' 322 will indicate that the answer is correct (S7); if the user has selected [1 Chopin] or [2 Mozart] (S6), the 'Answer Field' 322 will indicate that the answer is incorrect (S7).

Next, the Record Information of the DS gets updated depending on whether the user has a correct response or not. (S8). Since User A is using the device here (refer to FIG. 7), if the user has answered the question of the composer of 'Symphony 5, Movement 1' correctly, User A's Record Information is updated from [7/10] to [8/11]; if the user has answered the question incorrectly, User A's Record Information is updated from [7/10] to [7/11]

The user can either end the training at this point or continue the training answering the next set of question (S9). In order to end the training, the user clicks the 'Quit' button (not shown in the FIG. 37) and the Start-up Window 21 (refer to FIG. 8) appears on the screen. If the user continues the training, questions other than previous asked one are asked. That is to say, the 'Beethoven' DS will not be selected as a question DS for the present training session (refer to FIG. 35, S51).

In order to explain the procedure of the questioning, the answers were selected from item A and consisted of three choices in the present example. However, the user is able to select the answers from item B and set two, four and five choices and even a short answer in the 'Answer Field' 322. If the user sets up a short answer as format of an answer to the question, the user inputs the answer in the 'Answer Field' 322 using the Keyboard 61 rather than selecting a correct answer from multiple choices.

Also, it is possible to change the questioning format, setting other items of DS as a question or an answer. For example, setting item C as a question and item D as an answer (e.g., an introductory paragraph is given and the User Answers the portrait of the described composer), setting item D as a question and item E as an answer (e.g., a portrait of a composer is given and the User Answers music composed by him/her) and setting item E as a question and item A as an answer (e.g., music of a composer is played and the User Answers the composer who composed the music) are a few applications of the questioning format.

In the present example, the questions were selected from the ones with high rate of correct response but the user can also set the order of questions with low rate of correct response or set the order of questions to be random.

Still, by selecting the category information of DS (FIG. 35, S51), it is possible to provide the user with questions only of the that particular category. Also by setting the Difficulty-level Information of DS (FIG. 35, S51), it is possible to set the order of questions from difficult to easy or from easy to difficult. By selecting the DS with high Record Information or low Record Information (refer to FIG. 35, S51), it is possible to provide each user with the questions he/she is good at or the questions he/she has problems with.

Furthermore, it is possible to combine the above set-ups. For example, it is possible to select DS with high Difficulty-level Information of a particular category information (refer to FIG. 35, S51) and to provide the user with a set of difficult questions in a particular category.

In the present example, in order to obtain the wrong answer data, the DS with category information as identical as the Data selected in FIG. 35, S51 were selected and if insufficient numbers of DS were obtained, rest of the answer were selected randomly from the category (FIG. 36). However, when insufficient numbers of DS were obtained (refer to S532, S534 ad S536 of FIG. 36), it is also possible to select DS with difficult/easy Difficulty-level. Information or with the DS which the user is good at or having a problem with based on the Record Information.

In the present example, when updating the Record Information of the user (refer to S8 of FIG. 33), only the Record Information of the selected DS in S51 of FIG. 35 was updated. However, it is also possible to update the Record Information of the selected N–1 DS in S53 of FIG. 35. For example, when the user answers the question "Who is the composer of 'Symphony 5B, Movement 1'?", not only the user's Record Information of the 'Beethoven' DS, but also, the user's Record Information of the 'Mozart' DS and 'Chopin' Data selected in S53 of FIG. 35 are updated from [0/0] to [0/1].

V. Other Examples

Figure 38:
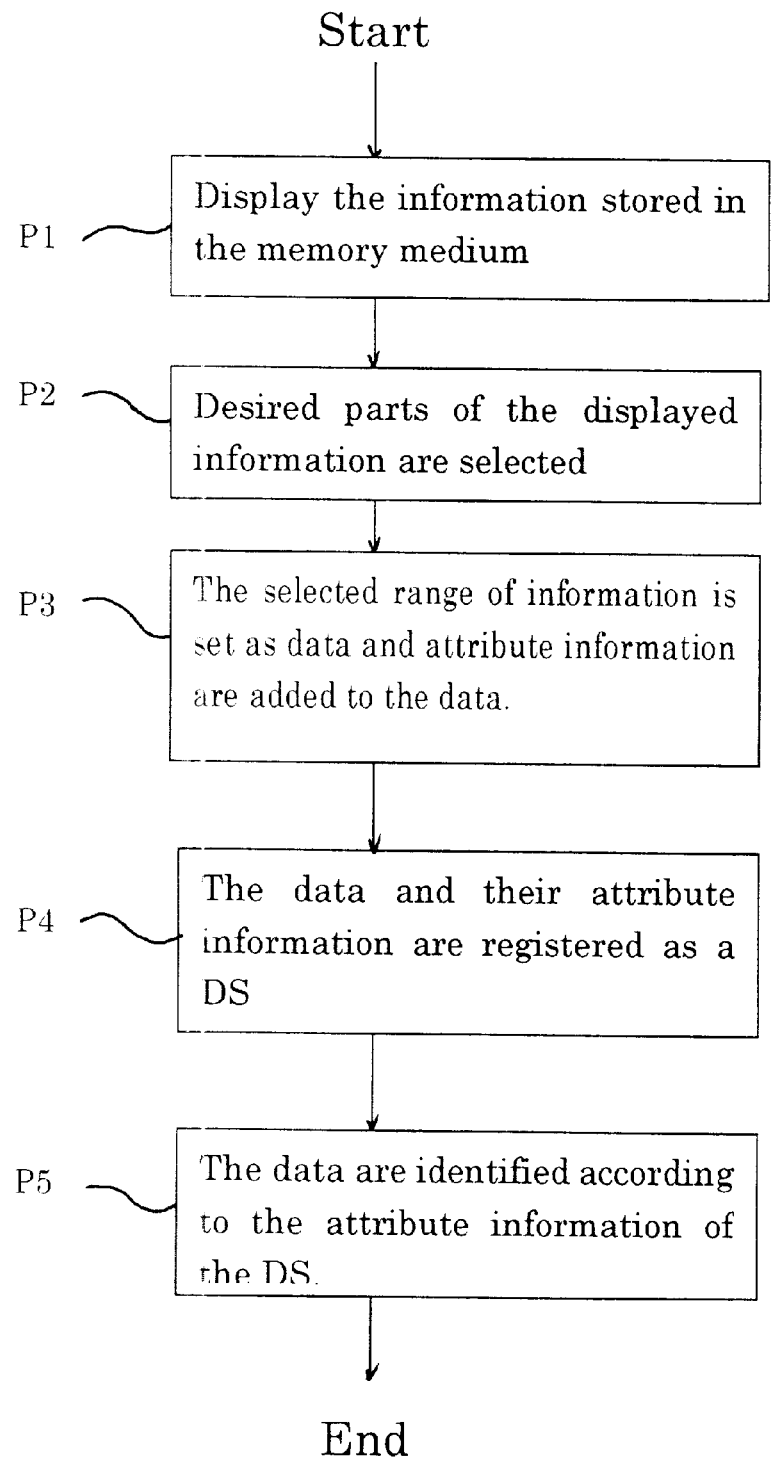
FIG. 38 shows a flow chart describing a procedure of registering DS.
Figure 39:
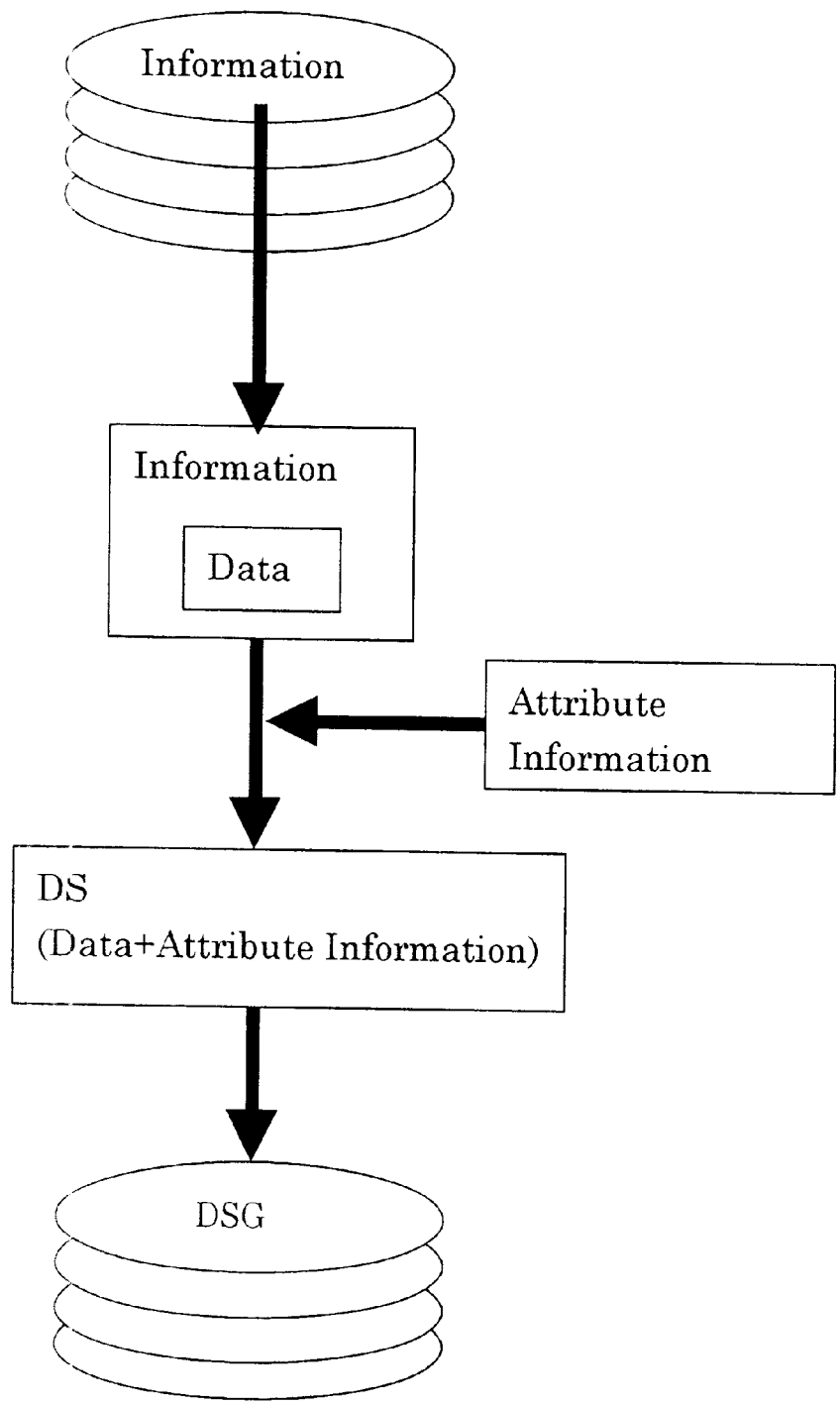
FIG. 39 shows diagram describing a procedure of registering a DS.

FIG. 38 is a flow chart the explains a more generalized procedure of the Questioning function which selects set of DS (refer to S2 of FIG. 11) and provides practice questions using the selected DS (refer to FIG. 33). FIG. 39 describes the procedure, P1~P4, of the flow chart illustrated in FIG. 38 using a diagram.

The flow chart illustrates the procedure, P1~P5. In P1, information stored in the memory medium, Information File 7 are viewed in the Information View Window 22 (refer to FIG. 3 and FIG. 9); in P2, desired parts of the viewed information in 'Text Field' 221 are selected (refer to FIG. 10 and S201, S203 of FIG. 14); in P3, the selected range of information are set as data and attribute information of item A and B are added to the data by clicking 'A' or 'B' button of the DS Registration Window 24 (refer to FIG. 13 and S202, S204 of FIG. 14); in P4, the data and their attribute information are registered as a DS when the 'Register' button 244 of the DS Registration Window 24 is clicked (refer to FIG. 13 and S207 of FIG. 14); and in P5, based on the attribute information, e.g., category information, Difficulty-level Information and user's Record Information, a question data, a correct answer data and wrong answer data are obtained (refer to the flow charts of FIG. 35 and 32).

The structure and application of DSG described above can be applied not only to other forms of educational device but also, other data processing device. Below, other ways of applying the present invention, as shown in FIGS. 38 and 35 are explained.

A. Educational device (analysis and prediction of a questioning trend)

There can be two kinds of trial tests preparing an entrance exam of a high school or university: a comprehensive test prepared by a public organization which any student regardless of applied school can take and an individual test prepared by each school which only the students applying to the school can take. Here, the individual test especially is likely to incline to certain area depending on the school preparing the test. For example, as for Math questions in the entrance exam, in the entrance exam of School A, questions on a quadratic equation appear frequently on the exam but questions on triangles never appear, but, on the contrary in the entrance exam of School B, questions on triangles appear frequently on the exam but questions on a quadratic equation never appear. Under this kind of circumstances, if the questioning trend of each school can be grasped easily, it can be of user when deciding a study principle and which school to apply. Also, in order to increase study efficiency, it would be more conducive to students to provide them with questions complying with the questioning trend of the school they are applying for. In view of such case, the above application is implemented.

▽ The System Structure

The hardware structure of the educational device, analyzing and predicting a questioning trend, is identical to that of the educational device explained before. The software structure of the educational device is constructed from with an OS which manages and controls the hardware structure and an educational software which operates in the OS. The educational software is divided into two parts: a data part and a program part. The data part includes an Information File 7 and a DSG File 8.

The Information File 7 stores information of practice questions on Mathematics including questions from the previous entrance exams of a certain school. DSG File 8 will be explained below. The program part includes an Information Viewing Means 91, a DS Registering Means 92, Analyzing Means 96 and Question Prediction Means 97.
▽ DSG

TABLE 6

| Data | Attribute Info. 1 | 2 | 3 | 4 | 5 |
|------|------|---|---|---|---|
| D 1 | 1 | 3 | 1993 | 8 | 3 |
| D 2 | 0 | — | — | 16 | 2 |
| D 3 | 0 | — | — | 11 | 4 |
| D 4 | 1 | 2 | 1990 | 2 | 1 |
| . | . | . | . | . | . |
| . | . | . | . | . | . |
| . | . | . | . | . | . |
| Dn | 0 | — | — | 7 | 5 |

Table 6 explains the data structure of DSG of the application implemented. In the Table 6, each row constructs one DS where each DS is made up of a data part and an attribute part. A Math question is stored in the data part as a text information and the attribute part includes Attribute Information 1~5.

The Attribute Information 1 indicates whether the question has ever been on an entrance exam; it indicates [0] if it has never appeared in an exam and [1] if it has appeared on an exam. The Attribute Information 2 indicates the school in whose exam the question has appeared; it indicates [1] if it has appeared in the exam of school A, [2] if appeared in the exam of school B and [3] if appeared 4 in the exam of school C. The Attribute Information 3 indicates a year of the entrance exam in which the question has appeared; it indicates a 4 digit number which implies the AD year, e.g., [1993] for the question appeared in the entrance exam of the year 1993. The Attribute Information 4 indicates the area of the question and for the present example, a math question is divided into 16 areas, e.g., [8] for a simultaneous equations. The Attribute Information 5 indicates the 5 degrees of difficulty, e.g., [3] for average difficulty.

▽ System Operation

Figure 40:
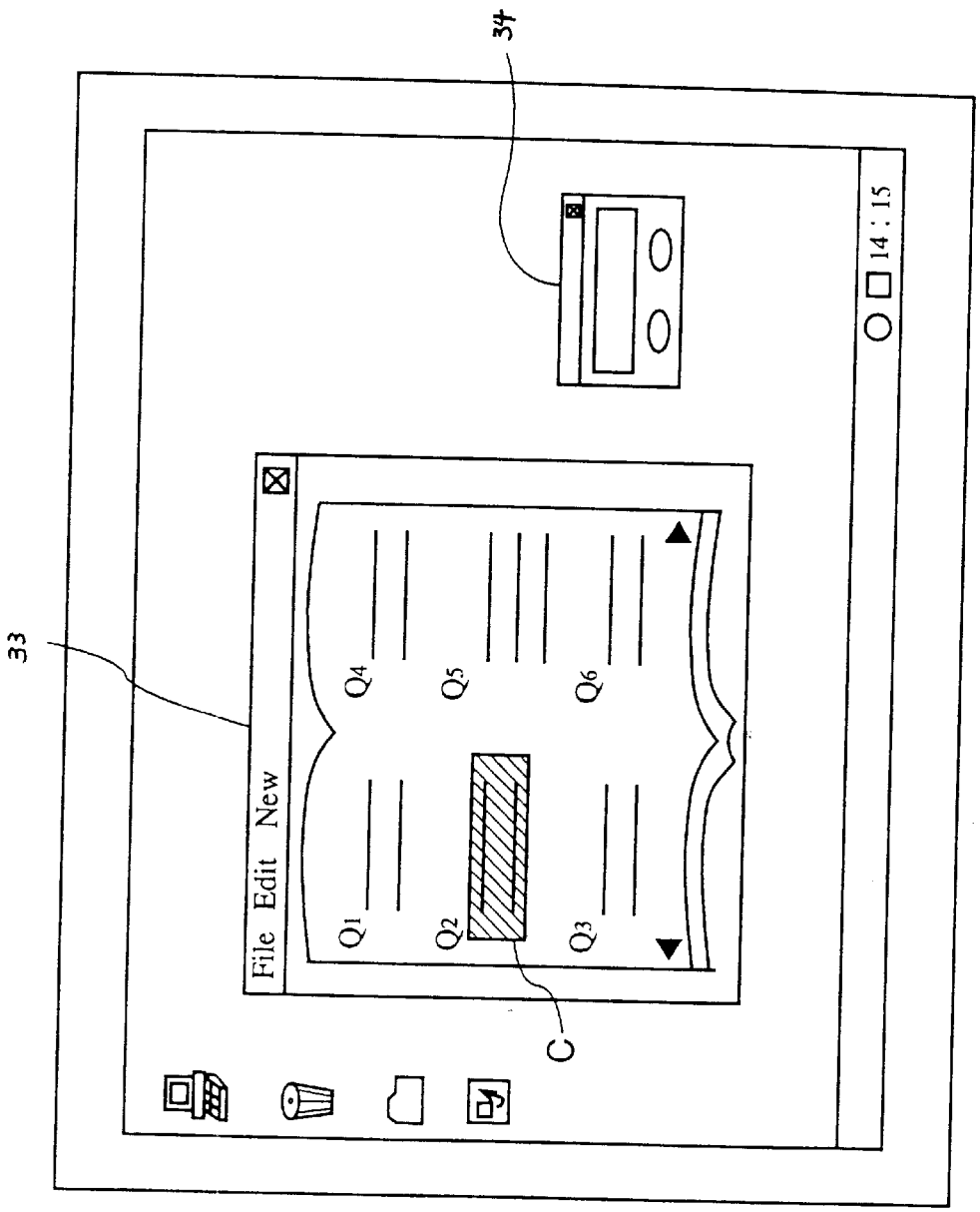
FIG. 40 is a Display Unit 2 in which two windows are shown; a window displaying a set of questions, and an input window in which the user can add the questions to DS as data.

First, the operation of information, viewing and DS addition will be explained (P1~4 of FIG. 38 and FIG. 39). FIG. 40 is Information View Window 33 and DS Registration Window 34 on the screen of Display Unit 2.

Figure 41A:
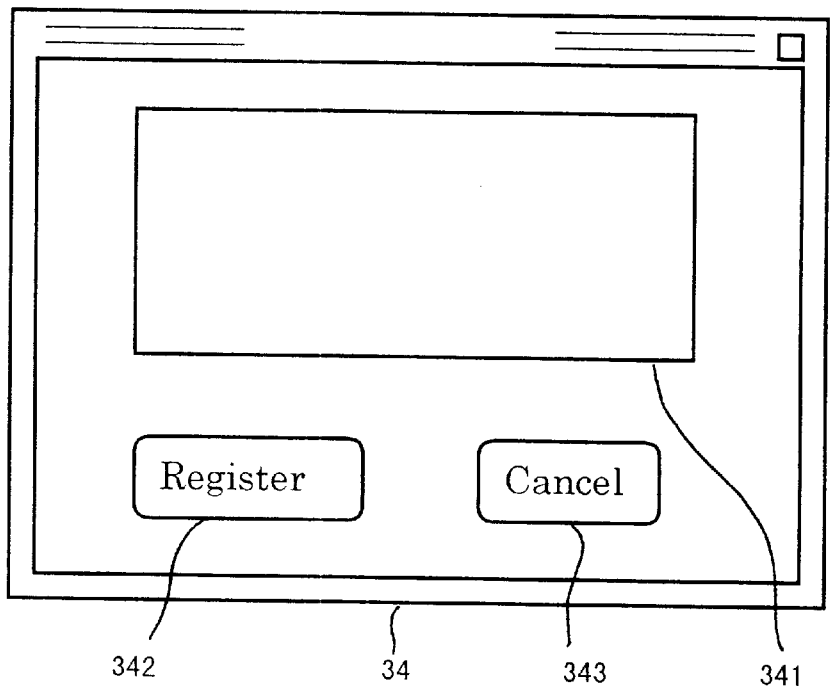
FIGS. 41(a) and 41(b) show the input window described in FIG. 40.
Figure 41B:
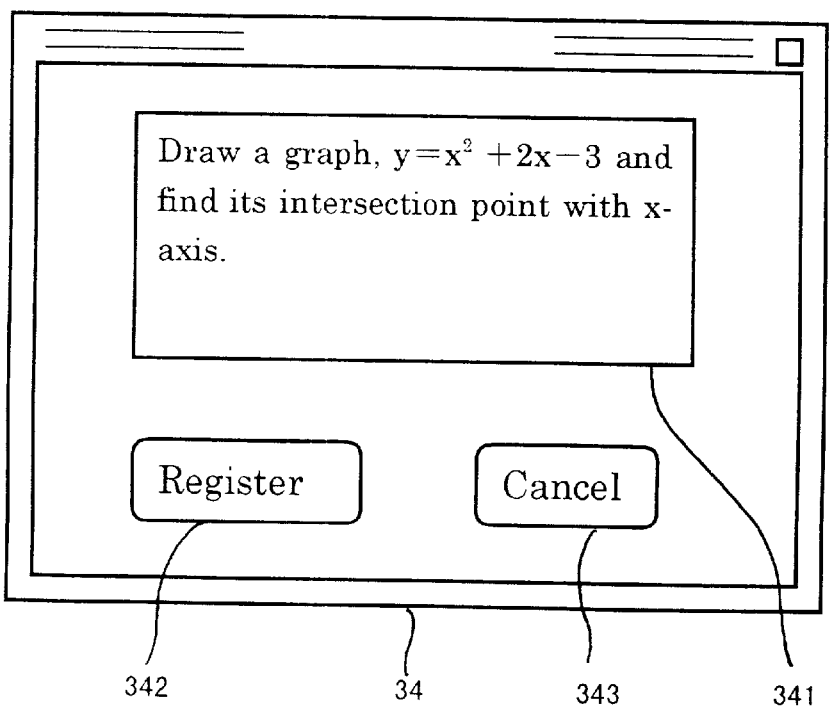

In the Information View Window 33, information of the Information File 7 are viewed by means of the Information View Means 91 and here, 6 math questions, Q1~Q6, are shown as the text information. For example, the Q2 is a question of average difficulty which appeared in the entrance exam of School A in 1996 on a quadratic function. FIG. 41(*a*), shows the DS Registration Window 34 which includes: a 'Field' 341 to which information of the Information View Window 33 are imported; a 'Register' button which is clicked when the user wants to register the imported information as data of a DS; and 'Cancel' button which cancels the data registration.

The user sets the desired range of information indicated in the View Window 33 (refer to P2 of FIG. 38). As shown in FIG. 41(*a*), the 'Field' 341 of the Supplement Window 34 is blank initially. The user is able to import the Q2 of the View Window 33 by dragging the shaded area C with a Mouse 62. When the 'Register' button 342 is clicked, the text information "Draw a graph, $y=x^2+2x-3$ and find its intersection point with x-axis", appears in the 'Field' 341 and the Supplement Window 34 will look like that of FIG. 41(*b*).

At the same time, a new window, Attribute Window 35 as in FIG. 42, appears on the screen and attribute information are added to data of the selected question (refer to P3 of FIG. 38). Here, the User Adds the school information, the year information, the area information and the difficulty-level of the selected question (refer to P3 of FIG. 38) as the attribute information. For example, in the DS Registration Window 24, the user clicks the button [Yes] for the question, "Has the question been on an entrance exam?", the button [School A] for 'school of the entrance exam', the button [96] for 'year of the entrance exam' and the button [3] for 'difficulty-level of the question'. For 'area of the question', the user can use a pull down menu illustrated in FIG. 43 and click the button [10 Quadratic function] as the appropriate area.

When the user clicks the 'Register' button 342 of the Supplement Window 34 once again, the data, Q2 is registered in the Memory System 3 with the attribute information 1~5 (refer to P4 of FIG. 38). If the user wants to add attribute information to question data which has never been on an exam, the user clicks the button [No] for the question, "Has the question been on an entrance exam?"; the radio buttons of the 'school of the entrance exam' and of the 'year of the entrance exam' become non-active. In this case, the User Adds only the attribute information 4 and 5, 'area of the question' and 'difficulty-level of the question'.

TABLE 7

| Data | Attribute Info. 1 | 2 | 3 | 4 | 5 |
|------|------|---|---|---|---|
| D 1 | 1 | 3 | 1993 | 8 | 3 |
| D 2 | 0 | — | — | 16 | 2 |
| D 3 | 0 | — | — | 11 | 4 |
| D 4 | 1 | 2 | 1990 | 2 | 1 |
| . | . | . | . | . | . |
| . | . | . | . | . | . |
| . | . | . | . | . | . |
| D I | 1 | 1 | 1996 | 10 | 3 |

In Table 7, new sets of DS are registered to the DSG of Table 6. The new registered DS is data Di, "Draw a graph, $y=x^2+2x-3$ and find its intersection point with x-axis" and [1] as the attribute information 1 implying that the question has been on an entrance exam, [1] as the attribute information 2 implying the school A, [96] as the attribute information 3 implying the year 1996, [10] as the attribute information 4 implying that the question is of a quadratic function and [3] as the attribute information 5 implying that the question is of average difficulty-level.

Next, the procedure of data operation of Analysis Means 96 and Question Prediction Means based on the attribute information, will be examined (refer to P5 of FIG. 38).

Figure 44:
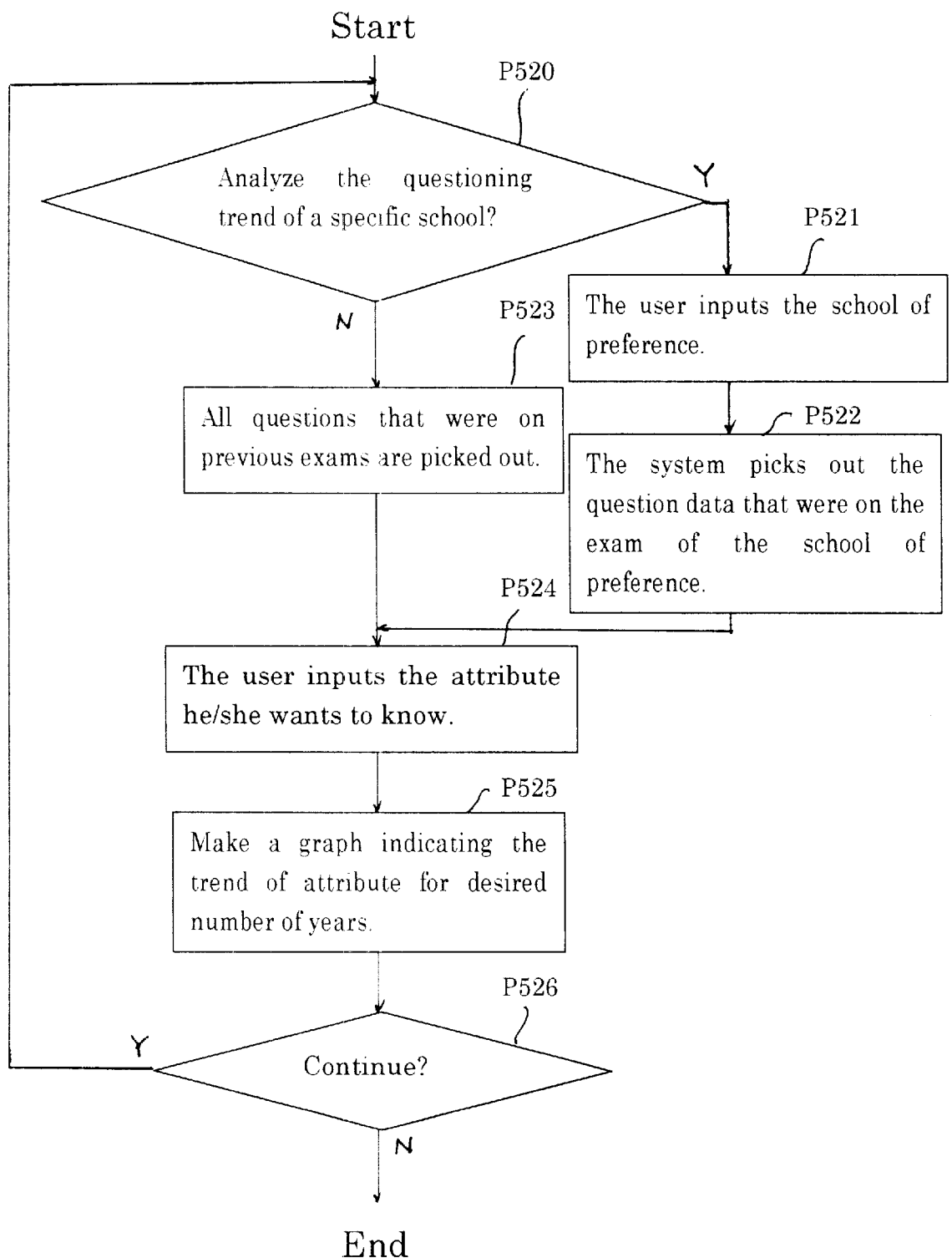
FIG. 44 is a flow chart describing the analyzing procedure for the trend of questions in entrance examinations.

FIG. 44 is a flow chart describing the procedure of data operation by the Analysis Means 96. First, the user selects whether to analyze a questioning trend of a particular school or not (P520). If the user wants to analyze the questioning trend of a particular school, the user inputs the attribute information 2 according to school of preference (P521) and pick out the question data which were on the exam of the school (P522). For example, if the user selects to analyze the questioning trend of School A, the DS with Attribute Information 2 of [1] is picked out from the DS in Table 7. On the other hand, if the user wants to analyze a general questioning trend of all the schools, all questions that were on previous exams are picked out (P523). In this case, the questions with the Attribute Information [1] indicating that the questions appeared in previous exams or the questions with a numerical value registered in the Attribute Information 2 and 3.

Next, the user inputs the attribute he/she wants to learn (P524). For example, if the user inputs 'the number of questions of each area appeared in the exams of School A', the number of questions of each area appeared in a certain year's exam are counted. The DS with [1] as the Attribute Information 2 and [1]~[16] as the Attribute Information 4 are selected; the numerical value of the Attribute Information 4 is calculated; this procedure is repeated for desired number of years, 1994~1998 in the present example, and the numerical values calculated are put into a graph (P525).

Figure 45:
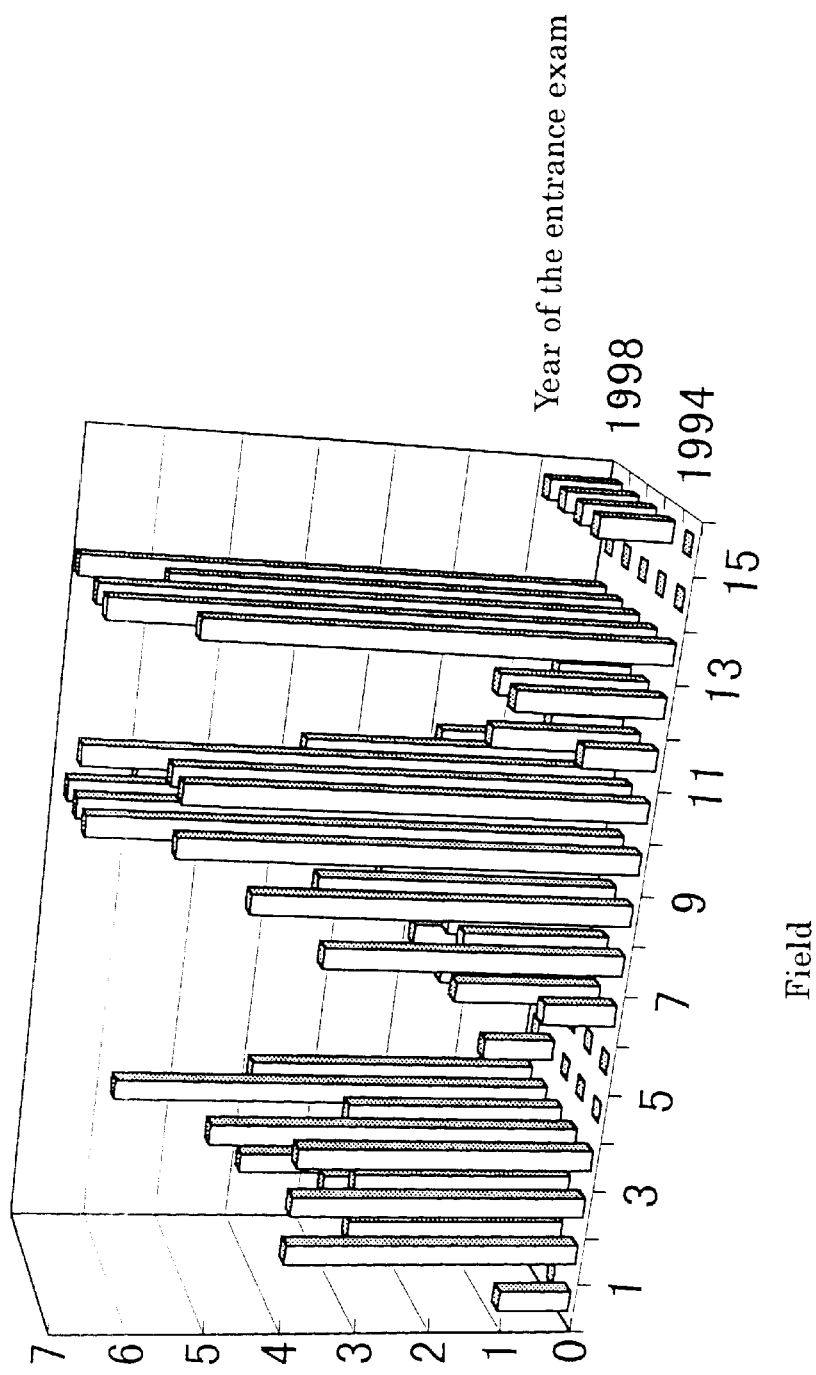
FIG. 45 is a bar graph of an analysis result on the trend of questions in entrance examinations.

FIG. 45 is a graph illustrating the number of questions of each area appeared in the exams of School A from 1994 to 1998. Examining the graph like this, the user is able to learn easily that questions on quadrilateral, the Attribute Information 4 [15], never appear in School A's exam and questions on triangle appear frequently.

Figure 46:
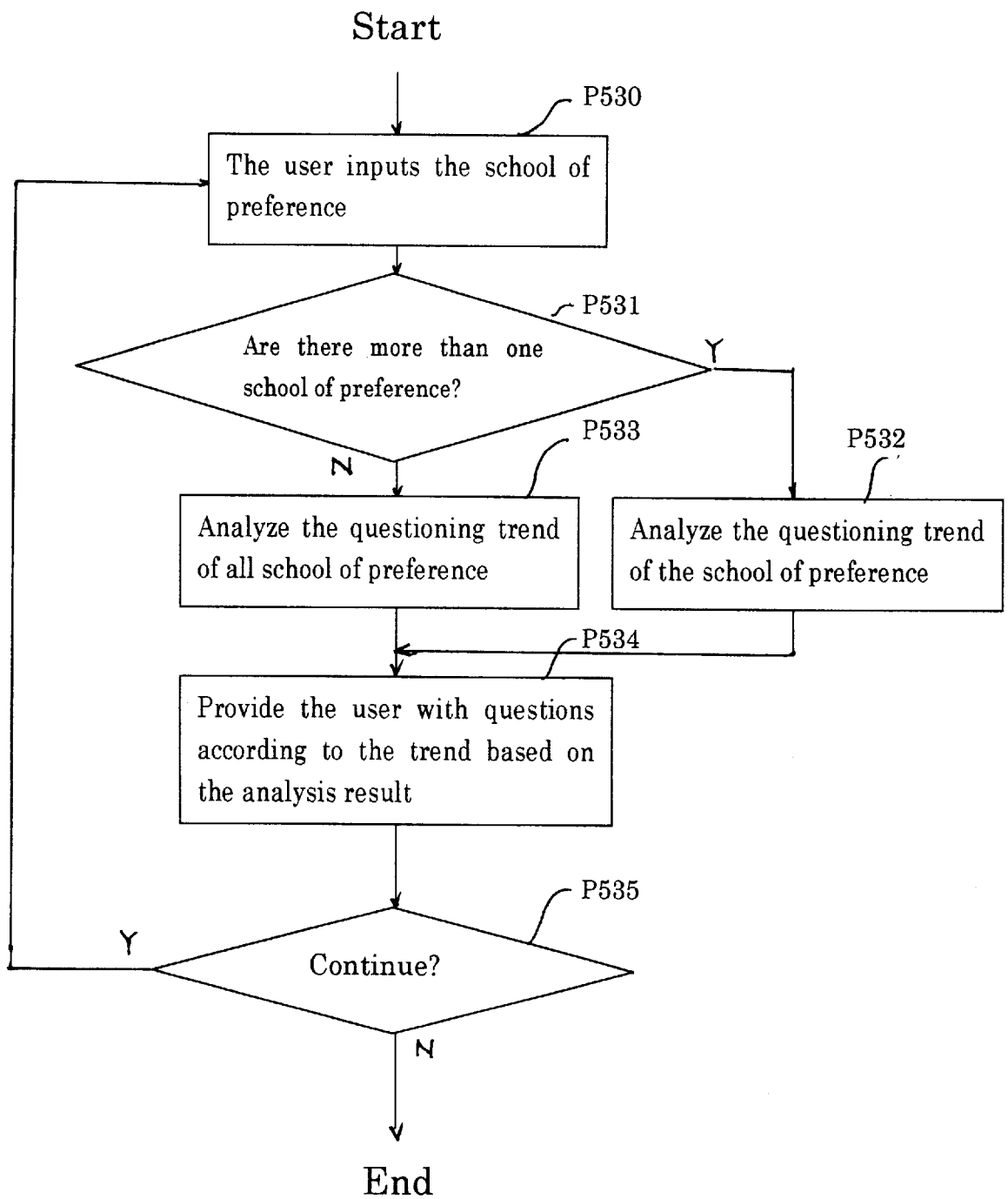
FIG. 46 is a flow chart which shows the procedure which determines the questions based on trend of questions in entrance examination of the preferred school(s)

FIG. 46 is a flow chart describing a procedure of data operation by the Question Predicting Means 97. First, the user inputs a school/schools of his/her preference (P530). The means judges whether the school of preference is of multiple number or not (P531); if the number is singular, it analyzes the questioning trend of the school of preference.

TABLE 8

| Area | School A | School B | School A & B |
|------|----------|----------|--------------|
| 1 | 0 | 0 | 0 |
| 2 | 5 | 2 | 3.5 |
| 3 | 1 | 0 | 0.5 |
| 4 | 8 | 2 | 5 |
| 5 | 4 | 0 | 2 |
| 6 | 2 | 0 | 1 |
| 7 | 0 | 1 | 0.5 |
| 8 | 3 | 2 | 2.5 |
| 9 | 1 | 5 | 3 |
| 10 | 6 | 9 | 7.5 |
| 11 | 2 | 4 | 3 |
| 12 | 1 | 2 | 1.5 |
| 13 | 1 | 8 | 4.5 |
| 14 | 2 | 9 | 5.5 |
| 15 | 1 | 8 | 4.5 |
| 16 | 1 | 7 | 4 |

Table 8 illustrates the analysis result of number of times questions appeared in the exams. The number of questions of each area appeared in the entrance exams of School A for the last three years are indicated in the School A row of Table 8. Similarly, the number of questions of each area appeared in the entrance exams of School B for the last three years are indicated in the School B row of Table 8.

If the user inputs multiple numbers of school, School A and B for example, the analysis result is indicated in School A&B row of Table 8; the numbers of questions of each area appeared in the entrance exams of School A and B are averaged out.

Next, based on the analysis result, the question data corresponding to the questioning trend of a preferred school are picked out. For example, if the school of preference is School A, questions, questions are picked out based on the analysis result of School A in Table 8. From DSG, the data with [1] as Attribute Information 4 never appeared in School A's exams, therefore are not asked; the data with [4] as Attribute Information 4 appeared 8 times, therefore 8 questions on quadratic equation are asked. Same applies to other areas. Similarly, if the user selects School A and B, questions are picked out based on the analysis result of School A & B in Table 8. It is possible to omit decimals or raise the decimals to the next whole number. By solving the questions selected in this way, the user is able to study more efficiently in order to prepare for exams of school of preference.

In the above example, when more than one school of preference is selected, the Analysis Means 96 simply averaged out the number of questions in each area. But if the level of preference differs from school to school, e.g., the user is taking the entrance exam for School B just in case he/she fails to be admitted to the school A, it is also possible to calculate the questioning trend according to the importance of exams of different schools. In the present example, the questions selected by the Question Prediction Means 97 can be the questions which previously appeared in entrance exams (data with [1] as the Attribute Information), the questions which never appeared in entrance exams (data with [0] as the Attribute Information 1) or questions from each area in order.

FIG. 47 is a upgraded version of the pull-down menu in FIG. 43. The pull-down menu of FIG. 47 divides the question area into two main items, [1 Equation] and [2 Graph and Figures] and sub-items, e.g. [1 Positive Numbers], which make up the main item. By constructing the question area in order like this, general questioning trend can be analyzed. For example, the trend of School A, e.g., [1 Equation] questions appear frequently in the exam and [2 Graph and Figures] questions appear only occasionally, can be easily grasped. Also, if questions on [2 Graph and Figures] appear frequently in the exams of School B, but the questions on the sub-item [1 Congruence] has not appeared for the last a few year, predicting the questions on [1 Congruence] to be on the exam in the near future, the questions of [1 Congruence] are asked to the User As predicted questions.

Further, it is also possible to add the Attribute Information 6, Record Information to the data structure of Table 8.

TABLE 9

| Data | Attribute Info. 1 | 2 | 3 | 4 | 5 | 6 |
|------|-------------------|---|---|---|---|---|
| D 1 | 1 | 3 | 1993 | 8 | 3 | 2/5 |
| D 2 | 0 | — | — | 16 | 2 | 2/5 |
| D 3 | 0 | — | — | 11 | 4 | 3/3 |
| D 4 | 1 | 2 | 1990 | 2 | 1 | 3/3 |
| . | . | . | . | . | . | . |
| . | . | . | . | . | . | . |
| Dn | 0 | — | — | 7 | 5 | 5/5 |

Table 9 is a data structure of DS which includes Attribute Information 6, Record Information. For example, for the DS on the top line, the Attribute Information 6 indicates 2/5 which implies that user has made two correct answers out of five times asked. By adding Attribute Information 6, the user can reflect his/her own Record Information to the practice exam.

B. Dialogue Generating System

In the Field of computer game, there exist "Simulation Roll-playing Game" where a number of characters create their own stories by having conversations. For this kind of game device, if the dialogues between the characters of the game are fixed, the user cannot feel the sense of reality therefore is likely to lose interest. However, it requires a lot of time and effort in order to input the enormous amount of possible sets of dialogue in the software.

However, it is possible to gain a vast number of dialogues of high quality if dialogue available as electronic information, e.g., text information of copyright-free novels available on the internet can be employed. The present application complies with this kind of circumstance.

∇ System Structure

The hardware structure of the Dialogue Generating System is identical to that of the educational device explained above. The software structure of the Dialogue Generating System is constructed from with an OS which manages and controls the hardware structure and a Dialogue Generating software which operates in the OS. The Dialogue Generating software is divided into two parts: a data part and a program part. The data part includes an Information File 7 and a DSG File 8.

The Information File 7 stores text information of novels with multitudinous dialogues. Regarding DSG File 8, it will be explained later. The program part includes an Information Viewing Means 91, a DS Registering Means 92 and a Dialogue Output Means 98.

▽ DSG

TABLE 10

| Data | Attribute Info. 1 | Attribute Info. 2 |
|---|---|---|
| D 1 | 12 | 5 |
| D 2 | 15 | −3 |
| D 3 | 30 | 1 |
| . | . | . |
| . | . | . |
| . | . | . |
| Dn | 23 | 3 |

Table 10 explains the data structure of DSG of the application implemented. In the Table 10, each row constructs one DS where each DS is made up of a data part and an attribute part. A sentence of a dialogue is stored in the data part as a text information and the attribute part includes Attribute Information 1 and 2.

The Attribute Information 1 indicates the situation the sentence can be applied to in a two-digit number. For example, if the sentence is a question type, the first digit of the number indicates [1]; if it is an answer type, the first digit indicates [2]; and if it is a monologue type, the first digit indicates [3]. The second digit of the number conveys more detailed situation information. If the first digit of the number is [1] and the second digit is [1], for example, it implies a situation of asking someone for food.

The Attribute Information 2 indicates the impression that the other party might get when the sentence is said and evaluate the sentence as a score of −5 to +5.

▽ System Operation

First, the operation of information viewing and DS addition will be explained (refer to P1~4 of FIG. 38 and FIG. 39). FIG. 48 is Information View Window 36 and Supplement Window 37 on the screen of Display Unit 2.

Figure 49A:
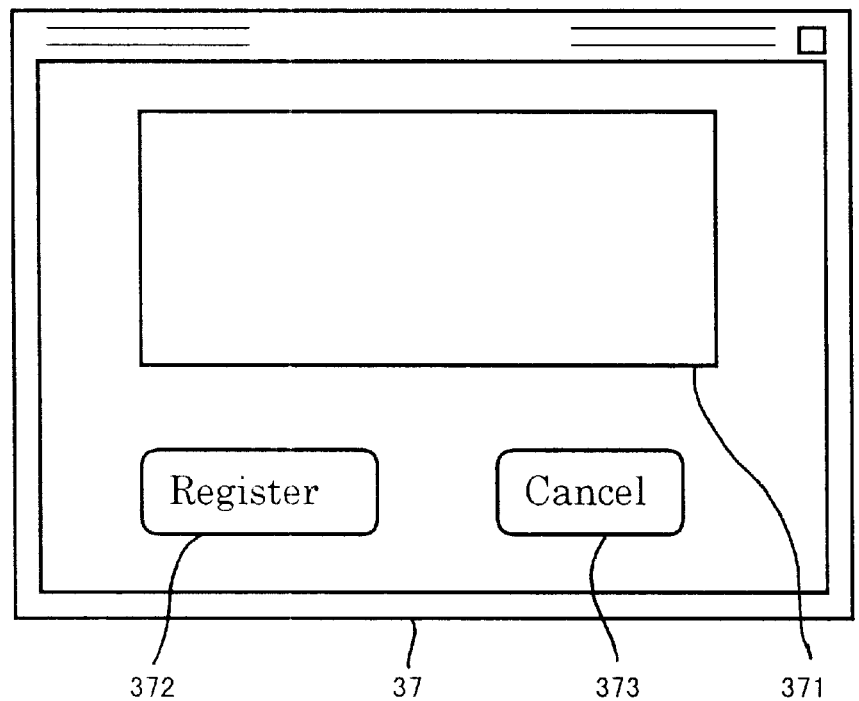
FIGS. 49(a) and 49(b) show the input window described in FIG. 48.
Figure 49B:
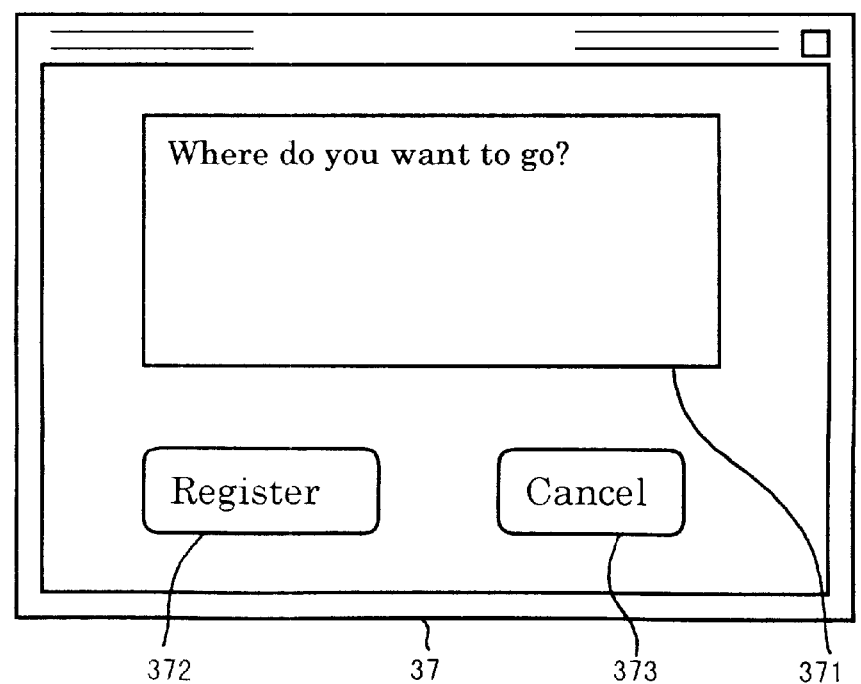

In the Information View Window 36, information of the Information File 7 are viewed by means of the Information View Means 91 and here, a section of a novel is shown as the text information. As illustrated in FIG. 49(*a*), the Supplement Window 37 includes: a 'Field' 371 to which information of the Information View Window 36 are imported; a 'Register' button 372 which is clicked when the user wants to register the imported information as data of a DS; and 'Cancel' button 373 which cancels the data registration.

The user sets the desired range of information indicated in the View Window 36 (refer to P2 of FIG. 38). As shown in FIG. 49(*a*), the 'Field' 371 of the Supplement Window 37 is blank initially. The user is able to import a sentence, for example, "Where do you feel like going?" in the View Window 36 by dragging the shaded area D with a Mouse 62. When the 'Register' button 372 of the Supplement Window 37 is clicked, the text data of the sentence is imported to the 'Field' 371 of the Supplement Window 37 and the window will look like that of FIG. 49(*b*).

Figure 50:
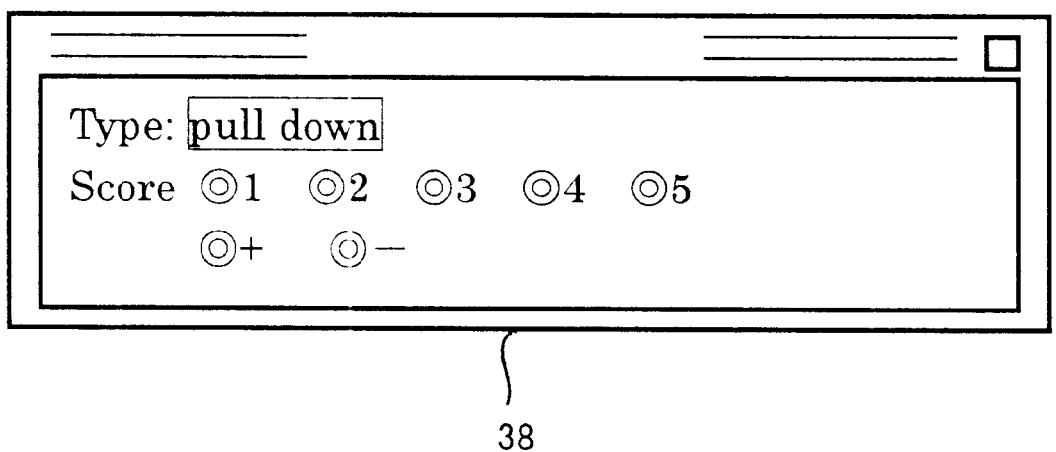
FIG. 50 shows a window for adding attribute to dialogue data.

At the same time, a new window, Attribute Window 38 illustrated in FIG. 50, appears on the screen and attribute information can be added to data of the selected sentence (refer to P3 of FIG. 38). Here, the User Adds the type and score of the selected sentence as the attribute information. The user inputs the type of the sentence with a pull-down menu, shown in FIG. 51, using a Mouse 62 and add a suitable type as an attribute to the selected data. Here, the User Adds, for example, [Question type], [Ask where the other party wants to go] as the type of the sentence and [4] as the impression score of the sentence by clicking the radio button 4 and+(refer to FIG. 50).

When the user clicks the 'Register' button 372 of the Supplement Window 37 once again, the data is registered to the DSG with the Attribute Information 1 [12] which implies that the data is a question asking where the other party wants to go and Attribute Information 2 [4] which implies the impression score of the sentence (refer to P4 of FIG. 38).

TABLE 11

| Data | Attribute Info. 1 | Attribute Info. 2 |
|---|---|---|
| D 1 | 12 | 5 |
| D 2 | 15 | −3 |
| D 3 | 30 | 1 |
| . | . | . |
| . | . | . |
| . | . | . |
| D i | 12 | 4 |
| D i + 1 | 27 | 5 |
| D i + 2 | 27 | −5 |
| . | . | . |
| . | . | . |
| . | . | . |
| Dn | 23 | 3 |

In Table 11, new sets of DS are registered to the DSG of Table 10. The above mentioned data Di, "Where do you feel like going?" is registered with the Attribute Information 1 [12] which implies that the data is a question asking where the other party wants to go and Attribute Information 2 [4] which implies the impression score of the sentence. Also, a number of other dialogue sentence data, D1~Dn, are registered as DS with their attribute information. The data Di+1, e.g., "I'd love to go to the zoo.", is registered with the Attribute Information 1 [27] which implies that the data is an answer type sentence telling the other party where he/she wants to go and Attribute Information 2 [5] as the impression score of the sentence. Similarly, The data Di+2, e.g., "I don't want to go to anywhere.", is registered with the Attribute Information 1 [27] and Attribute Information 2 [−5] as the impression score of the sentence.

Figure 52:
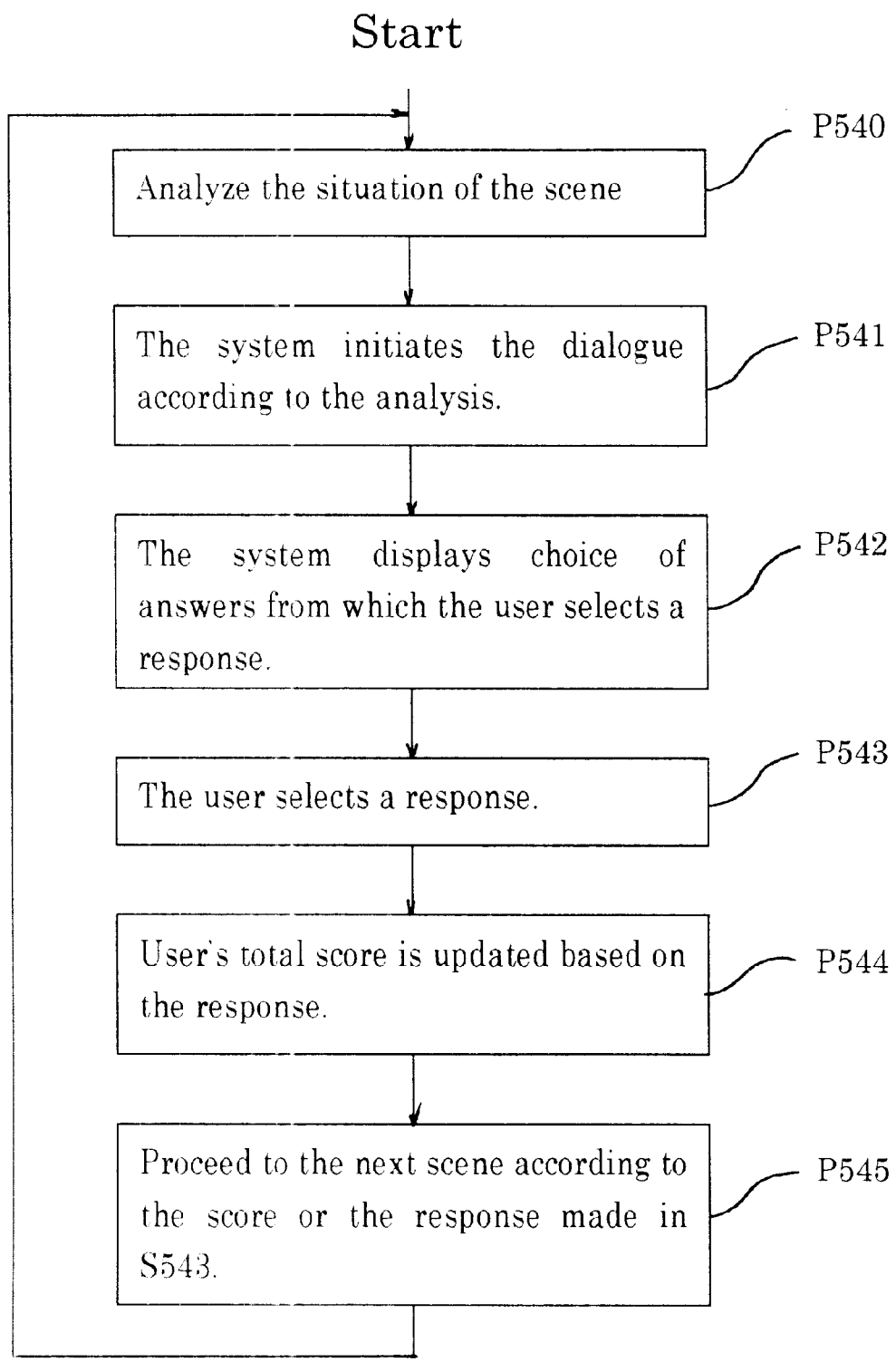
FIG. 52 is a flow chart which shows a procedure of a game wherein multiple characters appear and dialogue.

FIG. 52 is a flow chart describing the procedure of data operation according to the attribute information of DS by the Dialogue Generating Means 98. The Dialogue Generating Means 98 is applicable to computer game of dialogue roll-play and the game progresses as the characters, Character A and B exchanging a conversation. The Character A is played by the computer and the lines of the Character B are selected by the user.

Figure 53:
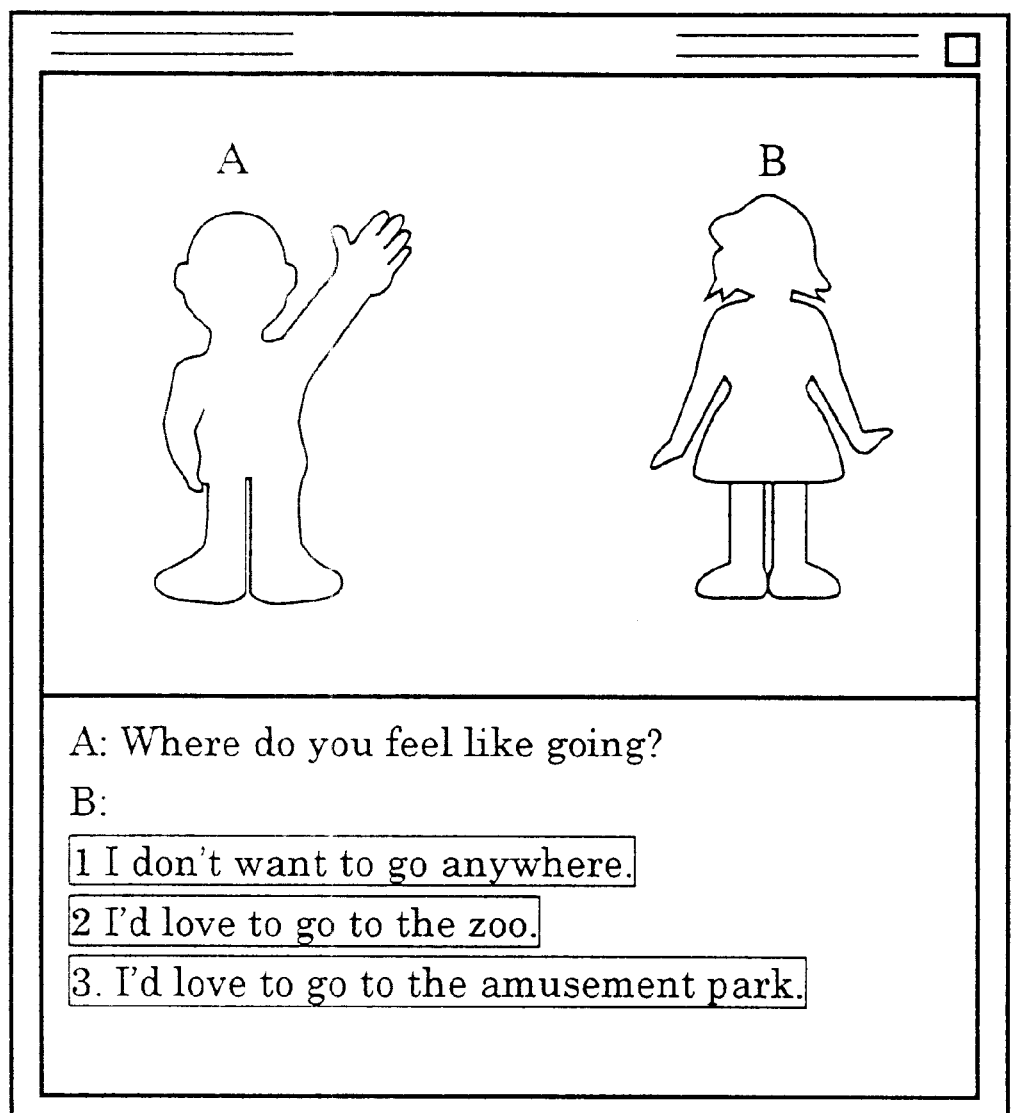
FIG. 53 shows a screen of a game wherein two characters dialogue.

FIG. 53 illustrates the Screen 39 of the dialogue roll-play game. It is a scene where Character A and B meet together to go somewhere. The scene is of attribute [1] since the Character A asks a question in order to initiate a dialogue. Based on the attribute of the screen [1], the Dialogue Output Means 98 displays a question sentence from the registered DSG as Character A's line (P541). This is done by randomly selecting a dialogue sentence data with [1] as the first digit of the Attribute Information 1. Here, a dialogue sentence data with Attribute Information 1 [12], "Where do you feel like going?", is selected.

Next, the Dialogue Output Means 98 displays choice of answers which Character B may select as an answer on the screen (P542). Since the Character A is asking where B wants to go, Character B's line should answer the place B wants to go. From dialogue sentence data, the data with [27] as the Attribute Information 1 are selected. Here, $D_{i+2}$ [1 I don't want to go anywhere.], $D_{i+1}$ [2 I'd love to go to the zoo.] and [3 I want to go to the amusement park.] are selected as sentence data. Among the three choices, the user select a data as a dialogue sentence of the character B (P543) either by inputting the number of the answer (1~3) using Keyboard 61 or by clicking a Mouse 62.

Next, user's score is updated according to the selected dialogue sentence (P544). For example, if the user has selected the answer data, [2 I'd love to go to the zoo.], in P 543, 5 points are added to user's total score point. Similarly, if the user has selected the answer data, [1 I don't want to go anywhere.], in P 543, 5 points are subtracted to user's total score point. According to the updated score point of the user or to the dialogue in P 543, the screen displays the next scene. For example, if the user has answered "I'd love to go to the zoo.", the screen displays the scene at the zoo and if the user has answered "I don't want to go anywhere.", the screen displays the scene of the Character A and B having an argument.

In the present application, each DS has Attribute Information 1, the type of the dialogue sentence and an Attribute Information 2, the score point of the sentence but attribute information indicating sex or age group of a character can be also added to a DS. FIG. 54 is a upgraded version of the Supplement Window 38, Supplement Window 38' with 4 different attribute information. Here, by clicking a radio button, the user not only selects the type and score point of the sentence data, but also, selects the sex of the character stating the sentence, e.g., masculine, feminine or mutual, and the age group the character belongs to.

TABLE 12

| Data | Attribute Info. 1 | Attribute Info. 2 | Attribute Info. 3 | Attribute Info. 4 |
| --- | --- | --- | --- | --- |
| D 1 | 12 | 5 | 0 | 2 |
| D 2 | 15 | −3 | 1 | 4 |
| D 3 | 30 | 1 | 2 | 0 |
| . | . | . | | |
| . | . | . | | |
| . | . | . | | |
| D i | 12 | 4 | 0 | 1, 2 |
| D i + 1 | 27 | 5 | 1 | 1, 2 |
| D i + 2 | 27 | −5 | 2 | 1, 2 |
| . | . | . | | |
| . | . | . | | |
| . | . | . | | |
| Dn | 23 | 3 | 1 | 4 |

Table 12 is a data structure of each DS of DSG in Table 11 and includes Attribute Information 3, sex of the character stating the sentence and Attribute Information 4, the age group of the character stating the sentence. When the character stating the sentence is assumed as a male character, the Attribute Information 3 indicates [0]; when the character stating the sentence is assumed as a female character, the Attribute Information 3 indicates [1]; and when the character stating the sentence is can be of any sex, the Attribute Information 3 indicates [2]. Similarly, when the character stating the sentence is assumed as a baby, the Attribute Information 4 indicates [0]; when assumed as a child, the Attribute Information 4 indicates [2]; when assumed as a young adult, the Attribute Information 4 indicates [2]; when assumed as a middle-aged adult, the Attribute Information indicates [3]; and when assumed as of advance age, the Attribute Information indicates [4].

For example, Di "Where do you feel like going?", may have [0] as the Attribute Information 3 implying that it is stated by a male character and [1,2] as the Attribute Information 4 implying that it is stated by a child or a young adult. Similarly, Di+1"I'd love to go to the zoo.", may have [2] as the Attribute Information 3 implying that it is stated by a female character and [1,2] as the Attribute Information 4 implying that it is stated by a child or a young adult.

Now, in the present application, characteristic of the characters are not set initially, but it is possible to set the characteristic of the characters beforehand. For example, the characteristic of the character A can be set as a boy and B as a girl. If the characteristics of characters are set in advance, the Dialogue Output Means 98 is able to carry out the procedure P541 and P542 in FIG. 52 displaying a sentence data corresponding to the characteristic of the character. For example, the means does not select data with the Attribute Information 3 [1] when the character is Character A, a boy and this prevents unnaturalness of a boy speaking in a feminine way. Furthermore, if attribute information of personality, dialect or occupation are added to the sentence data, it is possible to generate a more natural and realistic dialogue.

C. News Filing Device

An enormous amount of news has became available through media such as internet. The purpose of the present application, News Filing Device is to save time and effort filing the news.

∇ System Structure

The hardware structure of the News Filing Device is identical to that of the educational device explained before. The software structure of the educational device is constructed from with an OS which manages and controls the hardware structure and an news filing software which operates in the OS. The educational software is divided into two parts: a data part and a program part. The data part includes an Information File 7 and a DSG File 8.

The Information File 7 contains HTML news information stored in the magnetic disk device of www server connected through computer network. DSG File 8 will be explained later. The program part includes an Information Viewing Means 91 , a DS Registering Means 92 and Search Means 99.

∇ DSG

TABLE 13

| Data | Attribute Info. 1 |
| --- | --- |
| D 1 | 5 |
| D 2 | 1 |
| D 3 | 2 |
| . | . |
| . | . |
| . | . |
| Dn | 4 |

Table 13 explains the data structure of DSG of the application implemented. In the Table 13, each row constructs one DS where each DS is made up of a data part and an attribute part. A news article is stored in the data part as a text information and the attribute part includes Attribute Information 1.

The Attribute Information 1 indicates a Field of the news. For example, it indicates [1] if the news is about [International Relations], [2] if the news is about [Politics] and [3] if the news is about [Society].

∇ System Operation

Figure 55:
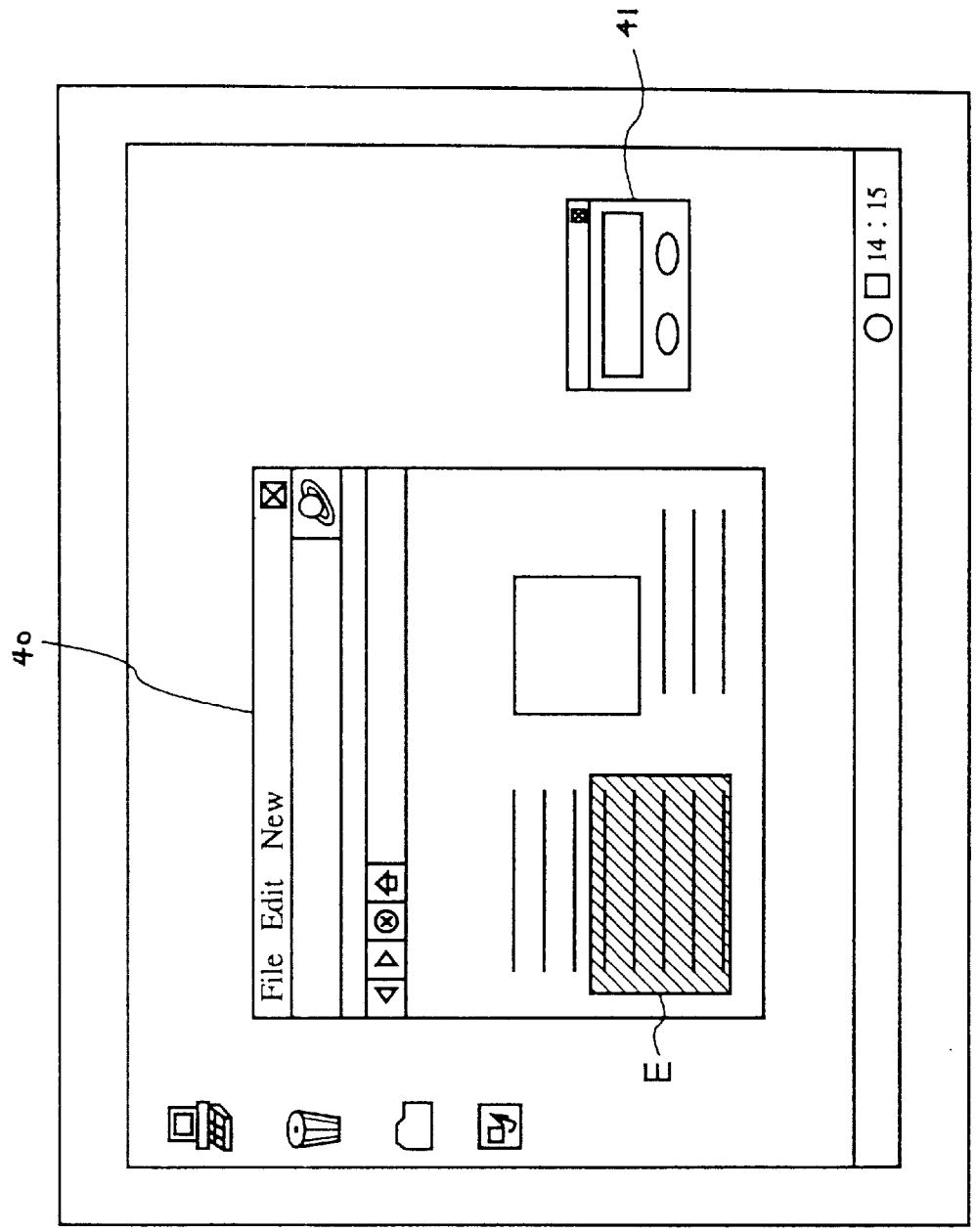
FIG. 55 is a Display Unit 2 in which a window indicating news information and an Input Window registering the news information to DS as data are displayed.

First, the operation of information viewing and DS addition will be explained (refer to P1~4 of FIG. 38 and FIG. 39). FIG. 55 is a Information View Window 40 and a Supplement Window 41 on the screen of Display Unit 2.

The Information View Window 40 is an internet browser and in the window, information in the Information File 7 of a www server are displayed by means of the Information View Means 91. Here, a sports news article of Nov. 16, 1997 is displayed. As illustrated in FIG. 55(a), the Supplement Window 41 includes: a 'Field' 411 to which information of the Information View Window 40 are imported; a 'Register' button 412 which is clicked when the user wants to register the imported information as data of a DS; and 'Cancel' button 413 which cancels the data registration.

Figure 56A:
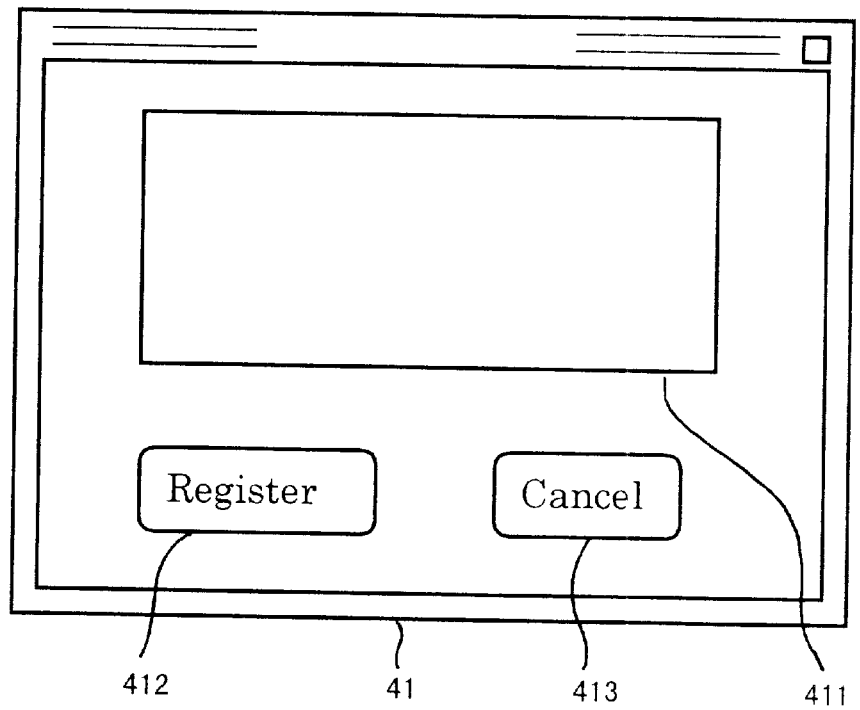
FIGS. 56(a) and 56(b) show an input window described in FIG. 55.
Figure 56B:
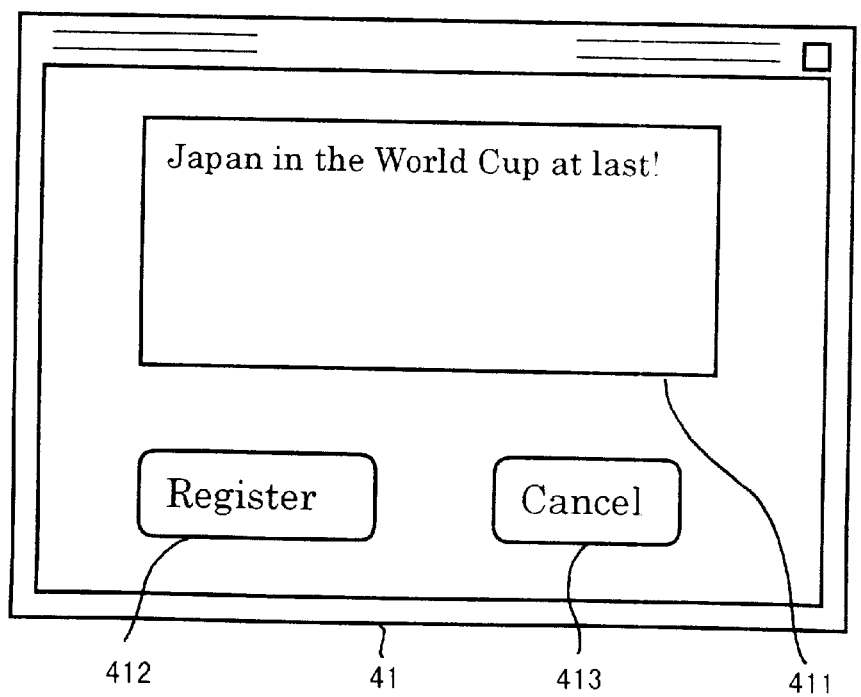

The user sets the desired range of information indicated in the View Window 40 (refer to P2 of FIG. 38). As shown in FIG. 55(a), the 'Field' 411 of the Supplement Window 41 is blank initially. The user selects a news, for example, "Japan in the World Cup at last! . . . " from the View Window 40 by dragging the shaded area E to the Supplement Window 41 with a Mouse 62. When the 'Register' button 412 of the Supplement Window 41 is clicked, the text data of the news is imported to the 'Field' 411 of the Supplement Window 41 and the window will look like that of FIG. 56(*b*).

Figure 57:
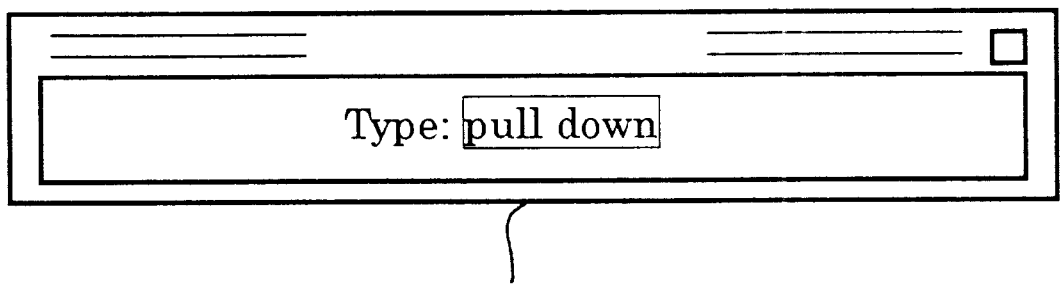
FIG. 57 shows a window in which the user can add attribute to news data.

At the same time, a new window, Attribute Window 42 illustrated in FIG. 57, appears on the screen and attribute information can be added to data of the selected news (refer to P3 of FIG. 38). Here, the User Adds the Field of the selected news as the attribute information. The user selects a suitable Field of the news from a pull-down menu, illustrated in FIG. 58, using a Mouse 62. Here, the user selects [Sports] as a Field of the news.

When the user clicks the 'Register' button 412 of the Supplement Window 41 once again, the data, "Japan in the World Cup at last! . . . ", with the Attribute Information 1 [8 Sports] gets registered in the DSG (refer to P4 of FIG. 38)

TABLE 14

| Data | Attribute Info. 1 |
|---|---|
| D 1 | 5 |
| D 2 | 1 |
| D 3 | 2 |
| . | . |
| . | . |
| . | . |
| D i | 8 |
| . | . |
| . | . |
| . | . |
| D n | 4 |

In Table 14, new sets of DS are registered to the DSG of Table 13. The new registered data Di, "Japan in the World Cup at last! . . . " is registered with its Attribute Information 1, [8]. In the table, there are many other DS, news data (D1~Dn) and their attribute information, registered.

Figure 59:
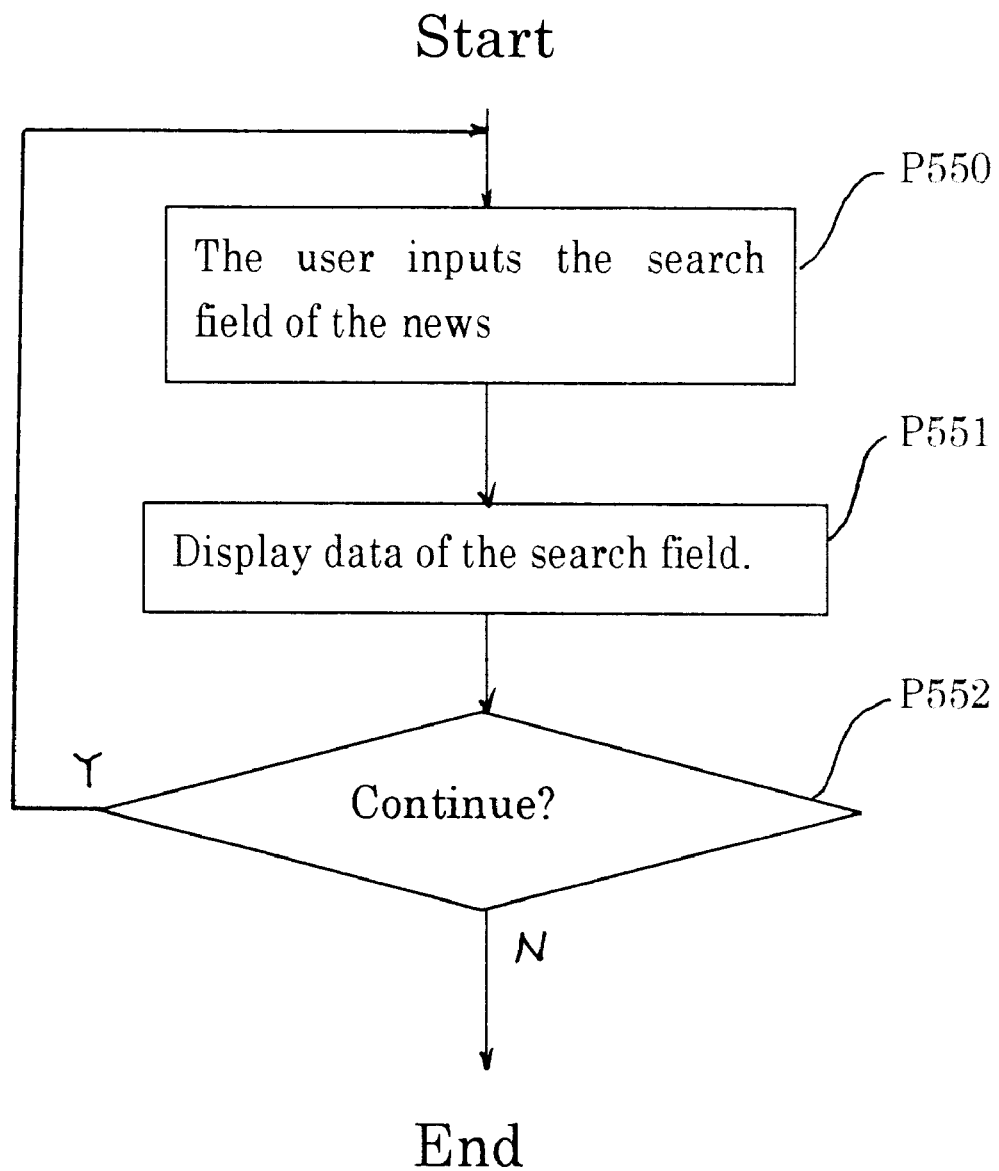
FIG. 59 is a flow chart which shows a procedure of news retrieval.

FIG. 59 is a flow chart illustrating the data operating procedure of Search Means 99 according to the attribute information (refer to P5 of FIG. 38). First, the user inputs a search Field of the news with the Keyboard 61 (P550). Here, the user is able to narrow down the news according to the Field. If the user inputs 'Sports' as the Field, the means selects data with the Attribute Information 1 [8] from each DS and displays a list of sports news articles. Next, the user decides to continue or to quit search; if the user chooses to continue, the user is taken back to P550 and if the user chooses to quit, the search process ends.

An attribute information search method takes less time and is more efficient when compared wit a keyword search. For example, if the sports news article does not include a word, 'sports', the article cannot be found when using a keyword search method using 'sports' as a keyword. However, when an attribute information search method is applied, the article can certainly be found.

In the present application, the Attribute Information 1 indicating the news Field is of a single level, but it can also be of a multi-level. FIG. 60 is a upgraded version of the pull-down menu illustrated in FIG. 58. The pull-down menu. The pull-down menu in FIG. 60 divides the news Field into nine main Fields, e.g., [8 Sports] and sub-Fields of each main Field, e.g., [1 Soccer]. By constructing a multi-level news Field like this, the search becomes more time and energy efficient.

In the present application, each DS only has Attribute Information 1, the news Field of the data but it is also possible to add other attribute information to a DS.

TABLE 15

| Data | Attribute Info. 1 | Attribute Info. 2 |
|---|---|---|
| D 1 | 5 | 2/11/1994 |
| D 2 | 1 | 7/15/1994 |
| D 3 | 2 | 4/1/1997 |
| . | . | . |
| . | . | . |
| . | . | . |
| D i | 8 | 11/16/1997 |

Table 15 is an upgraded version of the data structure in Table 14 and includes Attribute Information 2, the date of the news. By adding such attribute, the user is able to search news of a certain time period and further, to learn the date of the news. The procedure of registering date attribute into a data file is similar to the procedure explained before.

What is claimed is:

1. An educational data processing device comprising:
   a computer with a CPU, a memory system, input and output systems;
   a data set group (DSG), stored in said memory system comprising multiple data set (DS) where each DS comprises two types of data, question and answer wherein the answer is related to the question; and
   a program, stored in said memory system that performs the following functions:
   (a) selects a question and answer data from the DS, and one or more answer data from randomly selected multiple DS in said DSG;
   (b) presents a question and multiple-choice answer set to the user through said output system, wherein the question corresponds to the question data from the selected DS and the multiple-choice answer is comprised of the answer data from the selected DS and answer data from randomly selected multiple DS; and
   (c) determines whether the answer inputted by the user through said input system is correct or not and notifies the user of the result through said output system.

2. The educational data processing device of claim 1, wherein:
   each DS of said DSG comprises at least two types of data;
   a question and at least one corresponding answer, and attribute information that shows properties of data including the relation of question to at least one corresponding answer; and
   said program is equipped with:
   (d) a function that selects, based on corresponding attribute information, question and answer data of the DS from said group of DS and answer data from randomly selected DS.

3. The educational data processing device of claim 2, wherein said program is equipped with:
   (e) a function that registers the number (N, where N≧2) of choices in a multiple-choice answer as set and inputted by the user through said input system; and
   (f) a function that selects, based on each corresponding attribute information, question and answer data of the DS from said DSG and answer data from other DS (N−1).

4. The educational data processing device of claim 2 or 3, wherein:
   the device comprises category information indicating educational category of data and 'Difficulty-level Information' indicating the degree of difficulty of data; and said program is equipped with:
- (g) a function that selects question and answer data of the DS and answer data from other DS based on category information and Difficulty-level Information.

5. The educational data processing device of claim 2 or 3, wherein:
the device stores Record Information that indicates the rate of correct responses as attribute information of each said data; and
said program is equipped with:
- (h) a function that selects, question and answer data of the DS from said DSG and answer data from other DS based on Record Information; and
- (i) a function that updates, Record Information of the question data of the DS, based on the number of correct responses to that answer data that the user has inputted through said input system.

6. The educational data processing device of claim 1, 2, or 3, wherein said program is equipped with:
- (A) a function that presents to the user through said output system information stored in said memory system or information from outside record media inputted through said input system; and
- (k) a function that narrows information down within the parameters set by the User And stores it into said memory system as said DS after adding attribute information set by user to each data.

7. The educational data processing device of claim 1, 2, or 3, wherein said program is equipped with:
- (l) a function that presents to the user through said output system information stored in said memory system or information from outside record media inputted through said input system; and
- (m) a function that enables the user to designate at least one parameter of a conveyed information as said data after matching conveyed information to each respective attribute using one of various designating methods, wherein the program then adds attribute information to the designating method of each data and stores the selected data and their attribute information as said DS into said memory system.

8. The educational data processing device of claim 1, 2, or 3, wherein said program is equipped with:
- (n) a function that presents to the user through said output system information stored in said memory system or information from outside record media inputted through said input system; and
- (o) a function that registers various ranges of information marked by the user in different colors according to their attributes, as said data; and stores the marked data paired with their respective marking colors, where different marking color differentiates various attribute information, as DS into said memory system.

9. The educational data processing device of claim 1, 2, or 3, wherein said program is equipped with:
- (p) a function that presents to the user through said output system information stored in said memory system or information from outside record media inputted through said input system; and
- (q) a function that enables the user to set, in advance, the relationship between a form of an indicated information and the attribute information; that automatically picks out information in the range containing a specific form based on that corresponding relationship and stores it as said data; adds attribute information relevant to that specific form and takes the data and the attribute information as said DS; and stores it in said memory system.

10. The educational data processing device of claim 1, 2, or 3, wherein said program is equipped with:
- (r) a function that presents to the user through said output system the result of searches made on user selected keyword(s) for information in said memory system or information from outside record media inputted through said input system; and
- (s) a function that enables the user to set, in advance, the corresponding relationship of keyword to attribute information and of indicated search result to attribute information; automatically sets keyword(s) and search result(s) as said data based on that corresponding relationship; adds attribute information relevant to the data, saves the data and attribute information as said DS and store into said memory system.

11. The educational data processing device of claim 1, 2, or 3, wherein:
said computer comprises a communication control system that manages information communication through a computer network and said input system; and
said program is equipped with:
- (t) a function that presents to the user through said output system an information report displaying information, from computer network transmitted through said communication control system; and
- (u) a function that recognizes information falling within the parameters set by the user as said DS and then stores it paired with attribute information set by the user into said memory system as said DS.

12. The educational data processing device of claim 2 or 3, wherein:
the device comprises category information indicating educational category of data or 'Difficulty-level Information' indicating the degree of difficulty of data; and
said program is equipped with:
- (x) a function that selects question and answer data of the DS and answer data from other DS based on category information or Difficulty-level Information.

13. The educational data processing device of claim 2 or 3, wherein:
the device stores Record Information that indicates the rate of correct responses as attribute information of each said data; and
said program is equipped with:
- (y) a function that selects, question and answer data of the DS from said DSG or answer data from other DS based on Record Information; and
- (z) a function that updates, Record Information of the question data of the DS, based on the number of correct responses to that answer data that the user has inputted through said input system.

14. The educational data processing device as in any of claims 1, 2, or 3, wherein said program is equipped with a function that adds data of the DS.

15. The educational data processing device as in any of claims 1, 2, or 3, wherein said program is equipped with a function that edits data of the DS.

16. The educational data processing device of claim 2, wherein said program is equipped with:
- (v) a function that registers the number (N, where $N \geq 2$) of choices in a multiple-choice answer as set and inputted by the user through said input system; and
- (w) a function that selects, based on each corresponding attribute information, question and answer data of the DS from said DSG or answer data from other DS (N−1).

* * * * *